United States Patent
Ko et al.

(10) Patent No.: US 12,150,075 B2
(45) Date of Patent: Nov. 19, 2024

(54) WIRELESS COMMUNICATION METHOD USING MULTILINK, AND WIRELESS COMMUNICATION TERMINAL USING SAME

(71) Applicant: WILUS INSTITUTE OF STANDARDS AND TECHNOLOGY INC., Gyeonggi-do (KR)

(72) Inventors: Geonjung Ko, Gyeonggi-do (KR); Juhyung Son, Gyeonggi-do (KR); Sanghyun Kim, Gyeonggi-do (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

(21) Appl. No.: 18/389,634

(22) Filed: Dec. 19, 2023

(65) Prior Publication Data
US 2024/0129866 A1    Apr. 18, 2024

Related U.S. Application Data

(63) Continuation of application No. PCT/KR2022/008730, filed on Jun. 20, 2022.

(30) Foreign Application Priority Data

Jun. 19, 2021  (KR) .................. 10-2021-0079667
Jun. 24, 2021  (KR) .................. 10-2021-0082262
(Continued)

(51) Int. Cl.
*H04W 56/00*    (2009.01)

(52) U.S. Cl.
CPC ..... *H04W 56/001* (2013.01); *H04W 56/0045* (2013.01)

(58) Field of Classification Search
CPC .............. H04L 5/0048; H04L 27/2602; H04L 27/2666; H04W 72/535
See application file for complete search history.

(56) References Cited

U.S. PATENT DOCUMENTS 10,512,108 B2 *  12/2019  Ahn .................. H04L 5/0094
10,567,047 B2 *   2/2020  Son .................. H04L 5/0023
(Continued)

FOREIGN PATENT DOCUMENTS

JP    2005-159451       6/2005
KR    10-2008-0113642   12/2008
(Continued)

OTHER PUBLICATIONS

International Search Report for PCT/KR2022/008730 dated Oct. 4, 2022 and its English translation from WIPO (now published as WO2022/265479).

(Continued)

*Primary Examiner* — Kyaw Z Soe
(74) *Attorney, Agent, or Firm* — Womble Bond Dickinson (US) LLP

(57) ABSTRACT

The present invention provides a device and a method for data reception/transmission performed by a multi-link device (MLD) including multiple stations operating in multiple links in a wireless communication system. Specifically, the MLD in the present invention may receive a frame transmitted from a first access point (AP) or a first station (STA) operating in the first link, through a second STA operating in the second link, and reset a medium sync delay timer for application of a medium sync delay of the second STA on the basis of the received frame when the medium sync delay timer is not "0".

12 Claims, 34 Drawing Sheets

(30) Foreign Application Priority Data

| Aug. 6, 2021 | (KR) | ......................... | 10-2021-0103938 |
| Nov. 18, 2021 | (KR) | ......................... | 10-2021-0159671 |
| Apr. 1, 2022 | (KR) | ......................... | 10-2022-0041391 |

(56) References Cited

U.S. PATENT DOCUMENTS

| 2022/0408508 A1 | 12/2022 | Chu et al. |
| 2023/0043667 A1 | 2/2023 | Ghosh et al. |

FOREIGN PATENT DOCUMENTS

| KR | 10-1656999 | 9/2016 |
| WO | 2022/265479 | 12/2022 |
| WO | 2023/277492 | 1/2023 |

OTHER PUBLICATIONS

Written Opinion of the International Searching Authority for PCT/KR2022/008730 dated Oct. 4, 2022 and its English translation by Google Translate (now published as WO2022/265479).

Naribole, Sharan et al.: "Non-STR Blindness: Non-zero NAV on Blind Link Discussion", doc.: IEEE 802.11-20/1263r2, Nov. 30, 2020, slides 1-14.

Naribole, Sharan et al.: "Multi-link Channel Access Discussion", doc.: IEEE 802.11-19/1405r7, Nov. 13, 2019, slides 1-18.

LAN/MAN Standards Committee of the IEEE Computer Society.: "IEEE P802.11be™/D1.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 8: Enhancements for extremely high throughput (EHT)", doc.: IEEE P802.11be™/D1.0, May 2021, pp. 1-635.

Das, Dibakar et al.: "Remaining CR for 35.3.15.8.1 and others", doc.: IEEE 802.11-21/1825r1, Nov. 8, 2021, pp. 1-15.

Park, Minyoung: "CC36 Comment Resolution—EMLSR loss of medium sync", doc.: IEEE 802.11-21/1484r6, Jan. 12, 2022, pp. 1-4.

Das, Dibakar et al.: "CC36-CR for 35.3.15.7", doc.: IEEE 802.11-21/1339r3, Aug. 24, 2021, pp. 1-17.

Au, Edward et al.: "IEEE 802.11be CC36 comments", doc.: IEEE 802.11-21/1018r0, Jun. 28, 2021, pp. 1-1498.

Park, Minyoung: "CC36 Comment Resolution for EMLSR—Part 2", doc.: IEEE 802.11-21/287r9, Aug. 31, 2021, pp. 1-8.

* cited by examiner

FIG. 16

(a) Trigger frame format

| Frame Control | Duration | RA | TA | Common Info | User Info List | Padding | FCS |
|---|---|---|---|---|---|---|---|
| 2 | 2 | 6 | 6 | 8 or more | variable | variable | 4 |

Octets:

(b) Common Info field

| B0 B3 | B4 B15 | B16 | B17 | B18 B19 | B20 B21 | B22 | B23 B25 |
|---|---|---|---|---|---|---|---|
| Trigger Type | UL Length | More TF | CS Required | UL BW | GI And HE-LTF Type | MU-MIMO HE-LTF Mode | Number Of HE-LTF Symbols And Midamble Periodicity |
| 4 | 12 | 1 | 1 | 2 | 2 | 1 | 3 |

Bits:

| B26 B27 | B28 B33 | B34 B35 | B36 | B37 B52 | B53 | B54 B62 |
|---|---|---|---|---|---|---|
| LDPC Extra Symbol Segment | AP Tx Power | Pre-FEC Padding Factor | PE Disambiguity | UL Spatial Reuse | Doppler | UL HE-SIG-A2 Reserved |
| 1 | 6 | 2 | 1 | 16 | 1 | 9 |

Bits:

| B63 | |
|---|---|
| UL STBC | |
| 1 | |

| Reserved | Trigger Dependent Common Info |
|---|---|
| 1 | variable |

Bits:

(c) User Info field

| B0 B11 | B12 B19 | B20 | B21 B24 | B25 | B26 B31 | B32 B38 | B39 |
|---|---|---|---|---|---|---|---|
| AID12 | RU Allocation | UL FEC Coding Type | UL HE-MCS | UL DCM | SS Allocation/ RA-RU Information | UL Target RSSI | Reserved |
| 12 | 8 | 1 | 4 | 1 | 6 | 7 | 1 |

| Trigger Dependent User Info |
|---|
| variable |

Bits:

FIG.17

| AID12 subfield | Description |
|---|---|
| 0 | User info field allocates one or more contiguous RA-RUs for associated STAs |
| 1-2007 | User info field is addressed to an associated STA whose AID is equal to the value in the AID12 subfield |
| 2008-2044 | Reserved |
| 2045 | User info field allocates one or more contiguous RA-RUs for unassociated STAs |
| 2046 | Unallocated RU |
| 2047 | Response to the Trigger frame is transmitted in EHT TB PPDU |
| 2048 | Response to the Trigger frame is transmitted in NEXT TB PPDU |
| 2049-4094 | Reserved |
| 4095 | Start of Padding field |

FIG.18

| HE TRS Control in HE PPDU | HE TB PPDU | NEXT TRS Control in EHT PPDU | EHT TB PPDU | NEXT TRS Control in NEXT PPDU | NEXT TB PPDU |

FIG.20
(a) Case 1: No end time alignment
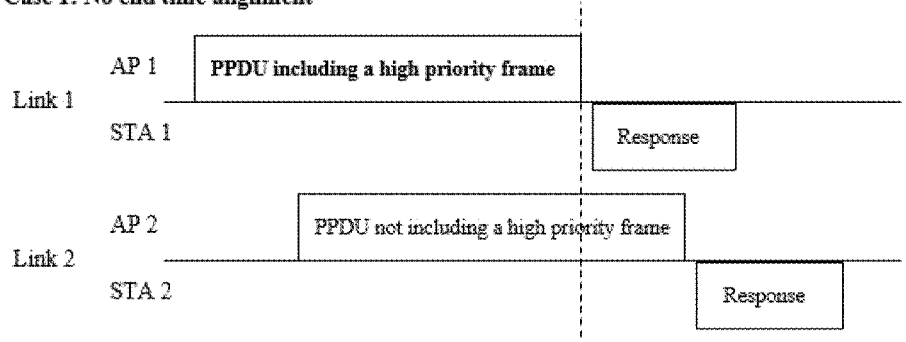
(b) Case 2: No end time alignment
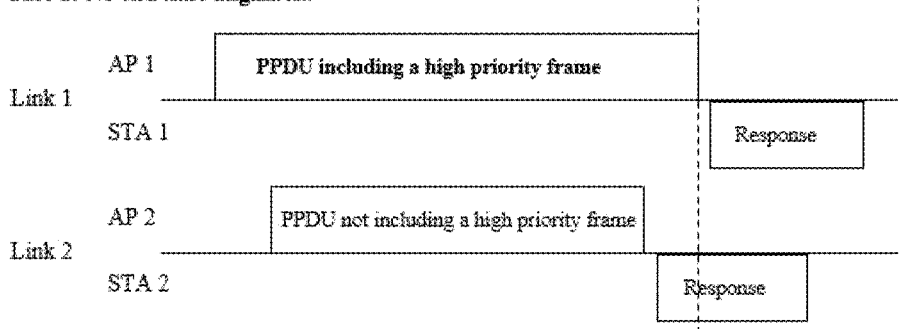
(c) Case 3: End time alignment
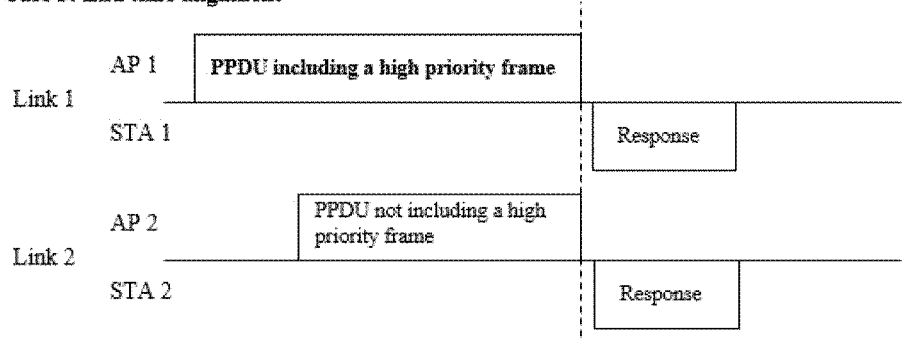

FIG.26

| Medium Synchronization OFDM ED Threshold subfield value | Description |
|---|---|
| 0 | -82 dBm |
| 1 | -80 dBm |
| 2 | -78 dBm |
| 3 | -76 dBm |
| 4 | -74 dBm |
| 5 | -72 dBm |
| 6 | -71 dBm |
| 7 | -70 dBm |
| 8 | -69 dBm |
| 9 | -68 dBm |
| 10 | -67 dBm |
| 11 | -66 dBm |
| 12 | -65 dBm |
| 13 | -64 dBm |
| 14 | -63 dBm |
| 15 | -62 dBm |

WIRELESS COMMUNICATION METHOD USING MULTILINK, AND WIRELESS COMMUNICATION TERMINAL USING SAME

CROSS-REFERENCE TO RELATED APPLICATIONS

This application is a continuation of International Patent Application No. PCT/KR2022/008730 filed on Jun. 20, 2022, which claims the priority to Korean Patent Application No. 10-2021-0079667 filed in the Korean Intellectual Property Office on Jun. 19, 2021, Korean Patent Application No. 10-2021-0082262 filed in the Korean Intellectual Property Office on Jun. 24, 2021, Korean Patent Application No. 10-2021-0103938 filed in the Korean Intellectual Property Office on Aug. 6, 2021, Korean Patent Application No. 10-2021-0159671 filed in the Korean Intellectual Property Office on Nov. 18, 2021, and Korean Patent Application No. 10-2022-0041391 filed in the Korean Intellectual Property Office on Apr. 1, 2022, the entire contents of which are incorporated herein by reference.

TECHNICAL FIELD

The present invention relates to a wireless communication method using multiple links, and a wireless communication terminal using the same.

BACKGROUND ART technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.11ac and 802.11ad, the IEEE 802.11ax (high efficiency WLAN, HEW) standard for providing a high-efficiency and high-performance wireless LAN communication technology in a high-density environment, in which APs and terminals are concentrated, is in the development completion stage. In an 802.11ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band.

DISCLOSURE OF INVENTION

Technical Problem

An embodiment of the present invention is to provide a wireless communication method using multiple links, and a wireless communication terminal using the same.

In addition, an embodiment of the present invention is to provide a method for sync recovery of a station using multiple links.

Technical tasks to be achieved in the specification are not limited to the technical tasks mentioned above, and other technical tasks that are not mentioned may be clearly understood by those skilled in the art on the basis of the following descriptions.

Solution to Problem

A multi-link device (MLD) including multiple stations operating in multiple links including a first link and a second link includes a processor, wherein the processor receives a frame transmitted from one of one or more stations (STAs) through a second STA operating in the second link, resets a medium sync delay timer for application of a medium sync delay of the second STA on the basis of the received frame when the medium sync delay timer is not "0", the medium sync delay indicates an interval for limiting data transmission or reception through the second link after data transmission or reception of the first STA through the first link, and the medium sync delay timer is reset when the frame corresponds to a frame for a valid MPDU, remaining after excluding a request-to-send (RTS) frame.

In addition, in the present invention, the first link and the second link correspond to a pair of non-simultaneous transmission and reception links not supporting simultaneous transmission or reception in an identical MLD since transmission or reception in one of the links causes interference to the other link.

In addition, in the present invention, the medium sync delay timer starts at a time point at which transmission in the first link ends.

In addition, in the present invention, when the MLD is operated as a single radio, the medium sync delay timer starts at a time point after a specific delay time from a time point at which transmission in the first link ends.

In addition, in the present invention, the specific delay time corresponds to a delay time for link switching.

In addition, in the present invention, the medium sync delay timer is reset when the frame corresponds to a frame transmitted from an AP associated with the second STA or an AP included in a multi-BSSID set identical to that of the associated AP.

Advantageous Effects of Invention

An embodiment of the present invention provides a wireless communication method efficiently using multiple links, and a wireless communication terminal using the same.

The effects obtainable in the present invention are not limited to the above-mentioned effects, and other effects that are not mentioned may be clearly understood by those skilled in the art to which the present invention belongs, from descriptions below.

BRIEF DESCRIPTION OF DRAWINGS

FIG. 16 illustrates a trigger frame format according to an embodiment of the present invention.

FIG. 17 illustrates a method for indicating a trigger-based PPDU format according to an embodiment of the present invention.

FIG. 18 illustrates an example of a UL MU operation according to an embodiment of the present invention.

FIG. 20 illustrates another example of end time alignment of a high priority frame according to an embodiment of the present invention.

FIG. 26 illustrates an example of medium synchronization OFDM ED threshold subfield encoding according to an embodiment of the present invention.

BEST MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

Hereinafter, in the present invention, a field and a subfield may be interchangeably used.

Figure 1:
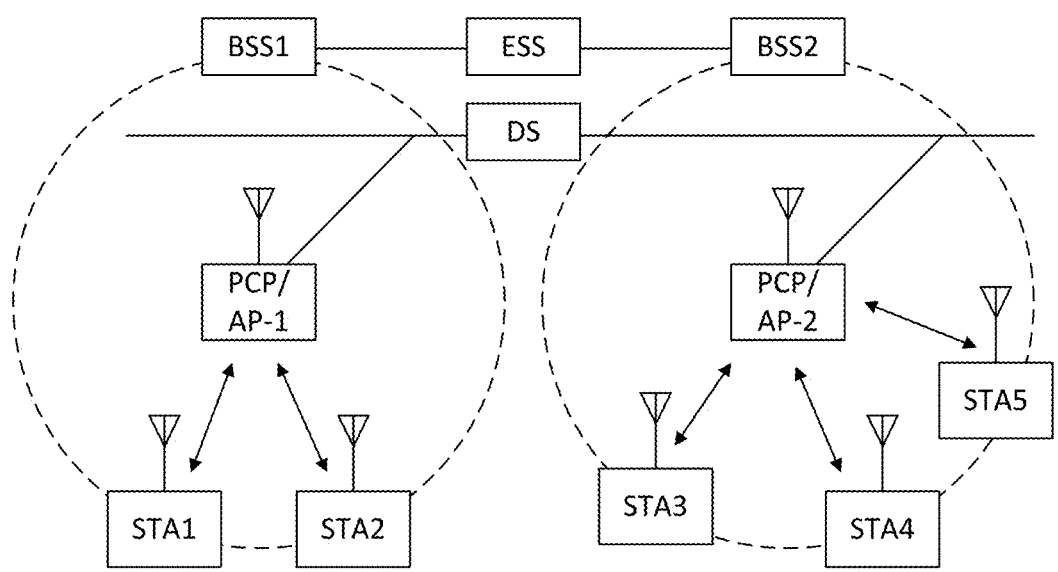
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms.

A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
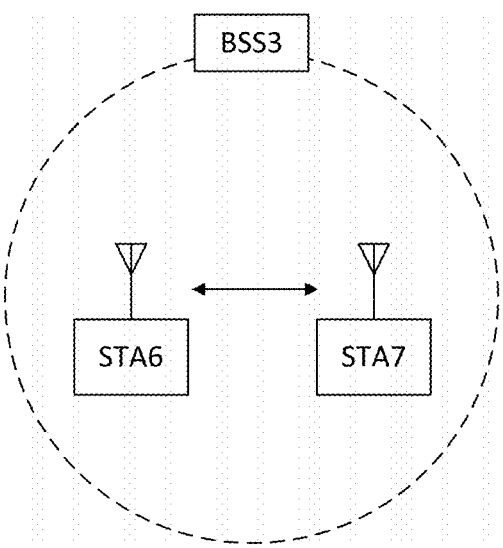
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
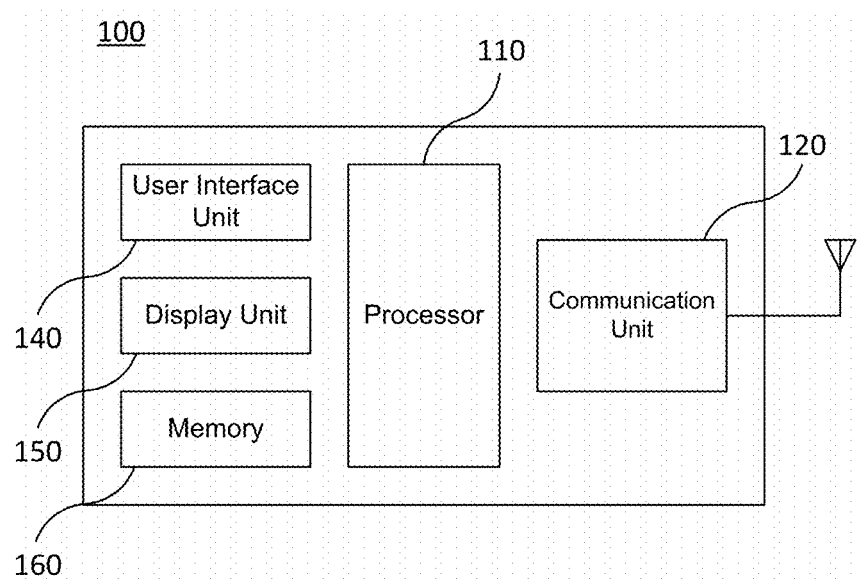
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, 6 GHz and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
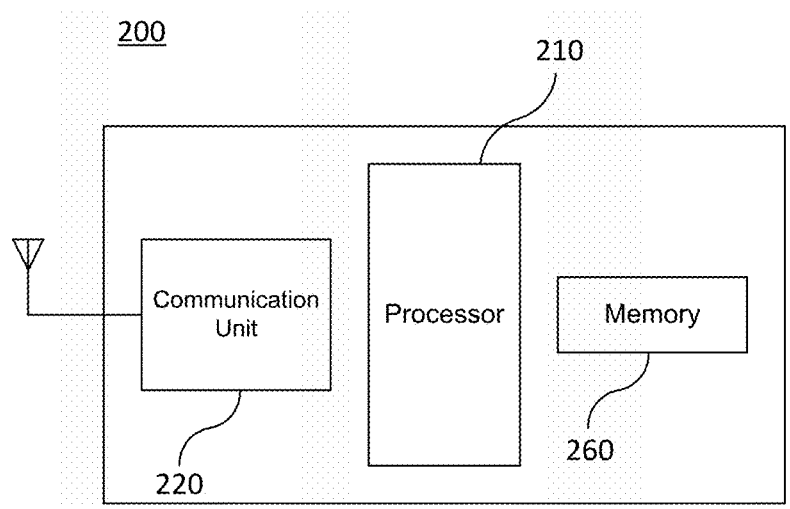
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, 6 GHz and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
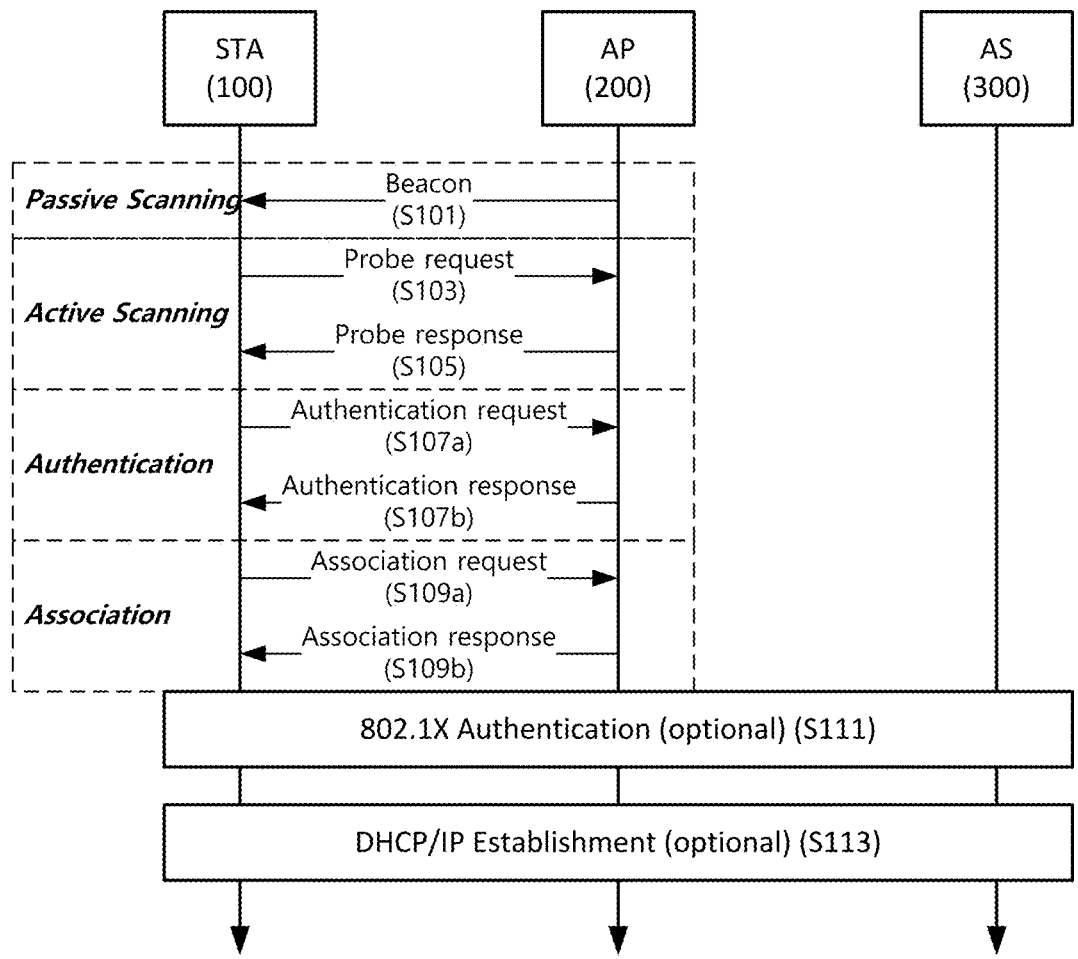
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
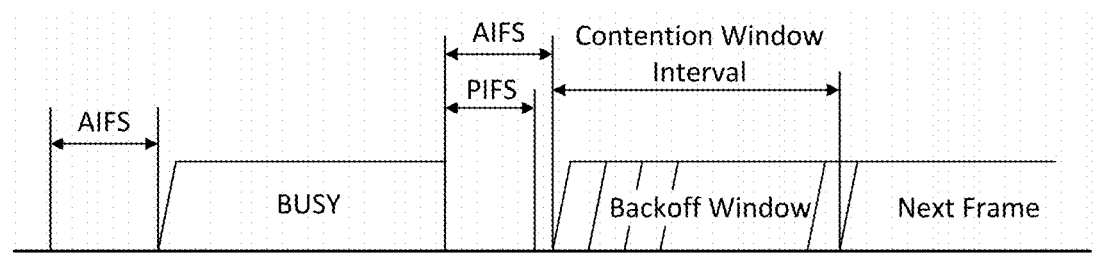
FIG. 6 illustrates a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Hereinafter, in the present invention, a terminal may be referred to as a non-AP STA, an AP STA, an AP, an STA, a reception device, or a transmission device, and the present invention is not limited thereto. In addition, in the present invention, an AP STA may be referred to as an AP.

<Examples of Various PPDU Formats>

Figure 7:
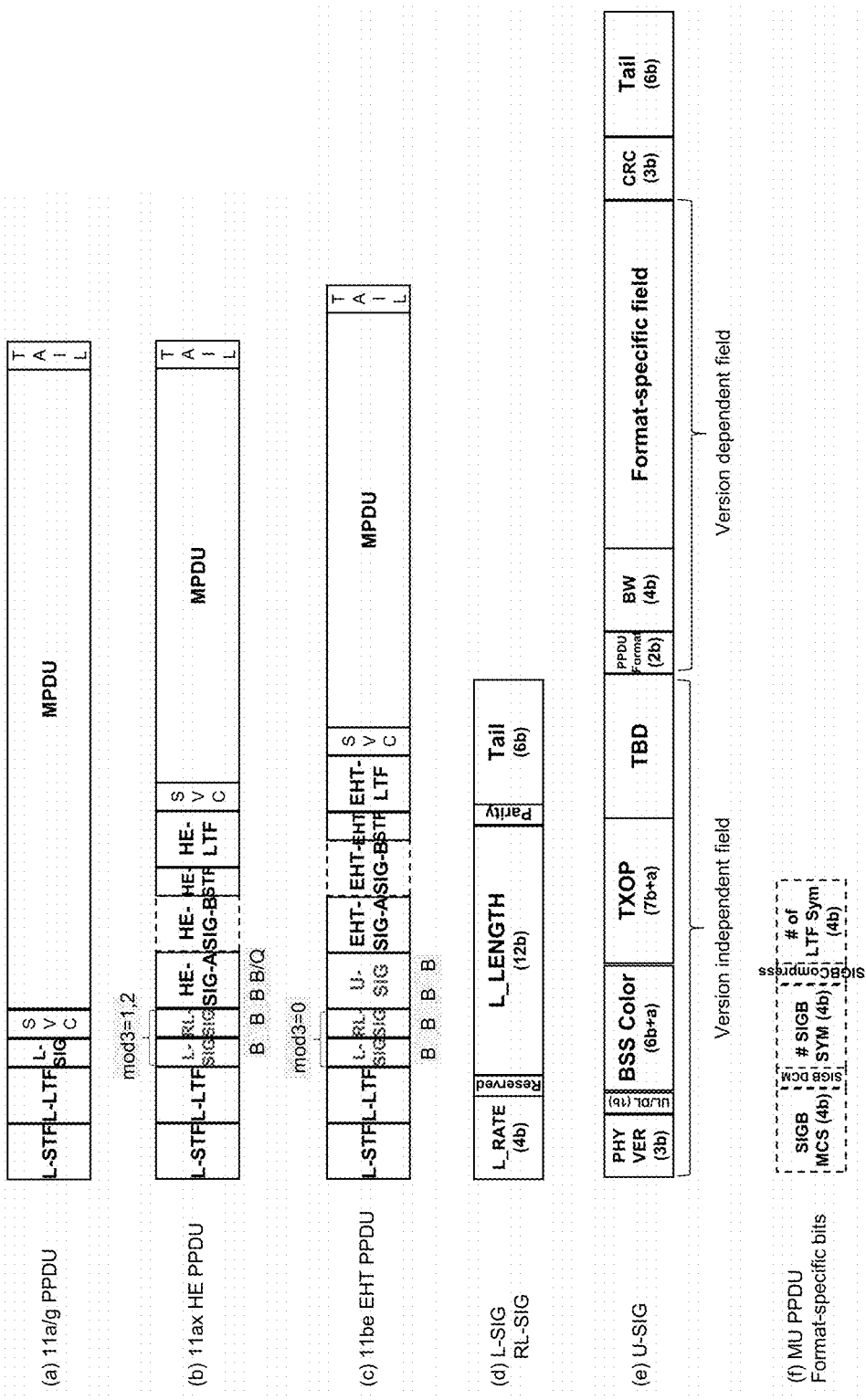
FIG. 7 illustrates an example of a format of a PLCP Protocol data unit (PPDU) for each of various standard generations.

FIG. 7 illustrates an example of a format of a PLCP Protocol data unit (PPDU) for each of various standard generations. More specifically, FIG. 7(a) illustrates an embodiment of a legacy PPDU format based on 802.11a/g, FIG. 7(b) illustrates an embodiment of an HE PPDU format based on 802.11ax, and FIG. 7(c) illustrates an embodiment of a non-legacy PPDU (i.e., EHT PPDU) format based on 802.11be. FIG. 7(d) illustrates detailed field configurations of RL-SIG and L-SIG commonly used in the PPDU formats.

Referring to FIG. 7(a), a preamble of the legacy PPDU includes a legacy short training field (L-STF), a legacy long training field (L-LTF), and a legacy signal field (L-SIG). In an embodiment of the present invention, the L-STF, the L-LTF, and the L-SIG may be referred to as a legacy preamble.

Referring to FIG. 7(b), a preamble of the HE PPDU additionally includes, in the legacy preamble, a repeated legacy short training field (RL-SIG), a high efficiency signal A field (HE-SIG-A), a high efficiency signal B field (HE-SIG-B), a high efficiency short training field (HE-STF), and a high efficiency long training field (HE-LTF). In an embodiment of the present invention, the RL-SIG, HE-SIG-A, the HE-SIG-B, the HE-STF and the HE-LTF may be referred to as an HE preamble. A specific configuration of the HE preamble may be modified according to an HE PPDU format. For example, HE-SIG-B may be used only in an HE MU PPDU format.

Referring to FIG. 7(c), a preamble of the EHT PPDU additionally includes, in the legacy preamble, a repeated legacy short training field (RL-SIG), a universal signal field (U-SIG), and an extremely high throughput signal A field (EHT-SIG-A), an extremely high throughput signal B field (EHT-SIG-B), an extremely high throughput short training field (EHT-STF), and an extremely high throughput long training field (EHT-LTF). In an embodiment of the present invention, the RL-SIG, EHT-SIG-A, the EHT-SIG-B, the EHT-STF and the EHT-LTF may be referred to as an EHT preamble. A specific configuration of a non-legacy preamble may be modified according to an EHT PPDU format. For example, EHT-SIG-A and EHT-SIG-B may be used only in a part of the EHT PPDU format.

64-FFT OFDM is applied in an L-SIG field included in the preamble of the PPDU, and the L-SIG field includes a total of 64 subcarriers. Among 64 subcarriers, 48 subcarriers excluding a guard subcarrier, a DC subcarrier, and a pilot subcarrier are used for transmission of L-SIG data. BPSK and a modulation and coding scheme (MCS) of rate=1/2 are applied in L-SIG, and therefore the L-SIG may include a total of 24 bits of information. FIG. 7(d) illustrates a 24-bit information configuration of L-SIG.

Referring to FIG. 7(d), the L-SIG includes an L_RATE field and an L_LENGTH field. The L_RATE field includes 4 bits and indicates an MCS used for data transmission. Specifically, the L_RATE field indicates one value among transmission rates of 6/9/12/18/24136/48/54 Mbps obtained by combining a modulation scheme of BPSK/QPSK/16-QAM/64-QAM, etc. and an inefficiency of ½, ⅔, ¾, etc. A total length of a corresponding PPDU may be indicated by combining information of the L_RATE field and information of the L_LENGTH field. In a non-legacy PPDU format, the L_RATE field is configured to a minimum rate of 6 Mbps.

A unit of an L_LENGTH field is a byte, and a total of 12 bits may be allocated and signaling can be performed up to 4095. The length of the corresponding PPDU may be indicated by a combination of the L_LENGTH field and an L_RATE field. In this case, a legacy terminal and a non-legacy terminal may interpret the L_LENGTH field in different methods.

First, a method for interpreting the length of the corresponding PPDU by the legacy terminal or the non-legacy terminal by using the L_LENGTH field is as follows. When a value of the L_RATE field is configured to indicate 6 Mbps, three bytes (i.e., 24 bits) may be transmitted during 4 us corresponding to a 64 FFT symbol duration. Accordingly, the number of 64 FFT reference symbols after the L-SIG is acquired by adding three bytes corresponding to the SVC field and the tail field to the value of the L_LENGTH field and then dividing the same by three bytes corresponding to a transmission amount of one symbol. The length of the corresponding PPDU, i.e., a reception time (RXTIME) is acquired by multiplying the acquired number of symbols by 4 us corresponding to one symbol duration and then adding 20 us corresponding to a time required to transmit the L-STF, the L-LTF, and the L-SIG. This is represented as shown in equation 1 below.

$$RXTIME(us) = \left(\left\lceil \frac{L\_LENGTH + 3}{3} \right\rceil\right) \times 4 + 20 \qquad \text{[Equation 1]}$$

In this case, denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$L\_LENGTH(byte) = \left(\left\lceil \frac{TXTIME - 20}{4} \right\rceil\right) \times 3 - 3 \qquad \text{[Equation 2]}$$

Herein, TXTIME is the total transmission time constituting the corresponding PPDU, and is expressed by Equation 3 below. In this case, TX represents the transmission time of X.

$$TXTIME(us) = T_{L-STF} + T_{L-LTF} + T_{L-SIG} + T_{RL-SIG} + T_{U-SIG} + (T_{EHT-SIG-A}) + (T_{EHT-SIG-A}) + T_{EHT-STF} + N_{EHT-LTF} \cdot T_{EHT-LTF} + T_{DATA} \qquad \text{[Equation 3]}$$

Referring to the above equations, the length of the PPDU is calculated based on a rounded up value of L_LENGTH/3. Therefore, for a random value of k, three different values of L_LENGTH={3k+1, 3k+2, 3(k+1)} indicate the same PPDU length.

Referring to FIG. 7(e), a universal SIG (U-SIG) field continues to exist in an EHT PPDU and a WLAN PPDU of a subsequent generation, and serves to classify a generation of a PPDU, which includes 11be. U-SIG is a 64 FFT-based OFDM 2 symbol and may transfer a total of 52 bits of information. In 52 bits, 43 bits excluding 9 bits for CRC/Tail are largely divided into a version independent (VI) field and a version dependent (VD) field.

A VI bit enables a current bit configuration to be maintained even later on, so that even if a PPDU of a subsequent generation is defined, current 11be terminals may obtain information on the PPDU via the VI fields of the PPDU. To this end, the VI field includes PHY version, UL/DL, BSS color, TXOP, and reserved fields. The PHY version field is 3 bits, and serves to sequentially classify 11be and subsequent generation wireless LAN standards into versions. 11be has a value of 000b. The UL/DL field identifies whether the PPDU is an uplink/downlink PPDU. BSS color indicates an identifier for each BSS defined in 11ax, and has a value of 6 bits or more. TXOP indicates transmit opportunity duration transmitted in a MAC header, wherein, by adding the TXOP to a PHY header, the PPDU may infer a length of the TXOP included therein without having to decode an MPDU, and the TXOP has a value of 7 bits or more.

The VD field is signaling information useful only for an 11be version of the PPDU, and may include a field commonly used in any PPDU format, such as PPDU format and BW, and a field defined differently for each PPDU format. The PPDU format is a classifier that classifies EHT single user (SU), EHT multiple user (MU), EHT trigger-based (TB), EHT extended range (ER) PPDU, etc. The BW field signals five basic PPDU BW options (BW, which is expressible in the form of an exponential power of 20*2, may be referred to as basic BW) of 20, 40, 80, 160 (80+80), and 320 (160+160) MHz and various remaining PPDU BWs configured via preamble puncturing. After being signaled at 320 MHz, signaling may be performed in a form in which some 80 MHz is punctured. A punctured and modified channel type may be signaled directly in the BW field, or may be signaled using the BW field with a field (e.g., a field within the EHT-SIG field) appearing after the BW field. If the BW field is configured to 3 bits, a total of 8 BW signaling may be performed, and therefore only up to 3 signaling may be performed in a puncturing mode. If the BW field is configured to 4 bits, a total of 16 BW signaling may be performed, and therefore up to 11 signaling may be performed in the puncturing mode.

A field located after the BW field varies depending on the type and format of the PPDU, an MU PPDU and an SU PPDU may be signaled in the same PPDU format, a field for classification between the MU PPDU and the SU PPDU may be located before an EHT-SIG field, and additional signaling may be performed for the same. Both the SU PPDU and the MU PPDU include the EHT-SIG field, but some fields that are not required in the SU PPDU may be compressed. Information on the field to which the compression has been applied may be omitted or may have a size smaller than a size of an original field included in the MU PPDU. For example, in a case of the SU PPDU, a common field of the EHT-SIG may be omitted or replaced, or the SU PPDU may have a different configuration in which a user specific field is replaced, reduced to one, or the like.

Alternatively, the SU PPDU may further include a compression field indicating whether compression is performed, and a part of field (e.g., RA fields, etc.) may be omitted according to a value of the compressed field.

If a part of the EHT-SIG field of the SU PPDU is compressed, information to be included in the compressed field may be signaled also in an uncompressed field (e.g., the common field, etc.). The MU PPDU corresponds to a PPDU format for concurrent reception by multiple users, and therefore the EHT-SIG field is required to be transmitted subsequently to the U-SIG field, and the amount of signaled information may vary. That is, a plurality of MU PPDUs are transmitted to a plurality of STAs, so that the respective STAs should recognize locations of RUs, at which the MU PPDUs are transmitted, the STAs to which the RUs have been allocated respectively, and whether the transmitted MU PPDUs have been transmitted to the STAs themselves. Therefore, an AP should transmit information described above, by including the same in the EHT-SIG field. To this end, information for efficient transmission of the EHT-SIG field is signaled in the U-SIG field, and this may correspond to an MCS that is a modulation method and/or the number of symbols in the EHT-SIG field. The EHT-SIG field may include information on a size and location of an RU allocated to each user.

In the case of the SU PPDU, a plurality of RUs may be allocated to an STA, and the plurality of RUs may be continuous or discontinuous. If the RUs allocated to the STA are discontinuous, the STA should recognize a punctured RU in the middle in order to efficiently receive the SU PPDU. Accordingly, the AP may transmit the SU PPDU including information (e.g., a puncturing pattern of the RUs, etc.) of punctured RUs among the RUs allocated to the STA. That is, in the case of the SU PPDU, a puncturing mode field, which includes information indicating, in a bitmap format, etc., a puncturing pattern and whether the puncturing mode is applied, may be included in the EHT-SIG field, and the puncturing mode field may signal a discontinuous channel type appearing within a bandwidth.

The signaled discontinuous channel type is limited, and indicates discontinuous channel information and BW of the SU PPDU in combination with a value of the BW field. For example, the SU PPDU is a PPDU transmitted only to a single terminal, so that the STA may recognize a bandwidth allocated to itself via the BW field included in the PPDU, and the SU PPDU may recognize a punctured resource in the allocated bandwidth via the puncturing mode field of the EHT-SIG field or the U-SIG field included in the PPDU. In this case, the terminal may receive the PPDU in resource units remaining after excluding a specific channel of the punctured resource unit. The plurality of RUs allocated to the STA may be configured by different frequency bands or tones.

Only a limited discontinuous channel type is signaled in order to reduce signaling overhead of the SU PPDU. Puncturing may be performed for each 20 MHz sub-channel, so that if puncturing is performed for BW having a large number of 20 MHz sub-channels, such as 80, 160, and 320 MHz, a discontinuous channel (if puncturing of only edge 20 MHz is considered to be discontinuous) type should be signaled in the case of 320 MHz by expressing whether each of 15 20 MHz sub-channels remaining after excluding a primary channel is used. As such, allocating 15 bits to signal a discontinuous channel type of single user transmission may act as excessively large signaling overhead in consideration of a low transmission rate of a signaling part.

The present invention proposes a technique for signaling a discontinuous channel type of an SU PPDU, and illustrates a discontinuous channel type determined according to the proposed technique. The present invention also proposes a technique for signaling each of puncturing types of primary 160 MHz and secondary 160 MHz in a 320 MHz BW configuration of an SU PPDU.

An embodiment of the present invention proposes a technique for differently configuring a PPDU indicated by preamble puncturing BW values according to a PPDU format signaled in a PPDU format field. It is assumed that a BW field is 4 bits, and in a case of an EHT SU PPDU or a TB PPDU, EHT-SIG-A of 1 symbol may be additionally signaled after U-SIG, or EHT-SIG-A may not be signaled at all, so that, in consideration of this, it is necessary to completely signal up to 11 puncturing modes via only the BW field of U-SIG. However, in a case of an EHT MU PPDU, EHT-SIG-B is additionally signaled after U-SIG, so that up to 11 puncturing modes may be signaled in a method different from that of the SU PPDU. In a case of an EHT ER PPDU, a BW field may be configured to 1 bit to signal whether the EHT ER PPDU is a PPDU using a 20 MHz or 10 MHz band.

FIG. 7(f) illustrates a configuration of a format-specific field of a VD field when the EHT MU PPDU is indicated in the PPDU format field of U-SIG. In the case of the MU PPDU, SIG-B, which is a signaling field for concurrent reception by multiple users, is essentially required, and SIG-B may be transmitted without separate SIG-A after U-SIG. To this end, information for decoding of SIG-B should be signaled in U-SIG. These fields include SIG-B MCS, SIG-B DCM, Number of SIG-B Symbols, SIG-B Compression, and Number of EHT-LTF Symbols.

Figure 8:
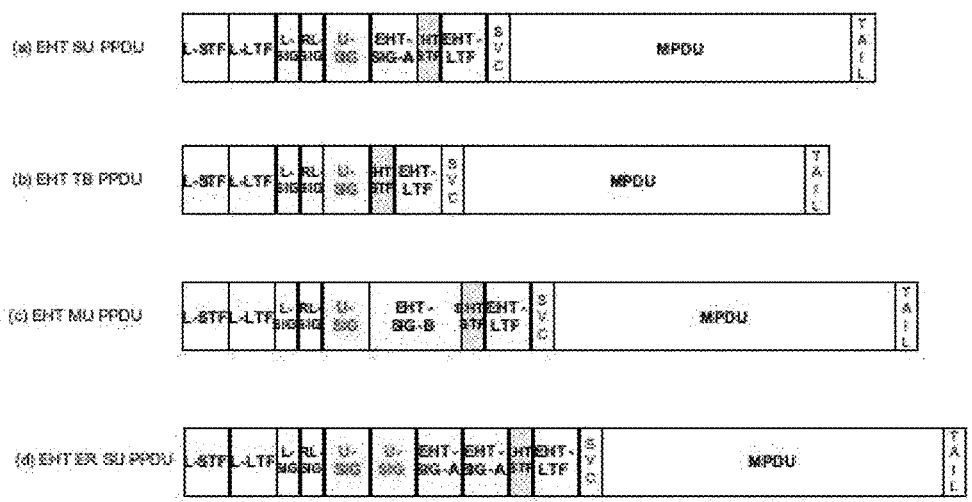
FIG. 8 illustrates an example of various extremely high throughput (EHT) physical protocol data unit (PPDU) formats and a method for indicating the same according to an embodiment of the present invention.

FIG. 8 illustrates an example of various extremely high throughput (EHT) physical protocol data unit (PPDU) formats and a method for indicating the same according to an embodiment of the present invention.

Referring to FIG. 8, a PPDU may include a preamble and a data part, and an EHT PPDU format, that is a PPDU type, may be classified according to a U-SIG field included in the preamble. Specifically, based on a PPDU format field included in the U-SIG field, whether the format of the PPDU is an EHT PPDU may be indicated.

FIG. 8(a) shows an example of an EHT SU PPDU format for a single STA. An EHT SU PPDU is a PPDU used for single user (SU) transmission between an AP and a single STA, and an EHT-SIG-A field for additional signaling may be located after the U-SIG field.

FIG. 8(b) shows an example of an EHT trigger-based PPDU format which corresponds to an EHT PPDU transmitted based on a trigger frame. An EHT Trigger-based PPDU is an EHT PPDU transmitted based on a trigger frame and is an uplink PPDU used for a response to the trigger frame. Unlike in the EHT SU PPDU, an EHT-SIG-A field is not located after a U-SIG field in the EHT PPDU.

FIG. 8(c) shows an example of an EHT MU PPDU format which corresponds to an EHT PPDU for multiple users. An EHT MU PPDU is a PPDU used to transmit the PPDU to one or more STAs. In the EHT MU PPDU format, an HE-SIG-B field may be located after a U-SIG field.

FIG. 8(d) shows an example of an EHT ER SU PPDU format used for single user transmission with an STA in an extended range. An EHT ER SU PPDU may be used for single user transmission with an STA of a wider range compared to the EHT SU PPDU described in FIG. 8(a), and a U-SIG field may be repeatedly located on a time axis.

The EHT MU PPDU described in FIG. 8(c) may be used by an AP to perform downlink transmission to a plurality of STAs. Here, the EHT MU PPDU may include scheduling information so that the plurality of STAs may concurrently receive the PPDU transmitted from the AP. The EHT MU PPDU may transfer, to the STAs, AID information of a transmitter and/or a receiver of the PPDU transmitted via a user specific field of EHT-SIG-B. Accordingly, the plurality of terminals having received the EHT MU PPDU may perform a spatial reuse operation based on the AID information of the user specific field included in a preamble of the received PPDU.

Specifically, a resource unit allocation (RA) field of the HE-SIG-B field included in the HE MU PPDU may include information on a configuration of a resource unit (e.g., a division form of the resource unit) in a specific bandwidth (e.g., 20 MHz, etc.) of a frequency axis. That is, the RA field may indicate configurations of resource units segmented in a bandwidth for transmission of the HE MU PPDU, in order for the STA to receive the PPDU. Information on the STA allocated (or designated) to each segmented resource unit may be included in the user specific field of EHT-SIG-B so as to be transmitted to the STA. That is, the user specific field may include one or more user fields corresponding to the respective segmented resource units.

For example, a user field corresponding to at least one resource unit used for data transmission among the plurality of segmented resource units may include an AID of a receiver or a transmitter, and a user field corresponding to the remaining resource unit(s) which is not used for data transmission may include a preconfigured null STA ID.

Two or more PPDUs illustrated in FIG. 8 may be indicated by a value indicating the same PPDU format. That is, two or more PPDUs may be indicated by the same PPDU frame by using the same value. For example, the EHT SU PPDU and the EHT MU PPDU may be indicated by the same value through the U-SIG PPDU format subfield. In this case, the EHT SUP PPDU and the EHT MU PPDU may be distinguished by the number of STAs receiving PPDUs. For example, a PPDU receiving only one STA may be identified as the EHT SU PPDU, and when the number of STAs is configured so that two or more STAs are received, the PPDU may be indicated as the EHT MU PPDU. In other words, values of the two or more PPDUs illustrated in FIG. 8 may be indicated through the same subfield value.

In addition, among the fields illustrated in FIG. 8, a part of the fields or part of information of the field may be omitted, and such a case where a part of the fields or part of information of the field is omitted may be defined as a compression mode or a compressed mode.

Figure 9:
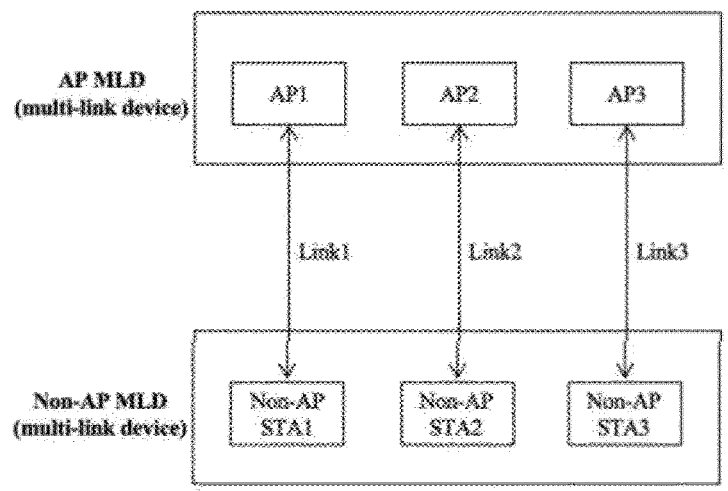
FIG. 9 illustrates a multi-link device according to an embodiment of the present invention.

FIG. 9 illustrates a multi-link device according to an embodiment of the present invention.

Referring to FIG. 9, the concept of a device affiliated with one or more STAs may be defined. As another embodiment, according to an embodiment of the present invention, devices affiliated with more than one STA (i.e., two or more STAs) may be defined. In this case, the device may be a logical concept. Accordingly, the devices having such a concept and affiliated with one or more STAs or more than one STA may be referred to as a multi-link device (MLD), a multi-band device, or a multi-link logical entity (MLLE).

Alternatively, the devices having such a concept may be referred to as a multi-link entity (MLE). In addition, an MLD may have a medium access control service access point (MAC SAP) up to a logical link control (LLC) layer, and the MLD may have a MAC data service.

STAs included in the MLD may operate in one or more links or channels. That is, the STAs included in the MLD may operate in multiple different channels. For example, the STAs included in the MLD may operate by using channels in different frequency bands such as 2.4 GHz, 5 GHz, and 6 GHz. Accordingly, the MLD may acquire a gain in channel access, and increase performance of the entire network. The convention wireless LAN operates in a single link, but through MLD operation, more channel access opportunities may be acquired by using multiple links, or an STA may efficiently operate in multiple links in consideration of a channel condition.

In addition, when the STAs affiliated with the MLD correspond to an AP, the MLD affiliated with the APs may be an AP MLD. However, when the STAs affiliated with the MLD is a non-AP STA, the MLD affiliated with the non-APs may be a non-AP MLD.

In addition, an AP MLD may be a device including one or more wireless access points, and may be a device connected to a higher layer through one interface. That is, the AP MLD may be connected to a logical link control (LLC) layer through one interface. Multiple APs included in the AP MLD may share some functions in a MAC layer. Each AP in the AP MLD may operate in different links. The STA MLD may be a device including one or more non-AP STAs, and may be a device connected to a higher layer through one interface.

That is, the STA MLD may be connected to an LLC layer through one interface. Multiple STAs included in the STA MLD may share some functions in the MAC layer. In addition, the STA MLD may be referred to as a non-AP MLD. In this case, the AP MLD and the STA MLD may operate a multi-link operation performing communication by using multiple individual links. That is, when the AP MLD includes multiple APs, each of the APs may configure a separate link and operate a frame transmission or reception operation with each terminal included the STA MLD by using multiple links. In this case, each link may operate in 2.4 GHz, 5 GHz, or a 6 GHz band, and a bandwidth extension operation may be performed in each link. For example, when the AP MLD configures one link in the 2.4 GHz band and two links in the 5 GHz band, in the 2.4 GHz band, frame transmission may be performed with a 40 MHz through the bandwidth extension scheme, and in each link using the 5 GHz band, frame transmission may be performed with the maximum 320 MHz bandwidth by utilizing inconsecutive bandwidths.

With respect to the AP MLD or the STA MLD, while one terminal in the MLD performs a transmission operation due to an interference problem in the device, another terminal may fail to perform a reception operation. An operation in which one AP or terminal in an MLD performs a transmission operation while another AP or a terminal in the MLD performs a reception operation may be referred to as simultaneous transmission and reception (STR). The AP MLD may perform an STR operation for all links. Alternatively, in some links of the AP MLD, the STR operation may not be performed. A terminal MLD capable of performing the STR operation may be associated with the AP MLD, and an MLD not capable of performing the STR operation for some or all links may be associated with the AP MLD. In addition, a terminal (for example, IEEE 802.11a/b/g/n/ac/ax terminal) not belonging to the MLD may be additionally associated with the AP included in the AP MLD.

The AP MLD and the STA MLD may perform a negotiation process for a multi-link usage operation during the scanning and associated processes described in FIG. 5 above. For example, in the scanning process described in FIG. 5, the AP included in the AP MLD may transmit a beacon frame including an indicator indicating that a multi-link operation is available, the number of available links, and information on multiple available links. Alternatively, the terminal belonging to the STA MLD may transmit a probe request frame including an indicator indicating that a multi-link operation is available, and an AP belonging to the AP MLD may transmit a probe response frame including an indicator indicating that a multi-link operation is available. In this case, the AP may additionally include the number of available links in the multi-link operation, link information, and the like, and transmit the same.

In the scanning process, the STA MLD having identified whether the multi-link operation of the AP MLD is performed and the available link information may perform the association process with the AP MLD. In this case, the AP MLD and the STA MLD may start a negotiation process for the multi-link operation. In this case, the negotiation operation for the multi-link operation may be performed in the association process between the AP belonging to the AP MLD and the terminal belonging to the STA MLD. That is, while transmitting an association request frame to an AP (for example, AP1) belonging to the AP MLD, a terminal (for example, STA1) belonging to the STA MLD may transmit an indicator indicating that the multi-link operation of the terminal is available and a request indicator for requesting performing of the multi-link operation. The AP having received the association request frame from the terminal may identify an indicator for requesting the multi-link operation, and when the AP may perform the multi-link operation, the AP may transmit, to the corresponding terminal, an association response frame including link information such as a link to be used for the multi-link operation and a parameter used in each link, and allowing the multi-link operation. The parameter for the multi-link operation may include one or more of a band of each link to be used, a bandwidth extension direction, a target beacon transmission time (TBTT), and whether the STR operation is performed. The AP MLD and the STA MLD, for which the use of the multi-link operation is identified through exchanging of the association request frame and the response frame, may perform a frame transmission operation using multiple links by using serval terminals included in the STA MLD and several APs included in the AP MLD after the corresponding association process.

Referring to FIG. 9, there may be an MLD including multiple STAs, and the multiple STAs included in the MLD may operate in multiple links. In FIG. 9, the MLD including AP1, AP2, and AP3 corresponding APs, may be referred to as an AP MLD, and an MLD including non-AP STA1, non-AP STA2, and non-AP STA3 corresponding to non-AP STAs, may be referred to as a non-AP MLD. STAs included in the MLD may operate in link 1 (Link1), link 2 (Link2), link 3 (Link3), or some of links 1 to 3.

According to an embodiment of the present invention, the multi-link operation may include a multi-link setup operation. The multi-link setup operation may be an operation corresponding to an association performed in a single-link operation. For exchanging frames in the multiple links, a multi-link setup needs to be performed first. The multi-link setup operation may be performed by using a multi-link setup element. Here, the multi-link setup element may include capability information related to the multiple links, and the capability information may include information related to whether an STA included in the MLD receives a frame receives a frame through one link while another STA included in the MLD transmits a frame through another link. That is, the capability information may include information related to whether STAs (non-AP STAs) and/or APs (or AP STAs) can simultaneously transmit/receive a frame in different transmission directions through links included in the MLD. In addition, the capability information may further include information related to an available link or an operating channel. The multi-link setup may be configured through a negotiation between peer STAs, and the multi-link operation may be configured through one link.

According to an embodiment of the present invention, there may be a mapping relationship between a TID and a link of the MLD. For example, when the TID and the link are mapped to each other, the TID may be transmitted through the mapped link. The mapping between the TID and the link may be directional-based mapping. For example, the mapping may be performed for each of both directions between MLD1 and MLD2. In addition, in the mapping between the TID and the link, there may be a default setup. For example, the mapping between the TID and the link may normally indicate mapping between a link and all TIDs.

Figure 10:
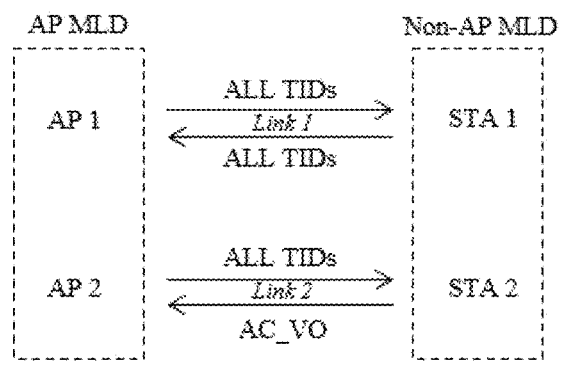
FIG. 10 illustrates an example of a TID-to-link mapping method according to an embodiment of the present invention.

FIG. 10 illustrates an example of a TID-to-link mapping method according to an embodiment of the present invention.

Referring to FIG. 10, as described in FIG. 9, there may be a mapping relationship between a TID and a link. In addition, in the present invention, the mapping relationship between the TID and the link may be referred to as TID-to-link mapping, TID to link mapping, TID mapping, link mapping, etc. The TID may indicate a traffic identifier. In addition, the TID may be an identifier (ID) for classifying traffic, data, etc. to support quality of service (QoS).

In addition, the TID may be an ID used in or allocated to a layer higher than the MAC layer. The TID may indicate traffic categories (TCs) and traffic streams (TSs). In addition, the TID may have 16 values, and for example, may be indicated by one of values from 0 to 15. In addition, different TID values may be used according to an access policy or a channel access or medium access method. For example, a possible TID value when enhanced distributed channel access (EDCA) (hybrid coordination function (HCF) contention-based channel access) is used, may be 0 to 7. In addition, when the EDCA is used, a TID value may indicate a user priority (UP), and the UP may be related to a TC or a TS. In addition, the UP may have a value allocated in a layer higher than the MAC layer. In addition, when HCF controlled channel access (HCCA) or SPCA is used, a possible TID value may be 8 to 15. In addition, when the HCCA or SPCA is used, the TID may indicate a TSID. In addition, when HEMM or SEMM is used, a possible TID value may be 8 to 15. In addition, when the HEMM or SEMM is used, the TID may indicate the TSID.

In addition, there may be a mapping relationship between the UP and an access category (AC). The AC may be a label for providing the QoS in the EDCA, or a label indicating a set of EDCA parameters. An EDCA parameter or a set of EDCA parameters may be used for channel association. The AC may be used by a QoS STA.

A value of the AC may be configured by one of AC_BK, AC_BE, AC_VI, and AC_VO. The AC_BK, AC_BE, AC_VI, and AC_VO may indicate a background, a best effort, a video, and a voice, respectively. In addition, the AC_BK, AC_BE, AC_VI, and AC_VO may be subdivided. For example, AC_VI may be divided into AC_VI primary and AC_VI alternate. In addition, AC_VO may be divided into AC_VO primary and AC_VO alternate. In addition, a UP value or a TID value may be mapped to an AC value. For example, 1, 2, 0, 3, 4, 5, 6, and 7 of the UP value or the TID value may be mapped to AC_BK, AC_BK, AC_BE, AC_BE, AC_VI, AC_VI, AC_VO, and AC_VO, respectively. Alternatively, 1, 2, 0, 3, 4, 5, 6, and 7 of the UP value or the TID value may be mapped to AC_BK, AC_BK, AC_BE, AC_BE, AC_VI alternate, AC_VI primary, AC_VO primary, and AC_VO alternate, respectively. In addition, 1, 2, 0, 3, 4, 5, 6, and 7 of the UP value or the TID value may have higher priorities in order. That is, 1 may have a lower priority, and 7 may have a higher priority. Accordingly, the priorities of AC_BK, AC_BE, AC_VI, and AC_VO may increase in order. In addition, AC_BK, AC_BE, AC_VI, and AC_VO may correspond to AC index (ACI) 0, 1, 2, and 3, respectively.

Accordingly, there may be a relation between the TID and the AC. Accordingly, the TID-to-link mapping in the present invention may be a mapping relationship between the AC and the link. In addition, in the present invention, mapping of the TID may correspond to mapping of the AC, and vice versa.

According to an embodiment of the present invention, there may be a TID mapped to each link of multiple links. For example, there may be mapping relating to a link among the multiple links, in which a specific TID or a specific AC is allowed to perform transmission or reception. In addition, such mapping may be defined separately for each of the opposite directions of the link. In addition, as described above, in the mapping between the TID and the link, there may be a default setup. For example, the mapping between the TID and the link normally indicates mapping between a link to all TIDs. In addition, according to an embodiment, a specific time point, a TID or an AC may be mapped to at least one link. In addition, a management frame or a control frame may be transmitted in all links.

In the present invention, a data frame corresponding to a TID or an AC mapped for a direction of a link may be transmitted. In addition, a data frame corresponding to a TID or an AC not mapped to a direction of a link may not be transmitted.

According to an embodiment, the TID-to-link mapping may be also applied to an acknowledgment. For example, a block ack agreement may be based on the TID-to-link mapping. Alternatively, the TID-to-link mapping may be based on the block ack agreement. For example, there may be a block ack agreement for the TID for which the TID-to-link mapping is performed.

Through the TID-to-link mapping, the QoS service can be provided. For example, by mapping an AC or a TID having a higher priority to a link in a good channel state or having a smaller number of STAs, data of the corresponding AC or TID may be promptly transmitted. Alternatively, the TID-to-link mapping may be performed so that an STA of a specific link can save power (enter a doze state).

Referring to FIG. 10, there may be an AP MLD including AP 1 and AP 2. In addition, there may be a non-AP MLD including STA 1 and STA 2. In addition, multiple links, Link 1 and Link 2, may be in present in the AP MLD. AP 1 and STA 1 may be associated through Link 1, and AP 2 and STA 2 may be associated through Link 2.

Accordingly, Link 1 may include a link for transmission from AP 1 to STA 1 and/or a link for transmission from STA 1 to AP 1, and Link 2 may include a link for transmission from AP 2 to STA 2 and/or a link for transmission from STA 2 to AP 2. In this case, each link may be mapped to a TID and/or an AC.

For example, all TIDs and all ACs may be mapped to a link for transmission from AP 1 to STA 1 in Link 1, and a link for transmission from STA 1 to AP 1 in Link 1. In addition, only a TID corresponding to AC_VO or AC_VO may be mapped to a link for transmission from STA 2 to AP 2 in Link 2. In addition, only data of the mapped TID and/or AC may be transmitted through the corresponding link. In addition, data of a TID or AC not mapped to a link cannot be transmitted through the corresponding link.

Figure 11:
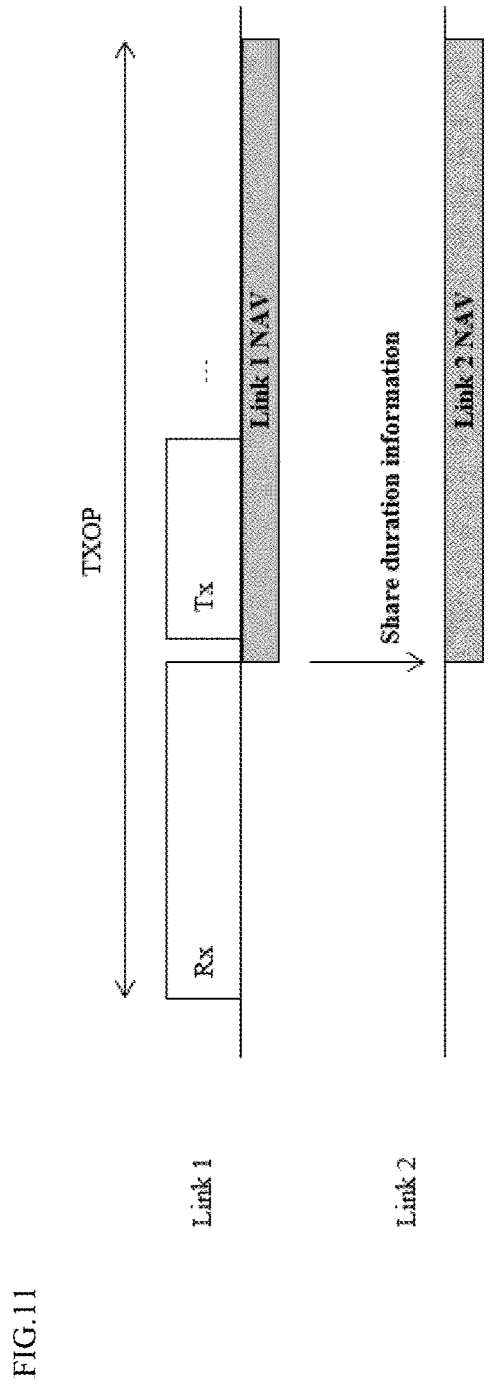
FIG. 11 illustrates an example of a multi-link NAV setup operation according to an embodiment of the present invention.

FIG. 11 illustrates an example of a multi-link NAV setup operation according to an embodiment of the present invention.

An operation in which an MLD performs simultaneous transmission and reception (STR) may be limited, and this may be associated with a frequency interval between multiple links for a multi-link operation.

Accordingly, according to an embodiment of the present invention, when an interval between links is m MHz, simultaneous transmission or reception may be limited, and with respect to n greater than m, when an interval between links is n MHZ, simultaneous transmission or reception may not be limited. This embodiment may be for solving a problem of limitation on the simultaneous transmission or reception, and a redundant description may be omitted. In addition, this embodiment may be applied to an MLD which cannot perform the STR.

According to an embodiment of the present invention, duration information may be shared between links for multi-link operation. In an embodiment, the duration information may be TXOP duration information transmitted in a signaling field of a preamble. The signaling field may be the U-SIG field described above. Alternatively, the signaling field may be the HE-SIG-A field described above. As another embodiment, the duration information may be duration information indicated by a duration ID/field including a MAC header. As another embodiment, the duration information may be duration information indicated by a length field (L length field) included in an L-SIG field. According to an embodiment, duration information indicated by a U-SIG field or a HE-SIG-A or a duration ID/field may be a value indicating TXOP duration. According to an embodiment, duration information indicated by an L-SIG field may be the length of a physical layer protocol data unit (PPDU) including the L-SIG field, or a value indicating the end of the PPDU including the L-SIG field.

In addition, according to an embodiment of the present invention, transmission or channel access for duration based on duration information shared between links may be limited. A method for limiting the transmission or the channel access may include configuring a NAV. Alternatively, the NAV may be reset to resume the transmission or channel access. In this case, the NAV may be an intra-BSS NAV. The intra-BSS NAV may be a NAV configured by an intra-BSS frame (or PPDU). That is, an STA belonging to an MLD may configure a NAV on the basis of a frame (or PPDU) directed to another STA belonging to the MLD.

According to an embodiment of the present invention, there may be an inter-link NAV. In the multi-link operation, the inter-link NAV may be a NAV used by STAs of multiple links belonging to an MLD. For example, transmission may not be performed through Link 2 on the basis of the inter-link NAV configured on the basis of duration information received through Link 1. In addition, for the MLD which cannot perform the STR, the inter-link NAV may be present or used. For example, when the inter-link NAV is configured, the MLD having configured the corresponding inter-link NAV may not perform transmission or channel access in multiple links (or all links used by the MLD).

In addition, as a type of the NAV, there may be a basic NAV, in addition to an inter-BSS NAV. The basic NAV may be a NAV configured by an inter-BSS frame (or PPDU), and the basic NAV may be configured by a frame (or PPDU) for which whether it is an intra-BSS frame or an inter-BSS frame is not determined.

When an inter-link NAV is separately used, it may be advantageous in a situation in which a NAV setup is updated, compared to a case where the inter-link NAV is not used. For example, a situation in which it is allowed to reset a NAV configured by another link may occur. For example, it may be allowed to reset an inter-link NAV which has been configured upon determination that the inter-link NAV is configured on the basis of a frame (or PPDU) but the frame (or PPDU) is not directed to the same MLD. When there is an MLD operating in Link 1 and Link 2, a NAV for Link 1 may be configured on the basis of a frame received through Link 1. Thereafter, the NAV of Link 1 may be updated on the basis of a frame of Link 2. In addition, when there is no need to maintain a NAV by Link 2 and the NAV of Link 1 is reset, NAV information configured on the basis of the frame received through Link 1 may be lost. When the inter-link NAV is used together with the NAV for each link, the NAV for each link may be maintained even though the inter-link NAV is reset, and thus such a problem can be resolved.

An embodiment of the present invention provides an example of configuring a NAV, but the embodiment of the present invention is not limited thereto, and may be applied to a case of indicating a physical layer to stop performing channel access or indicating that a channel state is busy. In addition, the present invention is not limited to a case of resetting the NAV, and may be also applied to a case of indicating a physical layer to continuously perform channel access or indicating that the channel state is idle. In this case, the primitive exchanged between a physical layer and a MAC layer may be used. Alternatively, the primitive exchanged between one STA of the MLD and another STA may be used. Alternatively, the primitive exchanged between one MAC layer of the MLD and another MAC layer may be used.

According to an embodiment of the present invention, when an STA belonging to an MLD starts PPDU reception, another STA belonging to the MLD may need to stop channel access. As described above, the channel access may be stopped on the basis of the received duration information, but a time interval for obtaining duration information from a PPDU reception start time point may be required due to the location of a field including the duration information or a time required for decoding, or the like. Accordingly, when channel access and transmission are performed during this time interval, the problem described above may occur. Accordingly, according to an embodiment of the present invention, an STA of an MLD may stop performing channel access from a time point at which another STA of the MLD starts reception. In addition, when it is identified that a frame received after another STA of the MLD starts reception is not directed toward another STA, channel access may be restarted.

Figure 12:
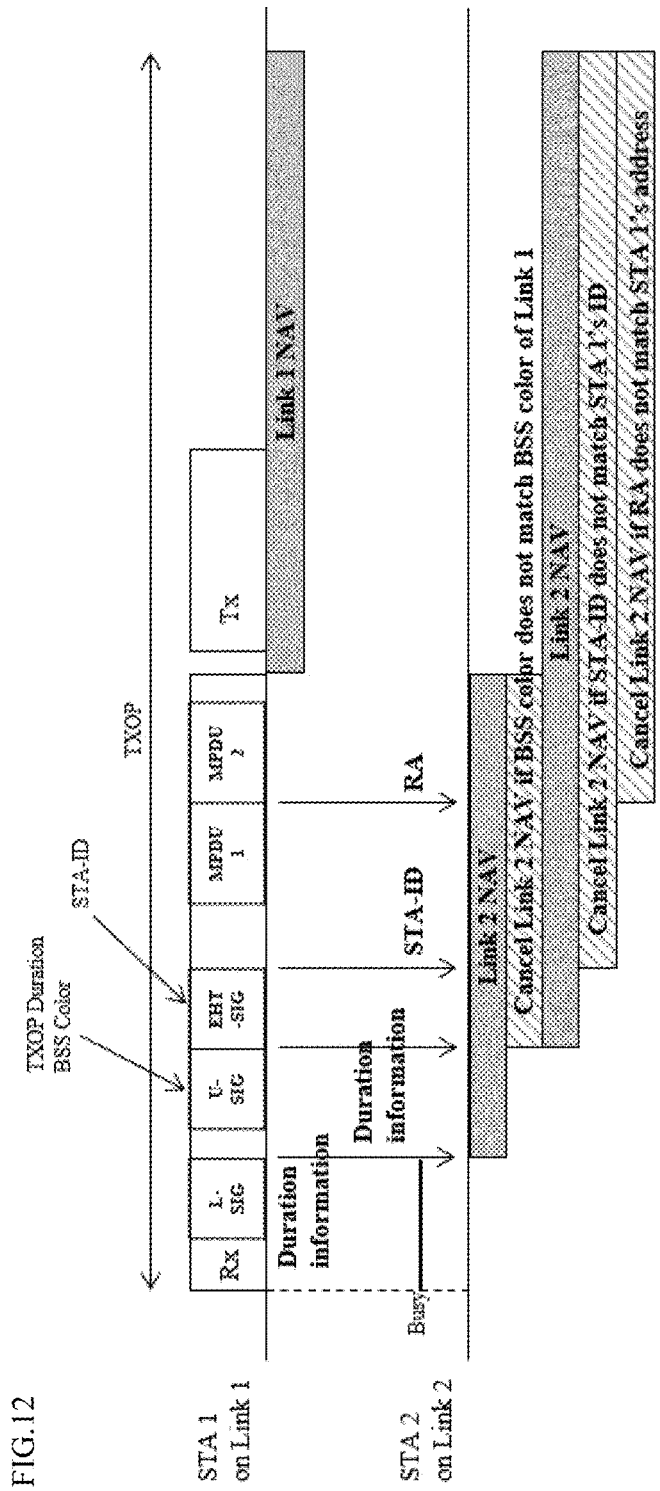
FIG. 12 illustrates another example of a multi-link NAV setup operation according to an embodiment of the present invention.

FIG. 12 illustrates another example of a multi-link NAV setup operation according to an embodiment of the present invention.

FIG. 12 more specifically describes the specific method in the embodiment described in FIG. 11, and a redundant description may be omitted.

As described above, on the basis of a frame or a PPDU received by one STA belonging to an MLD, another STA belonging to the same MLD may stop or resume performing channel access or transmission. In the present invention, stopping the channel access or transmission may include an operation such as configuring (updating) a NAV, determining a channel state as busy, or stopping CCA. In addition, resuming the channel access or transmission may include an operation such as resetting a NAV, canceling the NAV setup, determining the channel state as idle, or performing the CCA. Hereinafter, such operations may be indicated as stopping or resuming channel access. In addition, it may be described that STA 1 and STA 2 belong to an MLD, and STA 1 and STA 2 operate in Link 1 and Link 2, respectively. In addition, the frame and the PPDU may be interchangeably indicated. In addition, as described in FIG. 11, the NAV in this case may be an intra-BSS NAV or an inter-link NAV.

According to an embodiment of the present invention, when STA 1 starts to receive a frame, STA 2 stops performing channel access. In addition, when STA 1 acquires duration information from an L-SIG, STA 2 may continuously stop performing the channel access. In this case, STA 2 may determine the channel access stopping state to be continued by the end of the frame received by STA 1. In addition, when STA 1 fails to correctly decode the L-SIG (in a case of invalid L-SIG), STA 2 may resume performing channel access.

In addition, TXOP duration and a BSS color may be received from the U-SIG of the frame received by STA 1. If the received BSS color indicates an intra-BSS, or the BSS color is a BSS color corresponding to STA 1, the channel access may be stopped. As an embodiment, a channel access stop period may last by the end of the received frame. In this case, it is advantageous in that the channel access can be promptly started after the received frame. As another embodiment, in this case, the channel access stop period may be TXOP duration. In this case, duration of the stopped channel access may be updated on the basis of the L-SIG. In this case, it is advantageous in that a sequence after the received frame can be better protected.

Alternatively, there may be a case where the TXOP duration and the BSS color are received from the U-SIG of the frame received by STA 1, and the received BSS color does not indicate an intra-BSS, or the BSS color is not a BSS color corresponding to STA 1. Alternatively, there may be a case where STA 1 has failed to successfully decode the U-SIG. In this case, STA 2 may resume the channel access.

Alternatively, when information acquired from the U-SIG of the frame received by STA 1 indicates that the corresponding frame is a frame not received by STA 1, STA 2 may resume performing channel access. For example, when a PHY identifier acquired from the U-SIG corresponds to an ID corresponding to a future standard or an unrecognizable ID, STA 2 may resume performing channel access.

In addition, the case in which the U-SIG is received is described above, but the same embodiment is applicable to a case in which a HE PPDU is received and a case in which a HE-SIG-A is received. For example, the HE-SIG-A may include TXOP duration and a BSS color, and accordingly the same operation described above may be performed.

In addition, an STA-ID may have been received from an EHT-SIG of the frame received by STA 1. When the received STA-ID is an indicator to be received by STA 1, for example, when STA-ID indicates STA 1, STA-ID indicates a group to which STA 1 belongs, or STA-ID indicates broadcast, STA 2 may continuously stop performing the channel access.

In addition, an STA-ID may have been received from an EHT-SIG of the frame received by STA 1. When the received STA-ID corresponds to an indicator which does not correspond to STA 1, for example, when STA-ID does not indicate an indicator corresponding to STA 1, STA-ID does not indicate a group to which STA 1 belongs, and STA-ID does not indicate broadcast, STA 2 may resume performing channel access. Alternatively, even when STA 1 has failed to successfully decode the EHT-SIG, STA 2 may resume performing channel access.

In addition, the case in which the EHT-SIG is received is described above, but the same embodiment is applicable to a case in which a HE PPDU is received and a case in which a HE-SIG-B is received. For example, the HE-SIG-B may include an STA-ID, and accordingly, the same operation described above may be performed.

In addition, a MAC header of the frame received by STA 1 may have been received. When a receiver address (RA) or a destination address (DA) included in the received MAC header indicates a value to be received by STA 1, for example, when an RA or a DA indicates STA 1, indicates a group to which STA 1 belongs, or an STA-ID indicates broadcast, STA 2 may continuously stop performing the channel access. In this case, the stopped channel access period may be based on duration information included in the received MAC header. More specifically, the stopped channel access period may be based on duration information indicated by a duration/ID field included in the received MAC header.

In addition, a MAC header of the frame received by STA 1 may have been received. When an RA or a DA included in the received MAC header is an indicator not corresponding to STA 1, for example, when the RA or the DA does not indicate an indicator corresponding to STA 1, does not indicate a group to which STA 1 belongs, and does not indicate broadcast, STA 2 may resume performing channel access. Alternatively, STA 1 may not have received all MAC headers. For example, STA 1 may have failed to receive all MPDUs included in an A-MPDU. In this case, STA 2 may resume performing channel access.

The stopping and resuming of channel access, described in FIG. 12, may operate according to a decoding order as STA 1 starts receiving a frame (or PPDU) and decodes the same in order. The decoding order may be based on a PPDU format, a frame format, and the like. For example, decoding may be performed in the sequence of an L-SIG, a U-SIG, an EHT-SIG, and a MAC header (in a case of an EHT PPDU). Alternatively, decoding may be performed in the sequence of an L-SIG, a HE-SIG-A, a MAC header (in a case of a HE SU PPDU or a HE TB PPDU). Alternatively, decoding may be performed in the sequence of an L-SIG, a HE-SIG-A, a HE-SIG-B, a MAC header (in a case of a HE MU PPDU). Alternatively, decoding may be performed in the sequence of an L-SIG and an MAC header (in a case of a 11 a/g PPDU).

According to an embodiment of the present invention, the STA-ID mentioned above may be a value indicating an intended receiver of a PPDU or a resource unit (RU). In addition, the STA-ID may be included in an EHT-SIG field, a HE-SIG-B field, or the like. In addition, the STA-ID may indicate a value corresponding to a single STA. For example, when multiple STAs are included in an MLD, the STA-ID may indicate a value corresponding to one of the multiple STAs. In addition, the STA-ID may be a value based on a MAC address or an AID of the STA.

Figure 13:
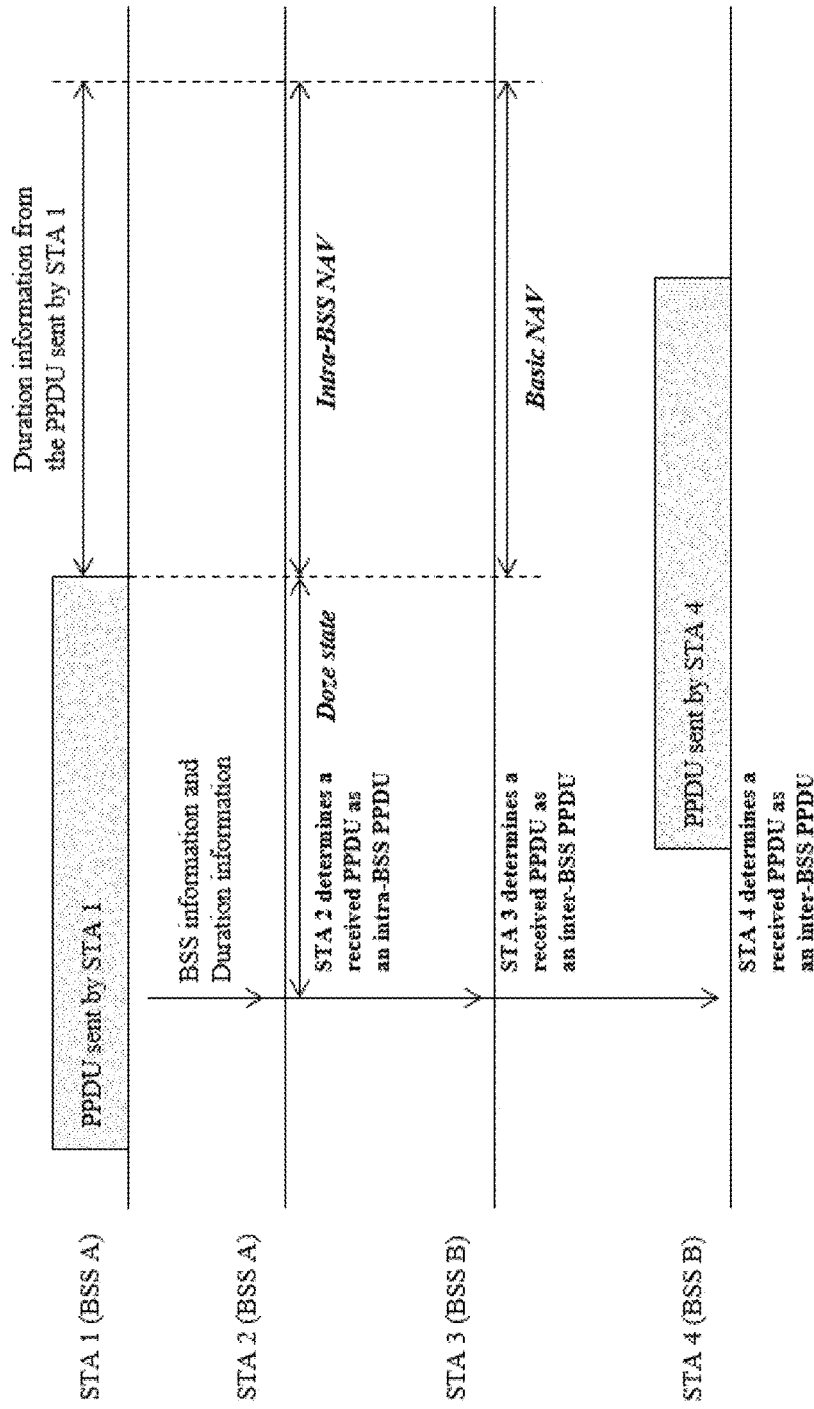
FIG. 13 illustrates an example of BSS classification and an operation based thereon according to an embodiment of the present invention.

FIG. 13 illustrates an example of BSS classification and an operation based thereon according to an embodiment of the present invention.

According to an embodiment, an STA may classify (or determine) a BSS on the basis of a received frame or a received PPDU. The classifying of the BSS may include an operation of classifying whether or not the received frame or the received PPDU corresponds to a BSS to which the STA performing the classification belongs. Alternatively, the classifying of the BSS may mean an operation of classifying whether or not the received frame or the received PPDU has been transmitted from a BSS to which the STA performing the classification belongs. In addition, the classifying of the BSS may include an operation of whether or not the received frame or the received PPDU corresponds to a BSS to which the STA performing the classification does not belong. Alternatively, the classifying of the BSS may mean an operation of classifying whether or not the received frame or the received PPDU has been transmitted from a BSS to which the STA performing the classification does not belong. In addition, the classifying of the BSS may include an operation of classifying a BSS to which the received frame or the received PPDU belongs. Alternatively, the classifying of the BSS may mean an operation of classifying a BSS from which the received frame or the received PPDU has been transmitted. According to an embodiment of the present invention, the BSS to which the STA performing the classification belongs may be referred to as an intra-BSS. Alternatively, BSSs including the BSS to which the STA performing the classification belongs may be referred to as an intra-BSS. In addition, a BSS other than the intra-BSS may be referred to as an inter-BSS. Alternatively, a BSS other than the intra-BSS may be an inter-BSS or an unclassified BSS. Alternatively, the inter-BSS may include the unclassified BSS. In addition, the BSS to which the STA performing the classification does not belong may be referred to as an inter-BSS.

According to an embodiment, when it is determined that the received frame or the received PPDU corresponds to an intra-BSS or has been transmitted from the intra-BSS, the received frame and the received PPDU may be an intra-BSS frame and an intra-BSS PPDU, respectively. In addition, when it is determined that the received frame or the received PPDU corresponds to an inter-BSS, or has been transmitted from the inter-BSS, the received frame and the received PPDU may be an inter-BSS frame and an inter-BSS PPDU, respectively. In addition, a PPDU including the intra-BSS frame may be an intra-BSS PPDU. In addition, a PPDU including the inter-BSS frame may be an inter-BSS PPDU.

According to an embodiment, the BSS may be classified on the basis of one or more BSS classification conditions. For example, the BSS may be classified according whether at least one of the one or more BSS classification conditions is satisfied.

The BSS classification condition may include a condition based on a BSS color. The BSS color may be an identifier for the BSS. In addition, the BSS color may be included in a preamble of a PPDU, and more specifically, in a signaling field (for example, a HE-SIG-A field, a U-SIG field, or a VHT-SIG-A field). In addition, the BSS color may be included in a TXVECTOR transferred from a MAC layer to a PHY layer of a transmitter. In addition, the BSS color may be included in an RXVECTOR transferred from a PHY layer to a MAC layer of a receiver. Parameters included in the TXVECTOR and the RXVECTOR may be referred to as a TXVECTOR parameter and an RXVECTOR parameter, respectively. In addition, the BSS color may be included in the TXVECTOR parameter or the RXVECTOR parameter. In addition, a BSS color configured by an AP may be informed to STAs. According to an embodiment, the BSS may be classified on the basis of a BSS color included in a received PPDU. When a BSS color included in the PPDU received by the STA differs from a BSS color of the BSS corresponding to the STA, the received PPDU may be classified as an inter-BSS PPDU. Alternatively, when the BSS color included in the PPDU received by the STA differs from the BSS color of the BSS corresponding to the STA and the value thereof is not 0, the received PPDU may be classified as an inter-BSS PPDU. In addition, when the BSS color included in the PPDU received by the STA is identical to the BSS color of the BSS corresponding to the STA, the received PPDU may be classified as an intra-BSS PPDU.

The BSS classification condition may include a condition based on a MAC address. The MAC address may be included in a MAC header of a frame. In addition, the MAC address may include a receiver address (RA), a transmitter address (TA), a BSSID, a source address (SA), a destination address (DA), and the like. According to an embodiment, the BSS may be classified on the basis of the MAC address included a received frame. When a MAC address included in the received frame differs from a BSSID of a BSS corresponding to the STA, the received frame may be classified as an inter-BSS frame. More specifically, when all MAC addresses included in the received frame differ from the BSSID of the BSS corresponding to the STA, the received frame may be classified as an inter-BSS frame. In addition, when the MAC address included in the received frame is identical to the BSSID of the BSS corresponding to the STA, the received frame may be classified as an intra-BSS frame. More specifically, when at least one of MAC addresses included in the received frame is identical to the BSSID of the BSS corresponding to the STA, the received frame may be classified as an intra-BSS frame.

The corresponding BSS may include a BSS associated with the STA. In addition, the corresponding BSS may include a BSS included in as set of multiple BSSIDs, such as the BSS associated with the STA. In addition, the corresponding BSS may include a BSS included in a co-hosted BSSID set, such as the BSS associated with the STA. In addition, information relating to one or more BSSs included in the same set of multiple BSSIDs or the same co-hosted BSSID set may be transferred through one frame.

The BSS classification condition may include a condition based on a partial AID field value included in a VHT PPDU. The partial AID field may be included in a preamble of a VHT PPDU. In addition, the partial AID field may be included in a VHT-SIG-A field included in the VHT PPDU. According to an embodiment, the partial AID field may indicate a part of a BSS color. For example, when a partial BSS color function is used, the partial AID field may indicate a part of the BSS color. Alternatively, when an AID assignment rule is used, the partial AID field may indicate a part of the BSS color. The AID assignment rule may be a method for allocating an AID on the basis of a part of the BSS color. In addition, when a group ID field included in the VHT-SIG-A field of the VHT PPDU has a preconfigured value (for example, when a group ID field is configured as 63), the partial AID field may indicate a part of the BSS color. According to an embodiment, in a case where a partial AID field of the received PPDU indicates a part of the BSS color, when the received partial AID field value differs from a part of the BSS color corresponding to the received STA, the received PPDU may be classified as an inter-BSS PPDU.

In addition, in a case where the partial AID field of the received PPDU indicates a part of the BSS color, when the received partial AID field value is identical to a part of the BSS color corresponding to the received STA, the received PPDU may be classified as an intra-BSS PPDU. In addition, the part of the BSS color may be 4 LSBs of the BSS color. According to another embodiment, the partial AID field may indicate a part of the BSSID. For example, in a case where a group ID field included in the VHT-SIG-A field of the VHT PPDU has a preconfigured value (for example, when a group ID field is configured as 0), the partial AID field may indicate a part of the BSSID. According to an embodiment, in a case where a partial AID field of the received PPDU indicates a part of the BSSID, when the received partial AID field value differs from a part of the BSSID corresponding to the received STA, the received PPDU may be classified as an inter-BSS PPDU. In addition, in a case where a partial AID field of the received PPDU indicates a part of the BSSID, when the received partial AID field is identical to a part of the BSSID corresponding to the received STA, the received PPDU may be classified as an intra-BSS PPDU. In addition, in this case, the part of the BSSID may be 9 MSBs of the BSSID. In addition, the partial AID field value may be included in TXVECTOR parameter PARTIAl_AID or RXVECTOR parameter PARTIAL_AID. In addition, the group ID field value may be included in TXVECTOR parameter GROUP_ID or RXVECTOR parameter GROUP_ID.

The BSS classification condition may include a condition for receiving a PPDU having a preconfigured condition by an AP. For example, the PPDU having a preconfigured condition may include a downlink PPDU. According to an embodiment, the downlink PPDU may include a VHT MU PPDU. In addition, the downlink PPDU may include a PPDU in which signaling indicating either uplink or downlink is configured with a preconfigured value. The signaling indicating either the uplink or the downlink may be included in a signaling field of a HE PPDU. Alternatively, the signaling indicating either the uplink or the downlink may be included in a U-SIG. The U-SIG may be included in a preamble an EHT PPDU or a PPDU after the EHT standard.

In addition, there may be a case where a PPDU cannot be classified as an intra-BSS PPDU or an inter-BSS PPDU. For example, when both the condition for classifying the PPDU as the intra-BSS PPDU and the condition for classifying the PPDU as the inter-BSS PPDU, which are described above, are not satisfied, the PPDU may not be classified as the intra-BSS PPDU or the inter-BSS PPDU.

In addition, during the BSS classification, when classification results according to multiple conditions do not match, a final result may be determined according to a preconfigured condition. For example, when a result according to a condition based on the BSS color and a result according to a condition based on the MAC address do not match, the result according to the condition based on the MAC address may be prioritized, or a final result may be determined on the basis of the result according to the condition based on the MAC address. Alternatively, when both the condition for classifying the PPDU as the intra-BSS PPDU and the condition for classifying the PPDU as the inter-BSS PPDU are satisfied, the PPDU may be classified as the intra-BSS PPDU.

According to an embodiment of the present invention, the STA may perform an operation based on the classified BSS. The operation based on the classified BSS may include an intra-PPDU power save operation. The intra-PPDU power save operation may be a power save operation based on the received PPDU. When the preconfigured condition is satisfied, the intra-PPDU power save operation may be performed. The preconfigured condition may include a condition for classifying the received PPDU as the intra-BSS PPDU. In addition, the preconfigured condition may include a condition in which an intended receiver of the received PPDU is not an STA having received the PPDU. For example, when an ID or an address included in the PPDU does not correspond to the STA having received the PPDU, the intended receiver of the PPDU may not be an STA having received the PPDU. The ID may be included in a preamble of the PPDU. For example, the ID may be STA_ID included in the preamble of the PPDU. In addition, STA_ID may be included in a HE MU PPDU or an EHT PPDU. In addition, the address may be the MAC address described above. In addition, when signaling indicating either the uplink or the downlink, included in the received PPDU, indicates the uplink, the intended receiver of the PPDU may not be the STA having received the PPDU. In addition, when the configuration of the received PPDU is made so that the STA having received the PPDU is not supported, the intended receiver of the PPDU may not be the STA having received the PPDU. The configuration of the received PPDU may include an MCS, the number of spatial streams, a channel width, and the like of the PPDU. In addition, when the configuration of the received PPDU is made so that the STA having received the PPDU is not supported, the PHY-RXEND.indication (UnsupportedRate) primitive may be received. In addition, when the received PPDU has a preconfigured format, the intended receiver of the PPDU may not be the STA having received the PPDU. The preconfigured format may include a TB PPDU. The TB PPDU may include a HE TB PPDU and an EHT TB PPDU. In addition, the TB PPDU may be a PPDU transmitted as a response to a triggering frame. The triggering frame may include a trigger frame. The triggering frame may include a frame including triggering information. The triggering information may be included in a MAC header, for example, an A-control field. In addition, the triggering information or information included in the trigger frame may include the length of a responding PPDU, an RU to be used when responding, a PHY configuration to be used when responding, a MAC configuration, and the like. The intra-PPDU power save operation may be an operation in which entering a doze state by the end of the received PPDU is allowed. As another embodiment, when it is determined that the intended receiver of the frame or the PPDU received by an STA is not the STA described above, reception or decoding of the PPDU or the frame may be stopped.

The operation based on the classified BSS may include an operation of configuring (or updating) a NAV. According to an embodiment, an STA may manage one or more NAVs. In addition, when the STA has received the PPDU or the frame, a NAV corresponding to the BSS classified on the basis of the received PPDU or the received frame may be configured. For example, the intra-BSS NAV may be a NAV corresponding to the intra-BSS PPDU. In addition, a basic NAV may be a NAV corresponding to a PPDU other than the intra-BSS PPDU. Alternatively, the basic NAV may be a NAV corresponding to the inter-BSS PPDU. In addition, when the NAV is configured on the basis of the received PPDU or the received frame, duration information included in the received PPDU or the received frame may be used. The duration information may include a TXOP. The TXOP may mean a value included in a TXOP field. The TXOP field may be included in a preamble of a PPDU. For example, the TXOP field may be included in a HE-SIG-A field of a HE PPDU. Alternatively, the TXOP field may be included in a U-SIG field of an EHT PPDU or a PPDU after the EHT standard. In addition, the duration information may be included in the MAC header. For example, the duration information may be included in a duration/ID field included in the MAC header.

The operation based on the classified BSS may include a spatial reuse operation. In addition, the operation based on the classified BSS may include a channel access operation. The spatial reuse information may be a channel access operation. When an STA receives a PPDU or a frame and a preconfigured condition is satisfied, the spatial reuse operation may be performed. The preconfigured condition may include a condition in which the received PPDU or the received frame corresponds to an inter-BSS. In addition, the preconfigured condition may include a condition in which a signal strength of the received PPDU or the received frame may have a value smaller than a threshold. For example, the threshold may be variable. In addition, the threshold may be a threshold for an OBSS PD-based spatial reuse operation. In addition, the threshold may be a value equal to or greater than a CCA threshold. In addition, the threshold may be a value based on power to be transmitted. The spatial reuse operation may include an operation of transmitting a PPDU.

In addition, the spatial reuse operation may include an operation of resetting PHY. For example, the operation of resetting PHY may be an operation of issuing the PHY-CCARESET.request primitive. In addition, the spatial reuse operation may include an operation of not configuring a NAV on the basis of the received PPDU or the received frame. When the STA performs the spatial reuse operation, the STA may transmit the PPDU while the received PPDU or the received frame is transmitted or received.

Referring to FIG. 13, there may be BSS A and BSS B, and BSS A and BSS B may be different from each other. In addition, each of BSS A and BSS B may correspond to an inter-BSS. That is, a PPDU or a frame transmitted from BSS B by an STA associated with BSS A may be classified as an inter-BSS PPDU or an inter-BSS frame. In addition, there may be STA 1 and STA 2 belonging to BSS A (or associated with an AP operating BSS A). There may be STA 3 and STA 4 belonging to BSS B (or associated with an AP operating BSS B). Referring to FIG. 13, STA 1 may transmit a PPDU. In addition, the PPDU transmitted by STA 1 may include information on the BSS. For example, information on the BSS may be information for classifying the above-described BSS. In addition, the PPDU transmitted by STA 1 may include duration information.

STA 2 may receive the PPDU transmitted by STA 1, and may classify a BSS for the corresponding PPDU. In addition, since STA 2 and STA 1 belong to BSS A, the PPDU received by STA 2 may be classified as an intra-BSS PPDU. In addition, the PPDU received by STA 2 may be a UL PPDU or a PPDU in which the STA is not an intended receiver. Accordingly, according to the above-described embodiment, STA 2 may perform the intra-PPDU power saving. Referring to FIG. 13, STA 2 may enter the doze state by the end of the received PPDU. In addition, STA 2 may configure a NAV on the basis of duration information included in the received PPDU. STA 2 may configure an intra-BSS NAV since STA 2 has classified the received PPDU as the intra-BSS PPDU.

STA 3 may receive a PPDU transmitted by STA 1, and may classify a BSS for the corresponding PPDU. In addition, STA 3 and STA 1 belong to BSS B and BSS A, respectively, and thus the PPDU received by STA 3 may be classified as an inter-BSS PPDU. In addition, STA 3 may configure a NAV on the basis of duration information included in the received PPDU. A basic NAV may be configured since STA 3 has classified the received PPDU as the inter-BSS PPDU.

STA 4 may receive a PPDU transmitted by STA 1, and may classify a BSS for the corresponding PPDU. In addition, STA 4 and STA 1 belong to BSS B and BSS A, respectively, the PPDU received by STA 4 may be classified as an inter-BSS PPDU. In addition, a signal strength of the PPDU received by STA 4 may have a value smaller than a threshold. Accordingly, the PPDU received by STA 4 has been classified as the inter-BSS PPDU and the signal strength of the PPDU received by STA 4 has a value smaller than the threshold, STA 4 may perform a spatial reuse operation. Accordingly, STA 4 may perform channel access and a backoff procedure, and may start transmission. For example, STA 4 may start transmission at a time point by which the PPDU transmitted by STA 1 has not yet ended.

Figure 14:
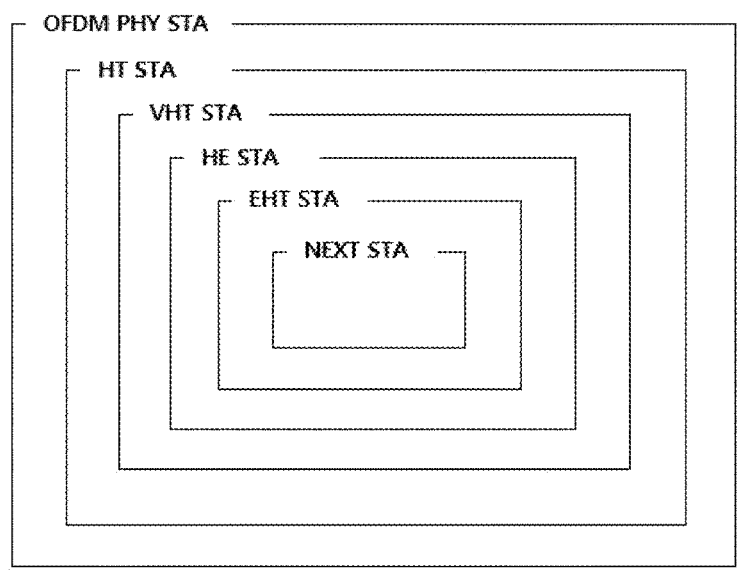
FIG. 14 illustrates a wireless LAN function according to an embodiment of the present invention.

FIG. 14 illustrates a wireless LAN function according to an embodiment of the present invention.

Referring to FIG. 14, a wireless LAN in one standard may include a function of a wireless LAN in another standard. Alternatively, a wireless LAN in one standard may also be a wireless LAN in another standard. Here, the wireless LAN may mean an STA. In addition, here, the wireless LAN may mean an MLD including the STA. For example, the wireless LAN standard may include a standard function of the previous generation and may include an additional function. For example, an HT STA may also be an OFDM PHY STA. In addition, the HT STA may perform an additional function as well as a function of the OFDM PHY STA. For example, a VHT STA may also be the HT STA. In addition, the VHT STA may also perform an additional function as well as a function of the HT STA. For example, a HE STA may also be the VHT STA. In addition, the HE STA may also perform an additional function as well as a function of the VHT STA. In addition, an ETH STA may also be the HE STA. In addition, the ETH STA may also perform an additional function as well as a function of the HE STA. In addition, there may be standards after the EHT standard. In the present invention, the standard after the EHT standard may be referred to as a NEXT standard, and an STA following the NEXT standard may be referred to as a NEXT STA. The NEXT STA may also be the EHT STA. In addition, the NEXT STA may also perform an additional function as well as a function of the EHT STA.

FIG. 14 is a diagram illustrating a relationship among STAs of the respective standards. Referring to FIG. 14, in a case of the EHT STA, the STA may be the HE STA, the VHT STA, the HT STA, and the OFDM PHY STA. In addition, in a case of the NEXT STA, the STA may be the EHT STA, the HE STA, the VHT STA, the HT STA, and the OFDM PHY STA.

Figure 15:
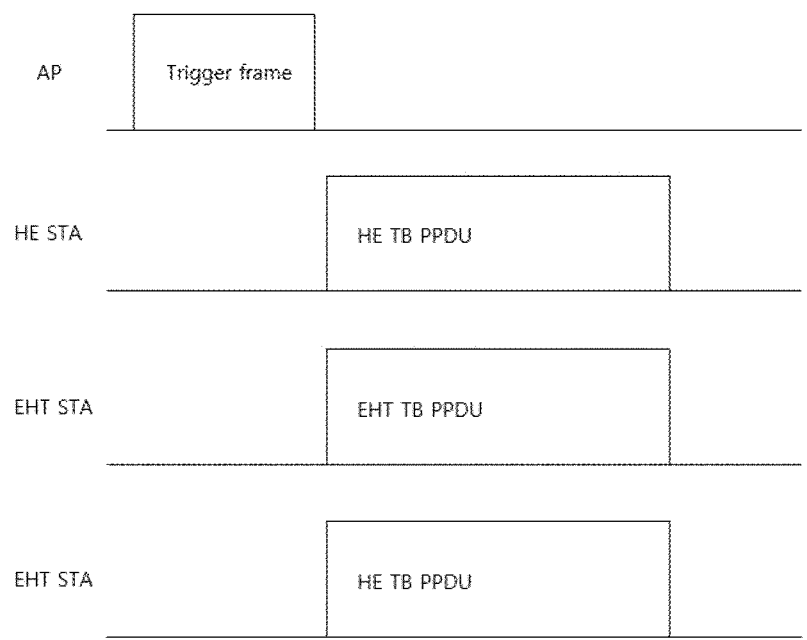
FIG. 15 illustrates an uplink (UL) multi-user (MU) operation according to an embodiment of the present invention.

FIG. 15 illustrates an uplink (UL) multi-user (MU) operation according to an embodiment of the present invention.

Referring to FIG. 15, an AP may indicate PPDU transmission to at least one STA through a specific frame (for example, a triggering frame), and the at least one STA may simultaneously transmit PPDUs having the same format or different formats on the basis of the specific frame transmitted from the AP.

Specifically, as described in FIG. 15, a frame indicating (soliciting) or triggering multi-user (MU) transmission may be transmitted, and one or more STAs may respond to the frame or transmission on the basis of the frame. In this case, when the one or more STAs transmit a response to the frame, the one or more STAs may simultaneously transmit immediate responses on the basis of the frame, and the response to the frame may start to be transmitted after an SIFS from the end of a PPDU including the frame. For example, when the frame indicates an immediate response, the one or more STAs may transmit immediate response to the frame. The frame indicating or triggering transmission to the one or more STAs may be a trigger frame or a frame including, in a MAC header, information indicating that uplink transmission is indicated or triggered to the one or more STAs. In this case, the frame may include, in the MAC header, information (for example, a TRS control subfield) triggering or indicating the uplink transmission to one STA only.

For example, the information indicating or triggering the uplink information, included in the MAC header, may be an HT control field, a control subfield, or triggered response scheduled (TRS) or a TRS control subfield included in an A-control subfield.

The frame for indicating or triggering the uplink transmission may be transmitted by the AP, and when the frame for indicating or triggering the uplink transmission corresponds to a trigger frame, a response to the frame may be transmitted through a triggered-based PPDU (TB PPDU) format. In this case, the TB PPDU may include a NEXT TB PPDU which can be defined in the next standard, as well as the HE TB PPDU and the EHT TB PPDU, which are described above.

The HE TB PPDU may include a preamble, data, and packet extension (PE), and the preamble may include an L-STF, an L-LTF, an L-SIG, an RL-SIG, a HE-SIG-A, a HE-STF, and a HE-LTF in order.

Each of the EHT TB PPDU and the NEXT TB PPDU may also include a preamble, data, PE, and the like, and the preamble of each of the EHT TB PPDU and the NEXT TB PPDU may include an L-STF, an L-LTF, an L-SIG, an RL-SIG, a U-SIG, an (EHT-/NEXT-) STF, an (EHT-/NEXT-) LTF in order.

The frame indicating or triggering a PPDU to one or more STAs may include information required for the one or more STAs to transmit TB PPDUs. For example, when a type subfield included in a frame is "01" (B3 and B2), and a subtype subfield is "0010" (B7, B6, B5, and B4), the frame including the type subfield and the subtype subfield may be a trigger frame corresponding to a control frame.

If a response to a TB PPDU is indicated or triggered to multiple STAs and formats of PPDUs responded by the multiple STAs are different, a problem that it is difficult for the AP indicated or triggered the response to receive a PPDU corresponding to a response transmitted from the multiple STAs may occur. Alternatively, information pieces included in preambles of PPDUs responded by the multiple STAs are different according to the format, a problem that it is difficult for the AP indicated or triggered the response to receive a PPDU corresponding to a response transmitted from the multiple STAs may occur.

Accordingly, to solve this problem, when the multiple STAs respond to the frame of the AP, the format of the responded PPDU and/or types of information pieces included the preamble of the PPDU may be configured to be identical. For example, when the multiple STAs transmit HE TB PPDUs as a response to the frame of the AP, the AP transfers information so that information pieces included in the L-STF, L-LTF, the L-SIG, the RL-SIG, and the HE-SIG-A are identical or an agreement on the information included in the HE TB PPDU may be made, so that the AP can successfully receive the preambles transmitted by the multiple STAs. However, when the HE TB PPDU, the EHT TB PPDU, and the NEXT TB PPDU are simultaneously transmitted through an overlapping subband, the respective TB PPDU formats are different, and thus a problem that it is difficult for the AP to receive the same may occur.

According to an embodiment of the present invention, a HE STA may transmit a HE TB PPDU. In addition, an EHT STA may transmit the EHT TB PPDU or the HE TB PPDU. In addition, a NEXT STA may transmit the NEXT TB PPDU, the EHT TB PPDU, or the HE TB PPDU. This is because an STA in a certain standard may include a function of the previous standard, as described above.

As shown in FIG. 15, when the AP transmits a frame for scheduling transmission of a TB PPDU to the HE STA or the EHT STA and indicates or triggers transmission of the TB PPDU through the frame, there may be no accurate indication or protocol for the format of the TB PPDU. In this case, the HE STA may transmit the HE TB PPDU as a response to the frame, and the EHT STA may respond with the EHT TB PPDU or the HE TB PPDU. In this case, it may be difficult for the AP to receive the TB PPDUs transmitted by the STAs, and there may be a problem in that a medium is occupied and transmission opportunities of other STAs are thus reduced even though the AP has failed to successfully receive the TB PPDUs from the multiple STAs and the transmission has failed to be successfully performed.

Hereinafter, in the present invention, indicating to the STA may mean indicating a response from the STA, and the triggering and the indicating may be used in the same meaning.

In addition, the HE trigger frame, the EHT trigger frame, and the NEXT trigger frame may be trigger frames defined in the HE, EHT, and NEXT standards, respectively. In addition, in the present invention, the HE TRS, the EHT TRS, and the NEXT TRS may be TRSs defined in the HE, EHT, and NEXT standards, respectively.

FIG. 16 illustrates a format of a trigger frame according to an embodiment of the present invention.

FIG. 16A illustrates a format of a trigger frame, and FIG. 16B and FIG. 16C illustrate a common information (info) field and a user info field included a trigger frame, respectively.

Referring to FIG. 16A, as a trigger MAC header, a frame may include a frame control field, a duration field, and an address field, and may include a common info field and a user info list field. The address field may include a resource allocation (RA) field and a transmitter address (TA) field.

The common info field may include information commonly applied to all STAs indicated by the trigger frame. FIG. 16B illustrates an example of the common info field.

The user info list field may include zero or more user info fields, and the user info list field of a trigger frame remaining after excluding a specific type of a trigger frame may include one or more user info fields. FIG. 16C illustrates an example of the user info field.

The trigger frame may further include a padding field and a frame check sequence (FCS) field. The padding field may be used to increase the length of a frame to secure a time required for an STA receiving the trigger frame to prepare a response to the trigger frame, and may be selectively included in the trigger frame.

Referring to FIG. 16B, the common info field may include a trigger type subfield. The trigger type subfield may be used to identify a trigger frame variant. Alternatively, the type of the trigger frame may be indicated on the basis of a value of the trigger frame subfield. In addition, the length and information included in the trigger dependent common info subfield and the trigger dependent user info subfield, illustrated in FIG. 16, may be determined on the basis of the trigger type subfield. For example, the trigger type subfield may be indicated through B0 to B3 bits of the common info field.

The common info field may include an uplink (UL) length subfield. The UL length subfield may include information on the length of a TB PPDU corresponding to a response to the trigger frame, and may include information on the length of a frame responding to the trigger frame. In addition, the UL length subfield may indicate a value to be included in an L-SIG length subfield of a TB PPDU responding to the trigger frame. Accordingly, an STA receiving the trigger frame and responding with the TB PPDU may configure a value of the length subfield included in the L-SIG of the TB PPDU on the basis of the value of the UL length subfield included in the received trigger frame. Specifically, the STA responding with the TB PPDU may configure the length subfield included in the L-SIG of the TB PPDU as a value of the UL length subfield included in the received trigger frame. For example, the STA may configure the length subfield included in the L-SIG of the TB PPDU and transmit the TB PPDU on the basis of the values of B4 to B15 bits of the common info field indicating the UL length subfield.

In addition, the common info field may further include an uplink bandwidth (BW) subfield. The UL BW subfield may indicate a BW value included in a signaling field (for example, a HE-SIG-A, a U-SIG, or the like) of a TB PPDU responding to the trigger frame, and may indicate a maximum BW of the TB PPDU transmitted as a response to the trigger frame. Accordingly, an STA may configure a BW value included in the signaling field of the TB PPDU on the basis of a value of the UL BW subfield included in the trigger frame.

In addition, the common info field may further include information, etc. to be included in the signal field of the TB PPDU corresponding to a response to the trigger frame. Accordingly, after receiving the trigger frame, the STA may configure information pieces included in the TB PPDU on the basis of information pieces included in the trigger frame.

Referring to FIG. 16C, the user info field may include an AID12 subfield. The AID12 subfield may be used to indicate a function of the user info field or an intended receiver of the user info field including the AID12 subfield. Accordingly, the AID12 subfield may play a role of indicating the function of the trigger frame or the intended receiver of the trigger frame including the AID12 subfield. For example, when the value of the AID12 subfield corresponds to a preconfigured value, the user info field may indicate a random access resource unit (RA-RU). That is, the preconfigured value of the AID12 subfield may indicate that the user info field indicates the RA-RU. Specifically, when the value of the AID12 subfield is "0", the user info field may indicate the RA-RU for associated STAs. For example, when the value of the AID12 subfield is "0", the user info field may indicate the RA-RU for the associated STA, and when the value of the AID12 subfield is "2045", the user info field may indicate the RA-RU for unassociated STAs. For an STA corresponding to an STA ID (for example, an association ID (AID)) indicated by the value of the AID12 subfield, a response may be indicated by the user info field including the AID12 subfield or the trigger frame including the AID subfield. For example, the AID12 subfield may indicate the AID or 12 LSBs of the AID. The STA corresponding to the value indicated by the AID12 subfield may transmit the TB PPDU as a response to the received trigger frame. In this case, the value of the AID12 subfield may be in the range of "1" to "2007" (including 1 and 2007) and the AID12 subfield corresponds to a preconfigured value (for example, "2046", etc.), the RU corresponding to the preconfigured value of the AID12 subfield may not be allocated to any STAs. In addition, when the AID subfield corresponds to a preconfigured value (for example, "4095", etc.), the preconfigured value may indicate that padding of the trigger frame starts.

Information of the user info field including the AID12 subfield may be information corresponding to STAs indicating the AID12 subfield. For example, a resource unit (RU) allocation subfield may indicate the size, the location, etc. of an RU. In this case, the value of the RU allocation subfield of the user info field including the AID12 subfield may be information corresponding to the STA indicated by the AID12 subfield. That is, the RU indicated by the RU allocation subfield of the AID12 subfield may be an RU allocated to the STA indicated by the AID12 subfield.

In addition, the user info field may indicate a coding method (UL FEC coding type) for generation of a TB PPDU transmitted as a response to the trigger frame, a modulation method (UL HE-MCS and UL DCM), and power (UL target RSSI), etc.

FIG. 17 illustrates a method for indicating a triggered-based (TB) PPDU according to an embodiment of the present invention.

Referring to FIG. 17, one STA may selectively transmit PPDUs having different formats on the basis that the indication is made by a trigger frame indicating PPDU transmission.

Specifically, an EHT STA may selectively transmit an EHT TB PPDU as well as a legacy PPDU (for example, a HE TB PPDU), and a NEXT STA may selectively transmit a HE TB PPDU, an EHT TB PPDU, and/or a NEXT TB PPDU. In this case, STAs to which several standards are applied, respectively, may be individually scheduled by one frame or one PPDU. In the wireless LAN, STAs to which multiple standards are applied use a common resource together, such a method may be advantageous. For example, a HE STA (a HE STA other than an EHT STA) and an EHT STA may respond with the HE TB PPDU through one frame. That is, a non-AP STA may transmit a triggering frame and indicate transmission of a HE TB PPDU to the EHT STA as well as the HE STA.

In addition, information for selecting a TB PPDU format may be included in a trigger frame corresponding to a triggering frame, a TRS, a PPDU including the trigger frame, or a PPDU including a TRS control subfield. That is, an AP STA may transmit, to at least one non-AP STA, the triggering frame including the information for selecting the TB PPDU format, and a non-AP STA may select a format of a PPDU to be responded, on the basis of the information included in the transmitted triggering frame. Thereafter, at least one non-AP STA may transmit a PPDU to the AP on the basis of the selected format.

Information on the format (TB PPDU format) of the PPDU corresponding to a response to the triggering frame may be present in a MAC level, and a trigger frame corresponding to one of the triggering frames may be classified into a HE trigger frame, an EHT trigger frame, and a NEXT trigger frame, and a response to each trigger frame may be classified into a HE TB PPDU, an EHT TB PPDU, and a NEXT TB PPDU.

In addition, classifying the trigger frame into the HE trigger frame, the EHT trigger frame, and the NEXT trigger frame may mean that the format of the TB PPDU corresponding to a response to the trigger frame is classified into the HE TB PPDU, the EHT TB PPDU, and the NEXT TB PPDU.

Whether the format of the trigger frame for classifying the TB PPDU is the HE trigger frame, the EHT trigger frame, or the NEXT trigger frame may be identified on the basis of a frame control field included in a MAC header. Specifically, the format of the trigger frame may be classified on the basis of a type subfield, a subtype subfield, and/or a control frame extension subfield. In addition, when a value of the type subfield, the subtype subfield, and/or the control frame extension subfield is a preconfigured value, the trigger frame may be identified as a HE trigger frame, and when a value is another preconfigured value, the trigger frame may be identified as an EHT trigger frame. In addition, when the value of the type subfield, the subtype subfield, and/or the control frame extension subfield is another preconfigure value, the trigger frame may be identified as a NEXT trigger frame.

For example, when the type subfield is 01 (B3 and B2) and the subtype subfield is 0010 (B7, B6, B5, and B4), the formats of the frame including the type subfield and the subtype subfield may be the HE trigger frame. In this case, entries of a type subfield (2 bits), a subtype subfield (4 bits), and/or a control frame extension subfield (4 bits), to which limited bits are allocated, may need to be additionally used in the EHT standard and the NEXT standard.

Alternatively, whether the format of the trigger frame is a HE trigger frame or an EHT trigger frame may be identified on the basis of a common info field included in the trigger frame. That is, the format of a PPDU to be transmitted as a response to the trigger frame may be determined on the basis of a value of a specific subfield (first subfield) included in the common info field. For example, the non-AP STA may select the HE TB PPDU or the EHT PPDU according to a value of the common info field to transmit the same through an allocated RU. In this case, a specific subfield (second subfield) of the user info field as well as the common info field may be additionally used to identify the format of the PPDU.

That is, a variant for determining the format of the PPDU corresponding to a response to the trigger frame may be determined on the basis of the common info field of the trigger frame, and the format of the PPDU may be determined according to the determined variant. For example, when the variant for determining the format of the PPDU is determined as the HE variant by the common info field, the non-AP STA may respond with the HE TB PPDU, and when the variant for determining the format of the PPDU is determined as the EHT variant by the common info field, the non-AP STA may respond with the EHT TB PPDU.

In this case, for the variant for determining the format of the PPDU, the user info field as well as the common info field may be additionally used.

For example, whether the trigger frame is the HE trigger frame, the EHT trigger frame, or the NEXT trigger frame may be identified on the basis of the trigger type subfield. For example, when the value of the trigger type subfield is a preconfigured value, the trigger frame may be the HE trigger frame. In addition, when the value of the trigger type subfield is a preconfigured value, the trigger frame may be the EHT trigger frame. When the value of the trigger type subfield is a preconfigured value, the trigger frame may be the NEXT trigger frame.

For example, when the value of the trigger type subfield is one of 0 to 7, the trigger frame may be the HE trigger frame, and when the value is not one of 0 to 7, the trigger frame may be the EHT trigger frame or the NEXT trigger frame. The trigger type subfield indicates various types of trigger frames, but in this case, it may be disadvantageous in that limited trigger type subfield spaces need to be used.

According to another embodiment, whether the trigger frame is the HE trigger frame, the EHT trigger frame, or the NEXT trigger frame may be identified on the basis of a UL length subfield of the trigger frame. For example, whether the trigger frame is the HE trigger frame, the EHT trigger frame, or the NEXT trigger may be identified on the basis of a value obtained by applying mod (remainder) calculation to the UL length subfield value. That is, whether the format of the PPDU to be transmitted as a response to the trigger frame is the HE PPDU or the EHT PPDU may be determined by using the value of the UL length subfield.

More specifically, whether the trigger frame is the HE trigger frame, the EHT trigger frame, or the NEXT trigger frame may be identified on the basis of a value obtained by applying mod (remainder) 3 calculation to the UL length subfield value. For example, when a result obtained by applying mod 3 to the UL length subfield value is not 0, the trigger frame may be the HE trigger frame. Alternatively, when a result obtained by applying mod 3 to the UL length subfield value is 1, the trigger frame may be the HE trigger frame. Alternatively, when a result obtained by applying mod 3 to the UL length subfield value is 0, the trigger frame may not be the HE trigger frame. Alternatively, when a result obtained by applying mod 3 to the UL length subfield value is 0, the trigger frame may be the EHT trigger frame or the NEXT trigger frame.

That is, when a value obtained by applying mod 3 to the UL length subfield value of the trigger frame is not 0, a response to the trigger frame may be transmitted to as the HE TB PPDU, and when a value obtained by applying mode 3 to the UL length subfield value is 1, a response to the trigger frame may be transmitted as the HE TB PPDU.

In addition, when a value obtained by applying mod 3 to the UL length subfield value of the trigger frame is 0, the format to be transmitted as a response to the trigger frame may be the EHT TB PPDU.

In addition, whether the trigger frame is the HE trigger frame, the EHT trigger frame, or the NEXT trigger frame may be identified by using an additional trigger frame classification method together with the method above. For example, by also using the classification method described in FIG. 16, whether the trigger frame is the HE trigger frame, the EHT trigger frame, or the NEXT trigger frame may be identified.

According to an embodiment, whether the format of the trigger frame is the HE trigger frame, the EHT trigger frame, or the NEXT trigger frame may be identified on the basis of the user info field of the trigger frame.

That is, similar to the common info field described above, whether the format of the trigger frame is the HE trigger frame or the EHT trigger frame may be identified on the basis of the user info field included in the trigger frame. That is, the format of the PPDU to be transmitted as a response to the trigger frame may be determined on the basis of the value of the specific subfield (second subfield) included in the user info field. For example, the non-AP STA may select the HE TB PPDU or the EHT TB PPDU according to a value of the user info field and transmit the same through an allocated RU. In this case, a specific subfield (first subfield) of the common info field as well as the user info field may be additionally used to identify the format of the PPDU.

That is, a variant for determining the format of the PPDU corresponding to a response to the trigger frame may be determined on the basis of the user info field of the trigger frame, and the format of the PPDU may be determined according to the determined variant. For example, when the variant for determining the format of the PPDU is determined as the HE variant by the user info field, the non-AP STA may respond with the HE TB PPDU, and when the variant for determining the format of the PPDU is determined by the user info field, the non-AP STA may respond with the EHT TB PPDU.

In this case, for the variant for determining the format of the PPDU, the common info field may be additionally used as well as the user info field.

For example, whether the trigger frame is the HE trigger frame, the EHT trigger frame, or the NEXT trigger frame may be identified on the basis of the AID12 subfield. According to an embodiment, the trigger frame may be identified as the HE trigger frame, the EHT trigger frame, or the NEXT trigger frame according to whether an AID12 subfield having a preconfigured value is included. In addition, in this case, there may be a problem in that an STA indicated by a user info field needs to keep checking an AID12 subfield existing after the user info field to determine the trigger frame format. To solve this problem, the user info field including the AID12 subfield indicating the type of the trigger frame may be present in the front part of the user info list. In addition, in order to prevent the HE STA, which cannot understand such a signaling method, from malfunctioning, the user info field including the AID12 subfield indicating the type of the trigger frame may be present after the user info fields corresponding to the HE STA.

In addition, in this case, the information of other subfield remaining after excluding the AID12 subfield included in the user info field may not be needed for a TB PPDU response, and thus subfields of the user info field including the AID12 subfield indicating the type of the trigger frame may be omitted. That is, the length of the user info field may vary on the basis of the AID12 subfield. Referring to FIG. 15, the AID12 subfield may play a role of indicating the TB PPDU format. For example, when the AID12 subfield is a preconfigured value, a response to the trigger frame including the AID12 subfield configured as the preconfigured value may be an EHT TB PPDU. For example, when the value of the AID12 subfield value is 2047, a response to the trigger frame including the AID12 subfield may be the EHT TB PPDU. In addition, when the AID12 subfield is a preconfigured value, a response to the trigger frame including the AID12 subfield configured as the preconfigured value may be a NEXT TB PPDU. For example, when the AID12 subfield value is 2048, a response to the trigger frame including the AID12 subfield may be the NEXT TB PPDU.

According to another embodiment, when a response is made on the basis of a user info field existing at a preconfigured location from an AID12 subfield having a preconfigured value, the response may be made in a TB PPDU format corresponding to the preconfigured value. For example, when the response is made on the basis of the user info field existing after the AID12 subfield having a preconfigured value, the response may be made in a TB PPDU format corresponding to the preconfigured value. If there are multiple values indicating the TB PPDU format and a response is made on the basis of a user info field existing after both predetermined value 1 and predetermined value 2, the response may be made in a TB PPDU format having a preconfigured priority, among a TB PPDU format corresponding to preconfigured value 1 and a TB PPDU format corresponding to preconfigured value 2. Referring to FIG. 17, when a response is made on the basis of a user info field existing after an AID12 subfield configured as 2047, the response may be made in an EHT TB PPDU. In addition, when a response is made on the basis of a user info field existing after an AID12 subfield configured as 2048, the response may be made in a NEXT TB PPDU. In addition, when a response is made on the basis of a user info field existing after both the AID12 subfield configured as 2047 and the AID12 subfield configured as 2048, the response may be made in a NEXT TB PPDU. In addition, when a response is made on the basis of a user info field existing before both the AID12 subfield configured as 2047 and the AID12 subfield configured as 2048, the response may be made in a HE TB PPDU.

In the present invention, an example in which an AID12 subfield indicates the type of a trigger frame, but the present invention is not limited thereto, and the type of the trigger frame may be indicated by other subfields of the user info field.

According to an embodiment, whether the trigger frame is the HE trigger frame, the EHT trigger frame, or the NEXT trigger frame may be identified on the basis of a padding field of the trigger frame. For example, whether the trigger frame is the HE trigger frame, the EHT trigger frame, or the NEXT trigger frame may be identified according to whether the padding field includes a preconfigured value indicating whether the trigger frame is the HE trigger frame, the EHT trigger frame, or the NEXT trigger frame.

According to an embodiment of the present invention, whether the trigger frame is the HE trigger frame, the EHT trigger frame, or the NEXT trigger frame may be identified by combining a method for classifying multiple trigger frames, described in the present invention. In addition, in the present invention, a description of the trigger frame is not limited thereto, and may be also applied to the TRS.

As another embodiment of the present invention, a frame of an AP may not able to indicate transmission of both the EHT PPDU and the HE PPDU through the triggering frame. That is, an EHT AP cannot transmit a trigger frame indicating both the HE TB PPDU and the EHT TB PPDU, and can indicate one PPDU format only.

FIG. 18 illustrates a UL MU operation according to another embodiment of the present invention.

As described above, transmission of a TB PPDU may be indicated through a TRS as well as a trigger frame. In addition, as described above, the TRS may be included in an HT control field. For example, when the HT control field includes an A-control field, the HT control field may include the TRS. The TRS may be transferred by the TRS control subfield. The A-control field may have a form in which control list fields can be consecutively connected. In addition, the control list field may include the TRS.

In addition, an intended receiver of a frame including the TRS may respond to the TRS. For example, an STA corresponding to an RA included in the frame including the TRS may respond to the TRS. The TRS may include information (UL data symbols) on the length of a frame or PPDU responding to the TRS, the location and size (RU allocation) of an RU to be used when responding to the TRS, information (AP Tx power and UL target RSSI) relating to power when responding to the TRS, information (UL HE-MCS) relating to a modulation method when responding to the TRS, and the like.

An embodiment of FIG. 18 may be a method for solving the problems described in FIGS. 14 to 15. In addition, as described above, an embodiment of the trigger frame may be also applied to the TRS. In addition, the details described above may be omitted.

According to an embodiment of the present invention, there may be a TRS (EHT TRS and NEXT TRS) defined in the EHT standard and the NEXT standard other than a TRS (HE TRS) defined in the HE standard. Accordingly, a TB PPDU responding to the TRS may be a HE TB PPDU, an EHT TB PPDU, and a NEXT TB PPDU according to whether the indicated TRS is the HE TRS, the EHT TRS, and the NEXT TRS. For example, a standard in which the TRS is defined may be determined through a control ID subfield of the A-control subfield. As an additional embodiment, the TRS may be divided into a HE TRS and a TRS other than the HE TRS.

Alternatively, for example, a standard in which the TRS is defined may be determined according to whether the HT control field is a HE variant, an EHT variant, or a NEXT variant. In addition, whether the HT control field is the HE variant, the EHT variant, or the NEXT variant may be determined according to a value of a preconfigured bit of the HT control field. For example, when B0 and B1 of the HT control field correspond to 1 and 1, the HT control field may be the HE variant. In addition, whether the HT control field is the HE variant, the EHT variant, or the NEXT variant may be determined by using an additional bit (for example, B31) and B0 and B1 of the HT control field.

According to an embodiment of the present invention, a TB PPDU format responding to the TRS may be determined on the basis of a PPDU format including the TRS. That is, when the PPDU indicating the PPDU transmission includes a TRS control subfield, the format of the PPDU may be determined on the basis of the format of the PPDU including the TRS control subfield. For example, when the format of the PPDU including the TRS control subfield is a HE PPDU, the format of the indicated PPDU may be the HE PPDU. However, when the format of the PPDU including the TRS control subfield is an EHT PPDU, the format of the indicated PPDU may be the EHT PPDU.

Referring to FIG. 18, when the TRS is transferred through the HE PPDU, the TB PPDU responding to the TRS may be the HE TB PPDU. In addition, when the TRS is transferred through the EHT PPDU, the TB PPDU responding to the TRS may be the EHT TB PPDU. In addition, when the TRS is transferred through the NEXT PPDU, the TB PPDU responding to the TRS may be the NEXT TB PPDU.

According to an embodiment of the present invention, interpretation on the subfield included in the TRS may vary on the basis of the PPDU format included in the TRS. For example, when the TRS is included in the HE PPDU, a UL HE-MCS subfield (or a subfield of an MCS) included in the TRS may indicate a value corresponding to a HE MCS table. When the TRS is included in the EHT PPDU, the UL HE-MCS subfield (or the subfield of the MCS) included in the TRS may indicate a value corresponding to an EHT MCS table. When the TRS is included in the NEXT PPDU, the UL HE-MCS subfield (or the subfield of the MCS) included in the TRS may indicate a value corresponding to a NEXT MCS table. In addition, interpretation on the RU allocation subfield may also vary on the basis of the PPDU format included in the TRS.

Figure 19:
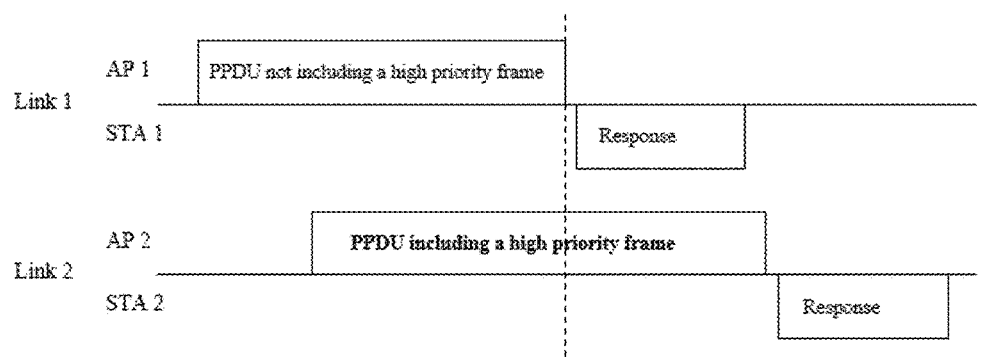
FIG. 19 illustrates end time alignment of a high priority frame according to an embodiment of the present invention.

FIG. 19 illustrates end time alignment of a high priority frame according to an embodiment of the present invention.

In an embodiment of the present invention, aligning a transmission end time of a PPDU or the transmission end time that is aligned may be referred to as end time alignment, PPDU end time alignment, ending time alignment, and the like.

According to an embodiment of the present invention, when an MLD transmits multiple PPDUs, the MLD may determine whether to perform end time alignment on the basis of whether a high priority frame is included in the multiple PPDUs. Alternatively, when the MLD transmits the multiple PPDUs, different end time alignment operations may be performed on the basis of whether a high priority frame is included in the multiple PPDUs. In addition, in the present invention, the end time alignment may mean that a difference between PPDU end times to be aligned is equal to or less than a preconfigured time.

In an embodiment of the present invention, the MLD may simultaneously start to transmit multiple PPDUs. In addition, when transmission start times of the multiple PPDUs transmitted by the MLD are exactly identical or a difference between the multiple transmission start times is equal to or less than a preconfigured time, it may be considered that transmission is simultaneously started. In addition, when the MLD simultaneously starts to transmit the multiple PPDUs, it may be referred to as start time sync.

Whether a frame corresponds to a high priority frame may be based on a traffic identifier (TID) or an access category (AC) corresponding to the frame. In addition, whether the frame corresponds to a high priority frame may be based a type and a subtype of the frame. The type and the subtype of the frame may be indicated by a MAC header of the frame. Alternatively, when the frame is transmitted within an allocated time interval, the frame may correspond to a high priority frame. In this case, time allocation for transmission of the high priority frame may be performed by an AP. In addition, according to an embodiment, there may be an absolute reference to determine whether the frame corresponds to a high priority frame. For example, a frame corresponding to a preconfigured TID or a preconfigured AC may be a high priority frame. According to another embodiment, whether a frame corresponds to a high priority frame may be relative to another frame. For example, whether a frame corresponds to a high priority frame may be determined on the basis of whether the frame has a higher priority than a frame transmitted in a different link. Alternatively, whether a frame corresponds to a high priority frame may be determined by a transmitter.

In addition, a non-STR MLD may correspond to an MLD for which simultaneous transmission or reception is limited in a using link pair. In this case, the link pair in which simultaneous transmission or reception is limited may be referred to as a non-STR link pair or an NSTR link pair. A link pair in which simultaneous transmission or reception is not limited may be referred to as an STR link pair.

According to an embodiment of the present invention, when an MLD transmits multiple PPDUs and the transmitted PPDUs include a high priority frame, end time alignment may not be performed. For example, even in a case where the multiple PPDUs are transmitted to a STA belonging to the same MLD, when the high priority frame is included, the end time alignment may not be performed. In addition, even in a case where both an MLD transmitting the multiple PPDUs and an MLD receiving the PPDUs do not operate in the SRT link pair (that is, even in a case where at least one MLD operates in the NSTR link pair), when the high priority frame is included, the end time alignment may not be performed.

According to an embodiment of the present invention, a case where end time alignment is not performed when the MLD transmits the multiple PPDUs and the transmitted PPDUs include a high priority frame may be limited to a case where a PPDU including the high priority frame starts to be transmitted earlier than a PPDU not including the high priority frame.

Referring to FIG. 19, there may be an AP MLD including AP 1 and AP 2. In addition, there may be a non-AP MLD including STA1 and STA2. The AP MLD and the non-AP MLD may be configured as a multi-link setup in Link 1 and Link 2. In addition, for the non-AP MLD, Link 1 and Link 2 may be an NSTR link pair. AP 1 and STA1 may operate in Link 1, and AP 2 and STA 2 may operate in Link 2. The AP MLD may transmit multiple PPDUs. A time for which AP 1 transmits a PPDU and a time for which AP 2 transmits a PPDU may overlap. In addition, the PPDU transmitted by AP 1 may not include a high priority frame. The PPDU transmitted by AP 2 may include a high priority frame. In addition, the PPDU transmitted by AP 1 and the PPDU transmitted by AP 2 may be subject to start time sync, or the PPDU transmitted by AP 2 may start earlier than the PPDU transmitted by AP 1. In this case, for the PPDU transmitted by AP 1 and the PPDU transmitted by AP 2, the end time alignment may not be performed. Referring to FIG. 19, the PPDU transmitted by AP 2 may end later than the PPDU transmitted by AP 1. When the end time alignment is performed for the PPDU transmitted by AP 1 and the PPDU transmitted by AP 2, AP 2 may fail to transmit the high priority frames to be transmitted in one PPDU and need to terminate the PPDU. Accordingly, by not performing the end time alignment for the PPDU including the high priority frame, the high priority frame may be promptly transmitted.

In addition, in the embodiment of FIG. 19, a frame transmitted by AP 1 may require an immediate response. A frame transmitted by AP 2 may require an immediate response.

However, in the embodiment of FIG. 19, by responding to the frame transmitted by AP 1, STA 1 may interrupt reception of the high priority frame.

Accordingly, according to an embodiment of the present invention, when an STA of an MLD receives a high priority frame in another link, the STA may not transmit an immediate response even through transmission of the immediate response is required. In the embodiment of FIG. 19, STA 2 receives the high priority frame, and thus STA 1 may not transmit an immediate response required by the frame transmitted by AP 1.

In addition, according to an embodiment of the present invention, in a case where the MLD has received a frame in the NSTR link pair and the frame requires an immediate response, when the response to the frame interrupts reception in another link, the response may not be transmitted. However, according to an embodiment of the present invention, this is limited to a case where the frame does not correspond to a high priority frame. That is, when the MLD has received a frame in the NSTR link pair and the frame requires an immediate response, the response should be mandatorily transmitted even though the response to the frame interrupts reception in another link.

FIG. 20 illustrates another example of end time alignment of a high priority frame according to an embodiment of the present invention.

The present embodiment may relate to end time alignment or a PPDU end time, and conditions related to a transmission MLD or a reception MLD operating in the NSTR link pair, a PPDU including a frame requiring an immediate response, a PPDU including a QoS data frame, a PPDU including a QoS data frame requiring an immediate response, transmission of multiple PPDUs by STAs of the same MLD, receiving the multiple PPDUs by STAs of the same MLD, and the like, may be omitted. The described embodiment may be performed when such conditions are satisfied.

Referring to FIG. 20, there may be an AP MLD including AP 1 and AP 2. In addition, there may be a non-AP MLD including STA 1 and STA 2. The AP MLD and the non-AP MLD may be configured as a multi-link setup in Link 1 and Link 2. In addition, for the non-AP MLD, Link 1 and Link 2 may be an NSTR link pair. AP 1 and STA1 may operate in Link 1, and AP 2 and STA 2 may operate in Link 2. The AP MLD may transmit multiple PPDUs. A time for which AP 1 transmits a PPDU and a time for which AP 2 transmits a PPDU may overlap. In addition, the PPDU transmitted by AP 1 may include a high priority frame. The PPDU transmitted by AP 2 may not include a high priority frame. In addition, the PPDU transmitted by AP 1 and the PPDU transmitted by AP 2 may be subject to start time sync, or the PPDU transmitted by AP 1 may start earlier than the PPDU transmitted by AP 2

Case 1 shown in FIG. 20A and Case 2 shown in FIG. 20B may correspond to an embodiment of not performing end time alignment.

In Case 1, a PPDU transmitted by AP 2 may end later than a PPDU transmitted by AP 1. In this case, reception of a high priority frame may not be interrupted by in-device interference. However, a response to a PPDU including the high priority frame may interrupt reception of a PPDU not including the high priority frame.

In Case 2, a PPDU transmitted by AP 2 may end earlier than the PPDU transmitted by AP 1. In this case, when the PPDU transmitted by AP 2 requires an immediate response and STA 2 has transmitted the response, transmission of STA 2 may interrupt reception of the high priority frame in link 1. Accordingly, prompt receiving of the high priority frame may not be successfully performed.

Case 3 shown in FIG. 20C may be an embodiment of performing end time alignment. Accordingly, when a PPDU including the high priority frame is received, the reception may not be interrupted by in-device interference. As in Case 2, a problem that reception of the high priority frame is interrupted can be solved.

According to an embodiment of the present invention, even when multiple PPDUs including the high priority frame are transmitted, whether to perform end time alignment may be determined on the basis of a preconfigured condition (Case 3). More specifically, even when multiple PPDUs including the high priority frame are transmitted, end time alignment may be performed in a preconfigured condition (Case 3). This case may be a case where at least one PPDU includes the high priority frame. The preconfigured condition may include a case where one PPDU includes the high priority frame, and the other PPDU does not include the high priority frame. The preconfigured condition may include a case where a PPDU including the high priority frame starts to be transmitted earlier than a PPDU not including the high priority frame, or a case whether both PPDUs simultaneously start to be transmitted. In addition, the preconfigured condition may include a case where a frame of the PPDU not including the high priority frame may include a case of requesting an immediate response.

In addition, whether to perform end time alignment may be determined by combining the above-described preconfigured conditions. For example, when PPDU 1 including the high priority frame and PPDU 2 not including the high priority frame are transmitted and PPDU 1 starts to be transmitted earlier than PPDU 2 or PPDU 1 and PPDU 2 simultaneously start to be transmitted, end time alignment may be performed for PPDU 1 and PPDU2. More specifically, in a case where PPDU 1 including the high priority frame and PPDU 2 not including the high priority frame are transmitted and PPDU 1 starts to be transmitted earlier than PPDU 2 or PPDU 1 and PPDU 2 simultaneously start to be transmitted, when the frame included in PPDU 2 requires an immediate response, end time alignment may be performed for PPDU 1 and PPDU2. In addition, when a condition for performing end time alignment is not satisfied, the end time alignment may not be performed.

According to another embodiment of the present invention, even when multiple PPDUs including the high priority frame are transmitted, whether to perform end time alignment or a PPDU end time may be determined on the basis of a preconfigured condition (Case 1 or Case 3). More specifically, even when multiple PPDUs including the high priority frame, end time alignment may be performed or a PPDU end time may be determined in a preconfigured condition (Case 1 or Case 3). More specifically, even when multiple PPDUs including the high priority frame are transmitted, end time alignment may be performed or a PPDU not including the high priority frame may end later than a PPDU including the high priority frame in a preconfigured condition. The preconfigured condition may include a case where one PPDU includes the high priority frame and the other PPDU does not include the high priority frame. The preconfigured condition may include a case where a PPDU including the high priority frame may start to be transmitted earlier than a PPDU not including the high priority frame, or both PPDUs simultaneously start to be transmitted. In addition, the preconfigured condition may include a case where a frame of a PPDU not including the high priority frame requests an immediate response.

In addition, whether to perform end time alignment may be determined by combining the above-described preconfigured conditions. For example, when PPDU 1 including the high priority frame and PPDU 2 not including the high priority frame are transmitted and PPDU 1 starts to be transmitted earlier than PPDU 2 or PPDU 1 and PPDU 2 simultaneously start to be transmitted, end time alignment may be performed for PPDU 1 and PPDU 2 or PPDU 2 may end later than PPDU 1. More specifically, in a case where PPDU 1 including the high priority frame and PPDU 2 not including the high priority frame are transmitted and PPDU 1 starts to be transmitted earlier than PPDU 2 or PPDU 1 and PPDU 2 simultaneously start to be transmitted, when the frame including PPDU 2 requires an immediate response, end time alignment may be performed for PPDU 1 and PPDU 2 or PPDU 2 may end later than PPDU 1. In addition, when a condition in which the end time alignment is performed or one PPDU ends later than the other PPDU is not satisfied, there may be no limit of a transmission end time. Alternatively, a condition in which the end time alignment is performed or one PPDU ends later than the other PPDU is not satisfied, it is possible to mandatorily perform the end time alignment.

Figure 21:
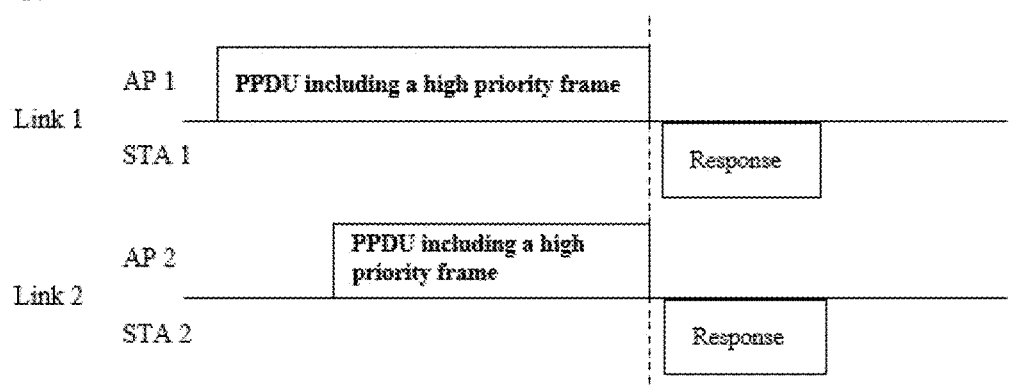
FIG. 21 illustrates another example of end time alignment of a high priority frame according to an embodiment of the present invention.

FIG. 21 illustrates another example of end time alignment of a high priority frame according to an embodiment of the present invention.

In an embodiment of FIG. 21, the details described in FIG. 20, etc. may be omitted. The present embodiment may relate to end time alignment or a PPDU end time, and conditions related to a transmission MLD or a reception MLD operating in an NSTR link pair, a PPDU including a frame requiring an immediate response, a PPDU including a QoS data frame, a PPDU including a QoS data frame requiring an immediate response, a case where STAs in the same MLD transmit multiple PPDUs and STAs in the same MLD receive multiple PPDUs, and the like, may be omitted. The described embodiment may be performed when such conditions are satisfied.

According to an embodiment of the present invention, when multiple PPDUs including a high priority frame are transmitted, whether to perform end time alignment may be determined or a PPDU end time may be determined on the basis of whether two or more PPDUs include the high priority frame. Alternatively, when multiple PPDUs including the high priority frame are transmitted, whether to perform end time alignment may be determined on the basis of whether two or more PPDUs include the high priority frame.

According to an embodiment, when an MLD transmits multiple PPDUs and two or more transmitted PPDUs include a high priority frame, there may be no limit of a PPDU end time. For example, in this case, even in a case where the above-described condition for executing a limit of not only end time alignment but also a PPDU end time is satisfied, there may be no limit of a PPDU end time. For example, even though one MLD transmits PPDUs including a frame (for example, a QoS data frame) requiring an immediate response to STAs belonging to the same MLD and the STAs operate in an NSTR link pair, end time alignment may not be performed for the transmitted PPDUs. This is because for end time alignment, redundancy such as padding needs to be included in a PPDU and a reception completion time point of a frame of the PPDU including the redundancy may be delayed by the included redundancy. In addition, this is because when end time alignment is not performed, a PPDU may interrupt reception by in-device interference. Accordingly, a transmitting MLD may determine whether to apply a limit of a PPDU end time. Alternatively, for the limit of the PPDU end time, a receiving MLD may perform recommendation.

According to another embodiment, when an MLD transmits multiple PPDUs and two or more transmitted PPDUs include a high priority frame, end time alignment may be performed for the multiple PPDUs. For example, when the MLD transmits two PPDUs and each of the two transmitted PPDUs includes a high priority frame, end time alignment may be performed for the multiple PPDUs. This is because when the end time alignment is not performed, reception of a PPDU may be interrupted by in-device interference. In addition, this embodiment may be limited to a case where two or more PPDUs including the high priority frame require an immediate response. For example, in a case where the MLD transmits two PPDUs, when each of the two transmitted PPDUs includes the high priority frame and requires an immediate response, end time alignment may be performed for the two PPDUs.

Referring to FIG. 21, there may be an AP MLD including AP 1 and AP 2. In addition, there may be a non-AP MLD including STA 1 and STA 2. The AP MLD and the non-AP MLD may be configured as a multi-link setup in Link 1 and Link 2. In addition, for the non-AP MLD, Link 1 and Link 2 may be an NSTR link pair. AP 1 and STA1 may operate in Link 1, and AP 2 and STA 2 may operate in Link 2. The AP MLD may transmit multiple PPDUs. A time for which AP 1 transmits a PPDU and a time for which AP 2 transmits a PPDU may overlap. In addition, the PPDU transmitted by AP 1 and the PPDU transmitted by AP 2 may include a high priority frame. In addition, the PPDU transmitted by AP 1 and the PPDU transmitted by AP 2 may be or may not be subject to start time sync. In this case, end time alignment may be performed for the PPDU transmitted by AP 1 and the PPDU transmitted by AP 2 and the PPDUs may be transmitted. This may be because each of the PPDU transmitted by AP 1 and the PPDU transmitted by AP 2 may require an immediate response. In this case, the high priority frame included in the PPDU transmitted by AP 1 may require an immediate response. In addition, the high priority frame included in the PPDU transmitted by AP 2 may require an immediate response.

In the embodiments of FIGS. 19 to 21, when a PPDU includes a high priority frame, it may mean that the PPDU includes at least one high priority frame. In addition, when a PPDU does not include a high priority frame, it may mean that the PPDU includes no priority frame at all.

Figure 22:
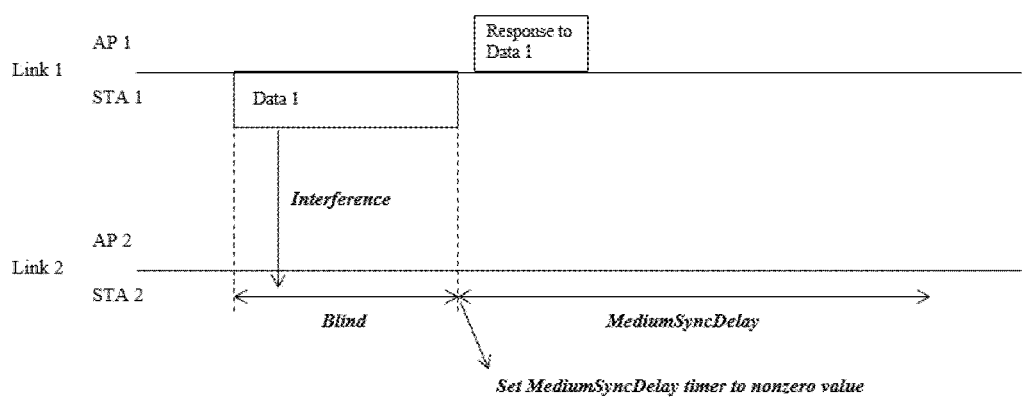
FIG. 22 illustrates an example of a medium access recovery procedure according to an embodiment of the present invention.

FIG. 22 illustrates an example of a medium access recovery procedure according to an embodiment.

According to an embodiment of the present invention, simultaneous transmission or reception by a multi-link device (MLD) in multiple links may be limited. The limitation may indicate impossibility. In addition, simultaneous transmission or reception may include performing transmission in one link and reception in another link at least simultaneously (at least at the same time point). In addition, whether or not simultaneous transmission or reception in multiple links is limited may be based on each link and capability of the MLD. That is, there may be an MLD which is limited to perform simultaneous transmission or reception in multiple links, and there may be an MLD which is not limited. In addition, when an MLD operates in a link set, simultaneous transmission or reception in multiple links may be limited, and when the MLD operates in one link set and another link set, simultaneous transmission or reception in multiple links may not be limited. In addition, a case where simultaneous transmission/reception is possible in multiple links may be referred to as simultaneous transmission and reception (STR). When the STR is limited, it may be referred to as non-STR or NSTR.

That is, when STAs included in the same MLD may perform simultaneous transmission/reception in multiple links, respectively, this may be referred to as STR, and a pair of links in which such an STR operation is possible may be referred to as an STR link pair. However, when STAs included in the same MLD perform a transmission or reception operation in each link and transmission or reception in another is impossible due to interference of the transmission or reception operation, this may be referred to as NSTR, and a pair of links of such an NSTR operation may be referred to as an NSTR link pair.

When STR is not limited, it may be referred to as STR. In addition, for an MLD, a link pair in which STR is limited and a link pair in which STR is not limited may be referred to as an STR link pair and an NSTR link pair, respectively. In addition, an MLD for which the STR is limited and an MLD for which the STR is not limited may be referred to as an STR MLD and an NSTR MLD, respectively. When at least one link pair of an operating link set is an NSTR link pair, the MLD may be an NSTR MLD. In an embodiment of the present invention, a description of an MLD operating in an NSTR (or STR) link pair may be read as an embodiment in which an NSTR (or STR) MLD is described. A description of an NSTR (or STR) MLD may be read as an embodiment in which an MLD operating in an NSTR (or STR) link pair is described.

The reason why the STR is limited may be because transmission in one link by an MLD causes interference to transmission in another link. More specifically, the reason why the STR is limited may be because transmission in one link by an MLD causes interference to reception in another link by the MLD. Such interference may be referred to as in-device interference. In another embodiment, the reason why the STR is limited may be because the number of radios of the MLD is limited. For example, the STR of an MLD operating in a single radio may be limited. The MLD operating in the single radio may perform transmission or reception in one link at a time. Alternatively, the MLD operating in a single radio may perform simultaneous listening or monitoring in multiple links, but reception or transmission may be possible in one link at a time. In this case, the listening or monitoring may mean reception of a preconfigured PPDU or frame.

According to an embodiment of the present invention, PPDU end time alignment may be performed so that the MLD does not perform simultaneous transmission or reception in an NSTR link pair. According to an embodiment, MLD 1 may transmit multiple PPDUs to MLD 2 in multiple links. In this case, when a link pair including multiple links is an NSTR link pair for MLD 1 or MLD 2, end time alignment may be performed for PPDUs transmitted in the NSTR link pair. The PPDU end time alignment corresponds to aligning a difference between end times of multiple PPDUs so that the difference is equal to or less than a preconfigured time. The preconfigured time may be 8 us. Alternatively, when a PPDU includes a trigger frame and a CS required subfield (a subfield indicating whether to respond to a trigger frame on the basis of carrier sensing (CS)) included in the trigger frame indicates to make a response on the basis of a CS result, the preconfigured time may be 4 us. In a case where a PPDU includes a trigger frame and a CS required subfield (a subfield indicating whether to respond to a trigger frame on the basis of carrier sensing (CS)) included in the trigger frame indicates to make a response on the basis of a CS result, when a PPDU other than the PPDU described above ends first and end time alignment is performed for the PPDUs, the preconfigured time may be 4 us. The MLD shall ensure that the end time of one or more PPDUs that carries a frame soliciting an immediate response frame is at most 4 us earlier than the end time of any of PPDUs containing a trigger frame with the CS required subfield set to 1. In addition, performing end time alignment of PPDUs may be limited to a case where a frame included in at least one of the PPDUs solicits an immediate response. Alternatively, performing end time alignment of PPDUs may be limited to a case where a frame included in at least two of the PPDUs solicits an immediate response. To perform the end time alignment, padding may be added.

According to an embodiment, when an MLD transmits PPDUs in multiple links, start time sync may be performed. The MLD may be an MLD operating in the NSTR link pair. The MLD may acquire a transmission opportunity in each link on the basis of a backoff procedure or a backoff counter, and transmit a PPDU. For example, a PPDU may be transmitted at a slot boundary at which the backoff counter is 0. This may be a case of using a distributed coordination function (DCF). Alternatively, a PPDU may be transmitted at a slot boundary subsequent to a slot boundary at which a backoff counter is 0. This may be a case of using enhanced distributed channel access (EDCA) (an EDCA function (EDCAF)). However, in a case of an MLD operating in an NSTR link pair, once a PPDU starts to be transmitted in one link, the transmission influences another link and causes a state to be determined as a busy state, and thus there may be a problem in that it is difficult to simultaneously perform transmission of the PPDU and transmission in another link. Accordingly, according to an embodiment of the present invention, a STA, the backoff counter of which has reached 0, may not perform transmission and maintain the backoff counter as 0. In addition, the STA maintaining the backoff counter as 0 may perform transmission when a backoff counter of an STA belonging to the same MLD reaches 0.

According to an embodiment of the present invention, when there are link 1 and link 2 constituting an NSTR link pair and transmission is performed in link 1, it may be difficult for an MLD operating in the NSTR link pair perform reception in link 2. Accordingly, it may be difficult to receive duration information of a frame or a PPDU transmitted from other STAs in link 2. When such a case occurs in link 2, an STA operating in link 2 of the MLD operating in the NSTR link pair may be represented that the STA has lost medium synchronization. Alternatively, when such a case occurs in link 2, it may be represented that the STA operating in link 2 of the MLD operating in the NSTR link pair is blinded. In this case, the STA operating in link 2 of the MLD operating in the NSTR link pair may fail to receive the transmitted duration information, and an operation of deferring channel access, which would have been performed if the duration information was received, may not be performed. Accordingly, transmission and reception of other STAs may be interrupted.

Referring to FIG. 19, there may be AP 1 and AP 2 operating in link 1 and link 2, respectively, and AP 1 and AP 2 may belong to the same MLD, which is an AP MLD. In addition, there may be STA 1 and STA 2 operating in link 1 and link 2, respectively, and STA 1 and STA 2 may belong to the same MLD which is a non-AP MLD. In addition, the AP MLD and the non-AP MLD may be configured in link 1 and link 2 as a multi-link setup. In addition, the non-AP MLD may be an NSTR MLD. Alternatively, for the non-AP MLD, link 1 and link 2 may correspond to an NSTR link pair. STA 1 may transmit data 1. In this case, transmission of date 1 may causes interference to STA 2. Accordingly, STA 2 may be blinded in an interval for which data 1 is transmitted.

According to an embodiment of the present invention, to alleviate a problem which may be caused when an STA fails to receive duration while the STA is blinded, channel access may be limited for the STA for a predetermined time. Such a predetermined time may be referred to as MediumSyncDelay. Alternatively, limiting channel access for a predetermined time may be described as applying MediumSyncDelay. According to an embodiment, to apply MediumSyncDelay for a predetermined time, a MediumSyncDelay timer is configured as a value other than 0, and MediumSyncDelay may be applied while the value of the timer is not 0. In addition, the predetermined time may start when blinding is released. Alternatively, the predetermined time may start at a time point at which transmission which has caused the blinding ends. Referring to FIG. 19, after transmission of data 1 ends, STA 2 may configure the MediumSyncDelay timer as a value other than 0. In this case, the MediumSyncDelay timer may be configured as a MediumSyncDelay value. For STA 2, channel access may be limited for MediumSyncDelay. For example, the STA applying the MediumSyncDelay may belong to an MLD operating in an NSTR link pair. Alternatively, the STA applying the MediumSyncDelay may belong to an NSTR MLD. In addition, the STA applying the MediumSyncDelay may belong to a non-AP MLD.

According to an embodiment, when a period of transmission causing blinding is shorter than a preconfigured time, the MediumSyncDelay may not be applied.

According to an embodiment, for a value of MediumSyncDelay, there may be a default value. The default value may be maximum duration of a PPDU. The maximum duration of the PPDU may be 5.484 ms. In addition, a value of the MediumSyncDelay may be a value transmitted from a peer MLD (AP MLD) configured as a multi-link setup. If the non-AP MLD has failed to receive the value of the MediumSyncDelay from the AP MLD, a default value may be used for the value of MediumSyncDelay. If the non-AP MLD has received the value of the MediumSyncDelay from the AP MLD, the received value may be used for the value of MediumSyncDelay.

The limiting of channel access when the MediumSyncDelay is applied may include the following operation. For example, the limiting of channel access may be related to a case where an attempt is made to acquire a transmission opportunity (TXOP). The limiting of channel access may include limiting of a type of the first transmitted frame when the TXOP is acquired. The type of the frame may be defined by a type subfield or a subtype subfield indicated by a MAC header of the frame. For example, the type of the first frame may be a request-to-send (RTS) frame. The RTS frame may be a type of a control frame. In addition, in a case of the control frame, type subfield B3 and B2 bits may be configured by 0 and 1, respectively. In addition, in a case of an RTS frame, subtype subfield B7, B6, B5, and B4 bits may be configured as 1, 0, 1, and 1, respectively. In this case, a bit index may be a bit index of a frame control field. B2 may be a least significant bit (LSB) of the type subfield, and B3 may be a most significant bit (MSB) of the type subfield. B4 may be an LSB of the subtype subfield, and B7 may be an MSB of the subtype subfield. Accordingly, when an STA transmits an RTS frame as the first frame and has failed to receive a CTS frame corresponding to a response to the RTS frame, the STA may not continue to perform transmission. Accordingly, even though there is duration information having failed to be received for blinding, the duration information may not largely interrupt transmission of another STA. Alternatively, the limiting of channel access may include limiting of the length of the size of the first transmitted or frame or PPDU when the TXOP is acquired. For example, the length or the size of the first frame or PPDU needs to be smaller than a preconfigured value. Accordingly, even though there is duration information having failed to be received by an STA for blinding, the duration information may not largely interrupt transmission of another STA.

In addition, the limiting of channel access may include changing a clear channel assessment (CCA) threshold. More specifically, limiting of channel access may include changing a clear channel assessment (CCA) threshold lower than the conventional threshold. According to an embodiment, if a signal having a value equal to or greater than a CCA threshold (or a value greater than a CCA threshold) is detected, it may be determined that the channel is busy. If not, it may be determined that the channel is idle. The CCA threshold may include a threshold detecting a PPDU (Wi-Fi signal). The CCA using such a CCA threshold may be referred to as CCA preamble detection (or packet detection) (PD), and in this case, the threshold may be referred to as a CCA PD threshold or a PD threshold. The CCA threshold may include a threshold for detecting any signal. The CCA using such a CCA threshold may be referred to as CCA energy detection (ED), and in this case, the threshold may be referred to as a CCA ED threshold or an ED threshold. More specifically, limiting of the channel access may mean changing an ED threshold. When the MediumSyncDelay is not applied, the PD threshold may be −82 dBm. When the MediumSyncDelay is not applied, the ED threshold may be −62 dBm. When the MediumSyncDelay is applied, for the CCA threshold, there may be a default value. In addition, when the MediumSyncDelay is applied, the CCA threshold may be a value transmitted from a peer MLD (AP MLD) configured as a multi-link setup. If the non-AP MLD has failed to receive the CCA threshold from the AP MLD when the MediumSyncDelay is applied, for the CCA threshold in a case where the MediumSyncDelay is applied, a default value may be used. If the non-AP MLD has received the CCA threshold from the AP MLD when the MediumSyncDelay is applied, the received value may be used for the CCA threshold in a case where the MediumSyncDelay is applied. According to an embodiment, when the MediumSyncDelay is applied, an ED threshold default value may be −72 dBm. A value which can be indicated as the ED threshold when the MediumSyncDelay is applied may be −72 dBm or greater. The ED threshold when the MediumSyncDelay is applied may be dot11MSDOFDMEDthreshold. Lowering the CCA threshold more when the MediumSyncDelay is applied compared to when the MediumSyncDelay is not applied may conservatively performing channel access according to the lowered CCA threshold. A signal determined as idle when the conventional CCA threshold is used may be determined as busy when the lower CCA threshold is used. In addition, according to an embodiment, the CCA threshold mentioned in the present invention may be a threshold corresponding to a 20 MHz subchannel.

In addition, the limiting of channel access may include limiting of the number of transmission opportunities for the MediumSyncDelay. For example, the STA may not attempt to perform a predetermined number or more times of transmission for the MediumSyncDelay. That is, if the STA has failed to perform a predetermined number of times of transmission for the MediumSyncDelay, the STA may not attempt to perform transmission any more for the MediumSyncDelay. Such a predetermined number of times may be MSD_TXOP_MAX. In order not to attempt to perform transmission, a backoff procedure may be invoked. Alternatively, in order not to attempt to perform transmission, a backoff counter may be reset. According to an embodiment, in this case, a contention window (CW) may be left unchanged. The CW may be a value used when the backoff counter is reset. For example, for the value reset when the backoff counter is reset, an integer randomly selected from among 0 to the CW value may be used. In addition, in order not to attempt to perform transmission, a retry counter may be left unchanged when the backoff counter is reset. If the retry counter reaches a preconfigured value, a frame, for which an attempt to perform transmission is made, may not be transmitted any more, or a frame, for which an attempt to perform transmission is made, may be discarded. According to an embodiment, for a value of the MSD_TXOP_MAX, there may be a default value. The default value may be 1. In addition, the value of the MediumSyncDelay may be a value transmitted from a peer MLD (AP MLD) configured as a multi-link setup. If the non-AP MLD has failed to receive the value of the MSD_TXOP_MAX from the AP MLD, for the value of the MSD_TXOP_MAX, a default value may be used. If the non-AP MLD has received the value of the MSD_TXOP_MAX from the AP MLD, the received value may be used for the value of the MSD_TXOP_MAX.

Figure 23:
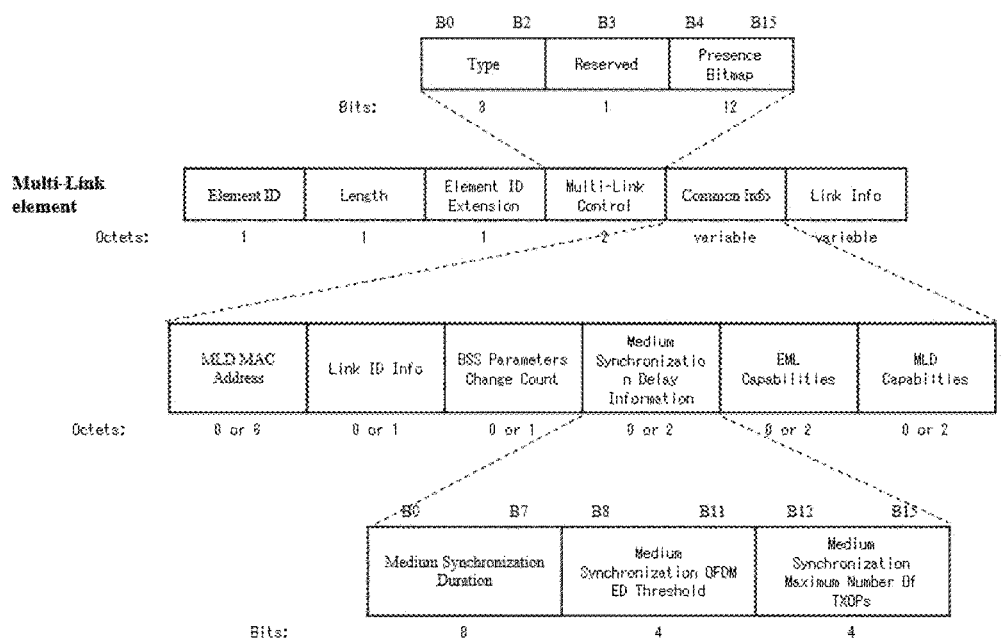
FIG. 23 illustrates an example of signaling related to MediumSyncDelay and a multi-link element according to an embodiment of the present invention.

FIG. 23 illustrates an example of signaling related to MediumSyncDelay and a multi-link element according to an embodiment of the present invention.

Referring to FIG. 23, an STA of an MLD may transmit a frame including information related to a medium sync delay.

Specifically, there may be a multi-link element as shown in FIG. 23. The Multi-link discovery, setup, and operation may be performed on the basis of a frame including the multi-link element. For example, the multi-link element may be included in a beacon frame, a probe request frame, a probe response frame, an authentication frame, an association request frame, an association response frame, a reassociation request frame, a reassociation response frame, and the like.

The multi-link element may include element ID, length, element ID extension, multi-link control, common info, and link info fields. The element ID or the element ID extension may indicate a type of an element including the element ID or the element ID extension, that is, may indicate whether the element corresponds to a multi-link element. The length field may indicate the length of an element including the length field. The multi-link control field may include a type subfield and a presence bitmap field. The type subfield may indicate a type of the multi-link element. In addition, a format of the multi-link element may be determined on the basis of the type of the multi-link element. The presence bitmap field may indicate whether a subfield which can be included in the multi-link element is included. For example, the presence bitmap field may indicate whether a subfield which can be included in the common info field included in the multi-link element is included. The subfield indicating whether the presence bitmap field is included may include MLD MAC address, link ID info, BSS parameters change count, medium synchronization delay information, EML capabilities, and MLD capability field (subfield). In addition, the medium synchronization delay information field may include information related to MediumSyncDelay.

The common info field may include information relating to multiple links or all links. The common info field may include the same information or commonly required information for multiple links or all links. The link info field may include information on each link.

According to an embodiment, for information related to MediumSyncDelay, there may be a default value. In addition, information related to MediumSyncDelay may be signaled. For example, information related to MediumSyncDelay may be signaled may be included in the medium synchronization delay information field shown in FIG. 20. The MLD may initialize the information related to MediumSyncDelay as a default value. In addition, when an MLD (non-AP MLD) has failed to receive the information related to MediumSyncDelay from a peer MLD (AP MLD), for the information related to MediumSyncDelay, a default value may be used. When an MLD (non-AP MLD) has received the information related to MediumSyncDelay from a peer MLD (AP MLD), for the information related to MediumSyncDelay, the received value may be used.

The medium synchronization delay information field may include a medium synchronization duration subfield, a medium synchronization OFDM ED threshold subfield, and a subfield of a medium synchronization maximum number of TXOPs.

The medium synchronization duration subfield may indicate MediumSyncDelay. That is, the medium synchronization duration subfield may indicate a value for configuring a MediumSyncDelay timer. For example, the medium synchronization duration subfield may be 8 bits. In addition, the medium synchronization duration subfield may indicate 32 us-unit duration. That is, when the medium synchronization duration subfield is configured as A, a time indicated by the medium synchronization duration subfield may be A*32 us.

The medium synchronization OFDM ED threshold subfield may indicate a CCA threshold when MediumSyncDelay is applied. More specifically, in this case, the indicated CCA threshold may be a CCA ED threshold. That is, the medium synchronization OFDM ED threshold subfield may indicate dot11MSDOFDMEDthreshold. The medium synchronization OFDM ED threshold subfield may be 4 bits. A CCA threshold indicated by the medium synchronization OFDM ED threshold subfield may be a value acquired by adding −72 to a value of the medium synchronization OFDM ED threshold subfield, and the unit thereof may be dBm. Accordingly, a CCA threshold indicated when the medium synchronization OFDM ED threshold subfield has a value equal to or greater than 0 may be a value equal to or greater than −72 dBm. In addition, a maximum CCA threshold indicated by the medium synchronization OFDM ED threshold subfield may be −62 dBm. In this case, the medium synchronization OFDM ED threshold subfield may be configured as a value of 0 to 10. In this case, a value of 11 to 15 may be reserved. That is, when a value of the medium synchronization OFDM ED threshold subfield is 0 to 10, each value may indicate a CCA threshold of −72 dBm to −62 dBm.

The subfield of the medium synchronization maximum number of TXOPs may indicate MSD_TXOP_MAX. That is, the subfield of the medium synchronization maximum number of TXOPs may indicate a maximum number of transmission opportunities while MediumSyncDelay is applied. The subfield of the medium synchronization maximum number of TXOPs may be 4 bits. According to an embodiment, a value of the subfield of the medium synchronization maximum number of TXOPs may be a value of MSD_TXOP_MAX. According to another embodiment, the value of the subfield of the medium synchronization maximum number of TXOPs may be a value of (MSD_TXOP_MAX+1). According to another embodiment, the value of the subfield of the medium synchronization maximum number of TXOPs may be a value of (MSD_TXOP_MAX−1). In addition, this may be limited to a case where the value of the subfield of the medium synchronization maximum number of TXOPs is not configured as a maximum value. When the value of the subfield of the medium synchronization maximum number of TXOPs is configured as a maximum value (15 in a 4-bit case), the subfield may indicate that there is not limit of a transmission opportunity.

Figure 24:
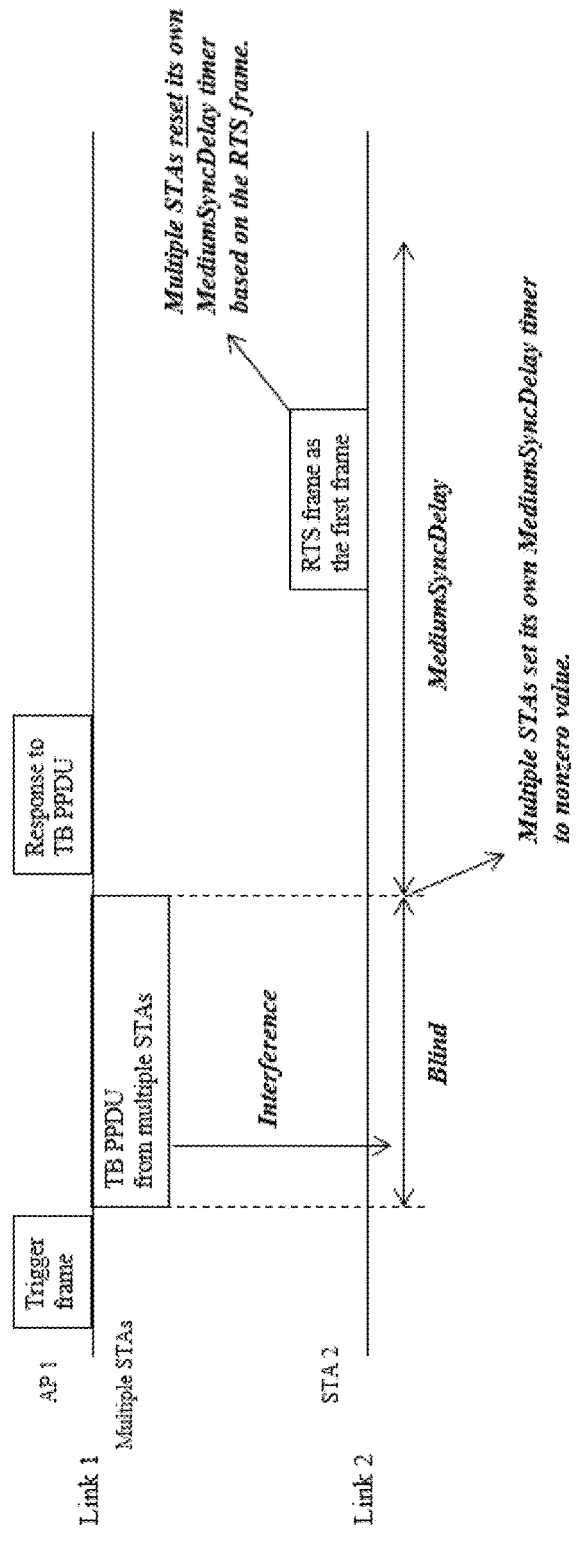
FIG. 24 illustrates an example of a MediumSyncDelay timer reset operation according to an embodiment of the present invention.

FIG. 24 illustrates an example of a MediumSyncDelay timer reset operation according to an embodiment of the present invention.

Referring to FIG. 24, in a case of an NSTR ink pair included in the same MLD, when transmission is performed in one link, transmission or reception in another link may not be allowed, and once the transmission ends, transmission or reception may be performed after a medium link delay is applied.

Specifically, there may be a method for avoiding the STA to which the MediumSyncDelay is applied to unnecessarily apply the MediumSyncDelay. For example, the MediumSyncDelay is applied because there may be duration information, a frame, or a PPDU which may have failed to be received while the STA belonging to the MLD operating in the NSTR link pair is blinded. However, actually, there may be no duration, frame, or PPDU which has failed to be received during the blinding. Even in such a case, through application of the MediumSyncDelay, there may be a method for alleviating a problem of channel access being limited.

According to an embodiment, the STA to which the MediumSyncDelay is applied has received valid duration information for the MediumSyncDelay, the MediumSyncDelay timer may be reset (or set) to 0. In an embodiment of the present invention, an STA to which the MediumSyncDelay is applied may have the same meaning as an STA having a MediumSyncDelay timer value other than 0. In addition, applying MediumSyncDelay by an STA or an MLD may have the same meaning as configuring a MediumSyncDelay timer value other than 0. In addition, resetting the MediumSyncDelay timer to 0 may have the same meaning as terminating the application of the MediumSyncDelay.

According to an embodiment of the present invention, duration information may be included in a frame. More specifically, the duration information may include a MAC header included in the frame. More specifically, the duration information may be included in a duration/ID field included in the MAC header. Accordingly, when the STA to which the MediumSyncDelay is applied has received a valid frame or MPDU for the MediumSyncDelay, the MediumSyncDelay timer may be reset to 0. In the present invention, descriptions of the frame, the MPDU, the MAC header, the duration/ID field, and the duration information may be interchangeably used.

In addition, the duration information may be included in a PPDU. More specifically, the duration information may be included in a preamble included in the PPDU. More specifically, the duration information may be included in a TXOP field included in the preamble. In addition, the TXOP field may be included in a HE-SIG-A field included in a HE PPDU. In addition, the TXOP field may be included in a U-SIG field included in an EHT PPDU or a PPDU of a standard in the future of the EHT. When the STA receives a PPDU or a TXOP field, RXVECTOR parameter TXOP_DURATION may be configured on the basis of a value of the TXOP field. The RXVECTOR parameter may be a parameter transmitted from the PHY of the STA to the MAC. Accordingly, duration information may include RXVECTOR parameter TXOP_DURATION. In addition, there may be a case where the TXOP field or the RXVECTOR parameter TXOP_DURATION is configured as UNSPECIFIED. When the TXOP field or the RXVECTOR parameter TXOP_DURATION is configured as UNSPECIFIED, this may be a case where there is no duration information. When the TXOP field or the RXVECTOR parameter TXOP_DURATION is configured as a value other than UNSPECIFIED, this may be a case where there is duration information. Accordingly, when the STA to which the MediumSyncDelay is applied has received a PPDU corresponding to the RXVECTOR parameter TXOP_DURATION having a value other than UNSPECIFIED during MediumSyncDelay, the MediumSyncDelay timer may be reset to 0.

That is, in summary, the STA having the value of the MediumSyncDelay timer other than 0 has received the valid frame (or valid MPDU) or the RXVECTOR parameter TXOP_DURATION having a value other than UNSPECIFIED, the MediumSyncDelay timer may be reset to 0.

However, according to an embodiment of the present invention, there may be multiple STAs having a MediumSyncDelay timer other than 0 at a certain point. Referring to FIG. 21, link 1 and link 2 may be configured as a multi-link setup. In addition, an AP 1 operating in link 1 may transmit a trigger frame. The trigger frame may solicit a response from multiple STAs. In addition, for respective multiple STAs, link 1 and link 2 may be an NSTR link pair. That is, transmission by STA 1, corresponding to one of the multiple STAs, in link 1 may cause interference to STA 2 belonging to the same MLD as STA 1. Accordingly, the STA belonging to the same MLD as the respective multiple STAs may be in a blinded state while the multiple STAs perform transmission in link 1, and when the blinding ends, the MediumSyncDelay timer may be configured as a value other than 0. That is, multiple STAs operating in link 2 may be blinded while multiple TB PPDUs are transmitted as a response to the trigger frame, and after transmission of the TB PPDU, the multiple STAs may configure the MediumSyncDelay timer as a value other than 0.

In another embodiment, while STA 1 of link 1 applies the MediumSyncDelay, STA 2 of link 1 may start to apply the MediumSyncDelay, and at a certain point, there may be multiple STAs having the MediumSyncDelay timer other than 0.

However, according to the above-described embodiment, an RTS frame may be transmitted as the first frame while the STA applies the MediumSyncDelay. Referring to FIG. 21, STA 2 of Link 2 has transmitted the RTS frame as the first frame during the MediumSyncDelay, other STAs having applied the MediumSyncDelay may have successfully received the RTS frame. In such a case, other STAs may reset the MediumSyncDelay timer. However, a CTS frame corresponding to a response to the RTS frame may not be transmitted. In such a case, an actual case where the application of the MediumSyncDelay ends even when there is duration information having failed to be received by STAs of link 2 may occur. Accordingly, the possibility that STAs having terminated the application of the MediumSyncDelay interrupts reception of a frame that is being already transmitted may increase.

Hereinafter, to solve such a problem, a method for limiting the type of a frame for timer reset for application of MediumSyncDelay is described.

Figure 25:
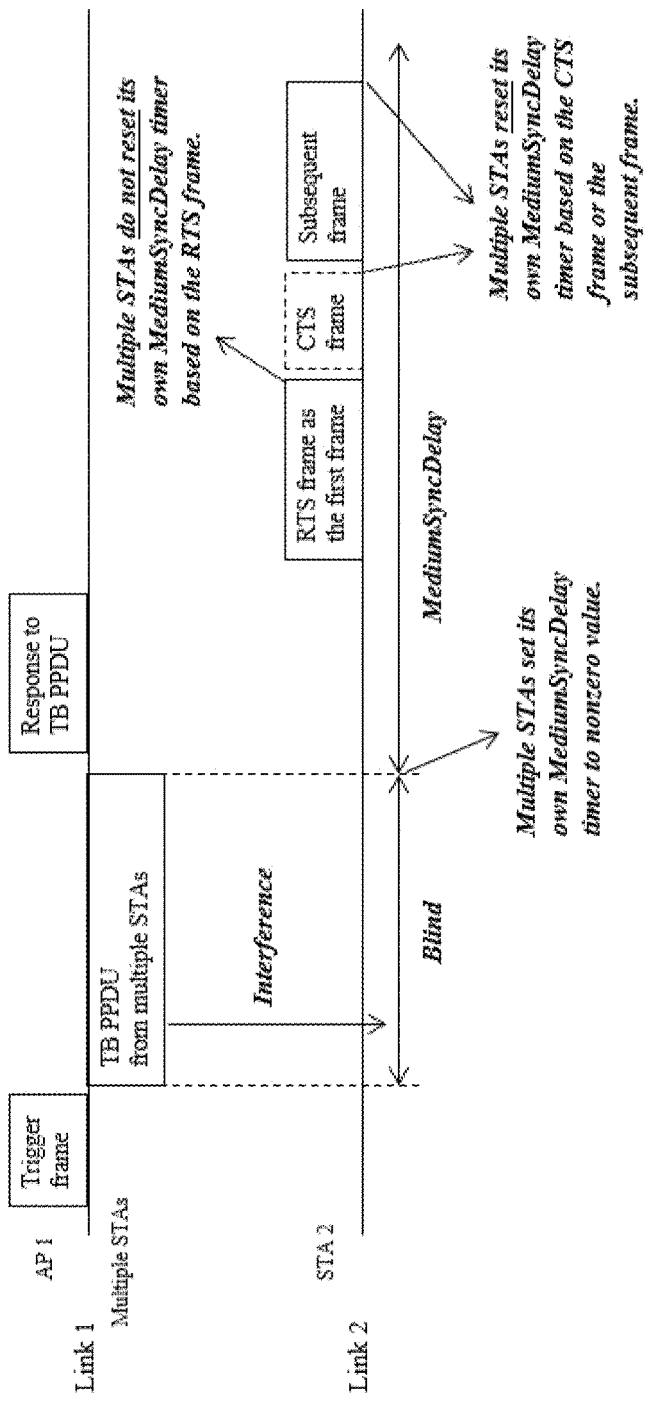
FIG. 25 illustrates another example of a MediumSyncDelay timer reset operation according to an embodiment of the present invention.

FIG. 25 illustrates an example of an operation of a MediumSync timer reset according to an embodiment of the present invention.

In FIG. 25, an STA to which a medium sync delay is applied may operate a medium sync delay timer for application of the medium sync delay after a blinding period ends, and the medium sync delay may be reset to "0" when a valid PPDU remaining after excluding a specific frame is received.

Specifically, when MediumSyncDelay is applied due to transmission or reception in another link, an STA of a link to which MediumSyncDelay is applied may configure a MediumSyncDelay timer as a value other than "0" and operate the same. In this case, the MediumSyncDelay timer may start at a time point at which transmission of another link ends. However, in an EMLSR mode in which an MLD operates in a single radio, the MediumSyncDelay timer may immediately start after a specific delay. For example, the MediumSyncDelay timer may start immediately after returning to a listening operation or a delay time for link switching.

Thereafter, when the STA of a link to which MediumSyncDelay is applied receives a valid frame or a PPDU for a valid MPDU and the MediumSyncDelay timer is not "0", the STA may reset the MediumSyncDelay timer to "0". Alternatively, a PPDU having unspecified TXOP_Duration corresponding to a reception parameter (RXVECTOR parameter) and the MediumSyncDelay timer is not "0", the MediumSyncDelay timer may be reset to "0". In this case, the valid frame may be a frame except for an RTS frame.

In this case, the valid frame may be a frame transmitted by an AP or a non-AP STA other than the STA having caused MediumSyncDelay, and the valid frame transmitted by the AP includes the RTS frame, but the valid frame transmitted by the non-AP STA may be a frame except for the RTS frame.

For example, in a case where transmission or reception of one or more STAs is limited in a second link corresponding to an NSTR link pair due to a PPDU transmitted in a first link and a MediumSyncDelay timer operates at a time point at which transmission of a PPDU ends and MediumSyncDelay is applied to one or more STAs, when a valid frame is received, the one or more STAs may reset the MediumSyncDelay timer in the second link. That is, when a PPDU for a valid MPDU remaining after excluding the RTS frame transmitted through 20 MHz of the same BSS or different BSS is received, one or more STAs to which a specific frequency band is allocated may reset the MediumSyncDelay timer. In this case, when a PPDU or a frame is transmitted from an associated AP or an AP included in the same multi-BSSID set, one or more STAs may reset the MediumSyncDelay timer even though the received PPDU or frame is the RTS frame.

That is, when an STA having a MediumSyncDelay timer other than 0 has received a valid frame (or MPDU), whether an operation of resetting the MediumSyncDelay timer to 0 is allowed may be determined on the basis of whether the valid frame is a type of a frame allowed as the first frame during MediumSyncDelay. According to an embodiment of the present invention, even though the STA having the MediumSyncDelay timer other than 0 has received a valid frame (or MPDU), if the valid frame is a type of a frame allowed as the first frame during MediumSyncDelay, an operation of resetting the MediumSyncDelay timer to 0 may not be allowed. That is, when the STA having the MediumSyncDelay timer other than 0 has received a valid frame (or MPDU) and the valid frame is not a type of a frame allowed as the first frame during MediumSyncDelay, an operation of resetting the MediumSyncDelay timer to 0 may be allowed. According to the above-described embodiment, the type of a frame allowed as the first frame during MediumSyncDelay may be the RTS frame.

According to an embodiment, when an STA having a MediumSyncDelay timer other than 0 has received a valid frame (or MPDU), whether an operation of resetting the MediumSyncDelay timer to 0 is allowed may be determined on the basis of whether the valid frame is the RTS frame. For example, when the STA having the MediumSyncDelay timer other than 0 has received the RTS frame, an operation of resetting the MediumSyncDelay timer to 0 may not be allowed. In addition, when the STA having the MediumSyncDelay timer other than 0 has received a frame other than the RTS frame, an operation of resetting the MediumSyncDelay timer to 0 may be allowed.

Referring to FIG. 25, multiple STAs operating in link 2 may apply MediumSyncDelay. In addition, STA 2 of link 2, which applies MediumSyncDelay, may acquire a TXOP and transmit an RTS frame as the first frame. In addition, the multiple STAs may successfully receive the RTS frame. That is, the multiple STAs may successfully receive duration information from the RTS frame. However, the frames received by the multiple STAs are the RTS frames, the multiple STAs may not reset the MediumSyncDelay timer. Accordingly, when a response to the RTS frame is not received, the multiple STAs may protect transmission in link 2 or a channel of link 2 by maintaining the application of MediumSyncDelay. If a response to the RTS frame is transmitted, a CTS frame may be transmitted as a response to the RTS frame. In addition, STA 2 may transmit the CTS frame followed by a frame (a subsequent frame in FIG. 25). In this case, even though not resetting the MediumSyncDelay frame on the basis of the RTS frame, the multiple STAs may reset the MediumSyncDelay timer on the basis of the CTS frame or the subsequent frame. Accordingly, unnecessary application of MediumSyncDelay can be prevented.

In addition, even though an STA having a MediumSyncDelay timer other than 0 receives a valid frame, the received valid frame is a PS-Poll frame, resetting the MediumSyncDelay timer may not be allowed. This is because the PS-Poll frame does not include duration information. That is, when the STA having the MediumSyncDelay timer other than 0 receives a valid frame other than the PS-Poll frame, resetting the MediumSyncDelay timer may be allowed.

In addition, according to an embodiment of the present invention, when an STA having a MediumSyncDelay timer other than 0 has received a PPDU or has received a valid frame or RXVECTOR parameter TXOP_DURATION, whether resetting the MediumSyncDelay timer is allowed may be determined on the basis of whether the received PPDU, valid frame, RXVECTOR parameter TXOP_DURATION corresponds to an intra-BSS or an inter-BSS. The STA may determine whether the received frame (or PPDU) corresponds to an intra-BSS frame (or PPDU) or an inter-BSS frame (PPDU) on the basis of a MAC address field included in the received frame or a BSS color field included in the PPDU including the received frame. For example, when the MAC address field included in the received frame or the BSS color field include in the PPDU including the received frame is configured as a value corresponding to the STA, the received frame may be determined as an intra-BSS frame. In addition, when the MAC address field included in the received frame or the BSS color field included in the PPDU including the received frame is not configured as a value corresponding to the STA, the received frame may be determined as an inter-BSS frame.

In addition, according to an embodiment of the present invention, whether resetting a MediumSyncDelay timer is allowed may be determined on the basis of whether a frame or a PPDU received by an STA having a MediumSyncDelay timer other than 0 is transmitted by an associated AP (or an AP included in the same multiple-BSSID set as associated AP). For example, resetting the MediumSyncDelay timer may be allowed when a frame or PPDU transmitted by the STA having the MediumSyncDelay timer other than 0 is transmitted by an associated AP (or an AP included in the same multiple-BSSID set as an associated AP). In addition, when the frame or PPDU received by the STA having the MediumSyncDelay timer other than 0 is transmitted by an associated AP (or an AP included in the same multiple-BSSID set as an associated AP), resetting of the MediumSyncDelay timer may not be allowed. This may be because there is high possibility that the AP knows a channel situation of the corresponding link.

Whether a frame is transmitted by an associated AP (or an AP included in the same multiple-BSSID set as an associated AP) may be determined on the basis of a MAC address field included in a MAC header included in the received frame. For example, whether a frame is transmitted by an associated AP (or an AP included in the same multiple-BSSID set as an associated AP) may be determined on the basis of a transmitter address (TA) field included in the received frame. For example, when the transmitter address (TA) field included in the received frame is configured as an address of an associated AP (or an AP included in the same multiple-BSSID set as an associated AP), it may be the associated AP (the AP included in the same multiple-BSSID set as the associated AP) which has transmitted the frame. In addition, when the transmitter address (TA) field included in the received frame is neither an address of an associated AP nor an address of an AP included in the same multiple-BSSID set as an associated AP, it may not be the associated AP which has transmitted the frame and it may not be the AP included in the same multiple-BSSID set as the associated AP, which has transmitted the frame. In the present embodiment, the AP address may be replaced by a BSSID.

Whether a frame is transmitted by an associated AP (or an AP included in the same multiple-BSSID set as an associated AP) may be determined on the basis of a MAC address field included in a MAC header included in a received frame. For example, whether a frame is transmitted by an associated AP (an AP included in the same multiple-BSSID set as an associated AP) may be determined on the basis of a receiver or recipient address (RA) field included in a received frame. For example, when an RA field included in a received frame is configured as an address of an associated AP (an AP included in the same multiple-BSSID set as an associated AP), it may be the associated AP (or the AP included in the same multiple-BSSID set as the associated AP) which has transmitted the frame. In addition, when an RA field included in a received frame is neither an address of an associated AP nor an address of an AP included in the same multiple-BSSID set as an associated AP, it may not be the associated AP which has transmitted the frame and it may not be the AP included in the same multiple-BSSID set as the associated AP, which has transmitted the frame. In the present embodiment, an AP address may be replaced by a BSSID.

Whether a frame is transmitted by an inter-BSS may be determined on the basis of a MAC address field included in a MAC header included in a received frame. For example, whether a frame is transmitted by an inter-BSS may be determined on the basis of an RA field, a TA field, or a BSSID field included in a received frame. For example, when all of the RA field, the TA field, and the BSSID field (this is included in a condition only when each field exists) included the received frame are not configured as a value other than an address of an associated AP (or an AP included in the same multiple-BSSID set as an associated AP), it may be the inter-BSS which has transmitted the frame. In addition, when at least one of the RA field, the TA field, and the BSSID field (this is included in a condition only when each field exists) included in the received frame is configured as a value of an address of an associated AP (or an AP included in the same multiple-BSSID set as an associated AP), it may be the intra-BSS which has transmitted the frame. In the present embodiment, an AP address may be replaced by a BSSID.

If a BSS color included in a preamble of a received PPDU is identical to a BSS color corresponding to a BSS of a received STA and the preamble indicates that the preamble corresponds to downlink, it may be an associated AP (an AP included in the same multiple-BSSID set as an associated AP) which has transmitted the received PPDU. If not, it may be neither the associated AP nor the AP included in the same multiple-BSSID set as the associated AP, which has transmitted the received PPDU.

Multiple BSSIDs may indicate multiple BSSIDs indicated through a single beacon frame or a single probe response frame. In this case, multiple beacon frames or multiple probe response frames corresponding to the multiple BSSIDs, respectively, may not be used. In addition, a buffered frame corresponding to multiple BSSIDs may be indicated by using a single TIM element included in a single beacon frame or a single TIM frame. For example, the single beacon frame or the single probe response frame may be transmitted, and such a frame may include a multiple-BSSID element. The multiple-BSSID element may indicate multiple BSSs or multiple BSSIDs. In addition, a BSSID which has transmitted the single beacon frame or the single probe response frame may be referred to as a transmitted BSSID. A BSSID remaining after excluding the transmitted BSSID from BSSIDs indicated by the multiple BSSID elements may be referred to as a nontransmitted BSSID. In the nontransmitted BSSID, the beacon frame or the probe response frame may not be transmitted. A set of BSSIDs indicated by one multiple-BSSID element may be referred to as a multiple-BSSID set. Alternatively, a set of the above described transmitted BSSID and nontransmitted BSSID may be referred to as a multiple-BSSID set. The maximum available number of BSSIDs of the multiple-BSSID set may be $2^n$. In this case, n may be a value signaled in the multiple-BSSID element. For example, n may be a value indicated by a MaxBSSID indicator included in the multiple-BSSID element. An STA receiving the multiple-BSSID element may identify a BSSID or an address of an AP included in the multiple-BSSID set on the basis of the received multiple-BSSID element.

In an embodiment of the present invention, the above-described conditions for allowing or disallowing resetting may be combined and used. According to an embodiment, whether a received frame is a type of a frame (RTS frame) allowed as the first frame during MediumSyncDelay and whether a transmission or a receiver of a frame is an associated AP (or an AP included in the same multiple-BSSID set as an associated AP) may be considered.

For example, even though an STA having a MediumSyncDelay timer other than 0 receives a valid frame (or MPDU), 1) when the frame is a type of a frame allowed as the first frame during MediumSyncDelay and 2) when the frame is not a frame transmitted by an associated AP (or an AP included in the same multiple-BSSID set as an associated AP), an operation of resetting the MediumSyncDelay timer to 0 may not be allowed. That is, in a case where an STA having a MediumSyncDelay timer other than 0 has received a valid frame (or MPDU), 1) when the frame is not a type of a frame allowed as the first frame during MediumSyncDelay, or 2) when the frame is a frame transmitted by an associated AP (an AP included in the same multiple-BSSID set as an associated AP), an operation of resetting the MediumSyncDelay timer to 0 may be allowed. That is, when a type of a frame allowed as the first frame during MediumSyncDelay and transmitted by the associated AP (or the AP included in the same multiple-BSSID set as an associated AP) has been received, an operation of resetting the MediumSyncDelay timer to 0 may be allowed. In addition, when the frame has been transmitted to an associated AP (or an AP included in the same multiple-BSSID set as an associated AP), or a type of a frame allowed as the first frame during MediumSyncDelay and transmitted by the inter-BSS has been received, an operation of resetting the MediumSyncDelay timer to 0 may not be allowed.

According to the above-described embodiment, the type of the frame allowed as the first frame during MediumSyncDelay may be an RTS frame. Accordingly, even though an STA having a MediumSyncDelay timer other than 0 receives a valid frame (or MPDU), 1) when the frame is the RTS frame, and 2) when the frame is not a frame transmitted by an associate AP (or an AP included in the same multiple-BSSID set as an associated AP), an operation of resetting the MediumSyncDelay timer to 0 may not be allowed. That is, in a case where the STA having the MediumSyncDelay timer other than 0 has received a valid frame (or MPDU), 1) when the frame is not the RTS frame, or 2) when the frame is a frame transmitted by an associated AP (or an AP included in the same multiple-BSSID set as an associated AP), an operation of resetting the MediumSyncDelay timer to 0 may be allowed. That is, when the RTS frame transmitted by the associated AP (or the AP included in the same multiple-BSSID set as the associated AP) is received, an operation of resetting the MediumSyncDelay timer to 0 may be allowed. In addition, the frame is transmitted by the associated AP (or the AP included in the same multiple-BSSID set as the associated AP) or the RTS frame transmitted by the inter-BSS is received, an operation of resetting the MediumSyncDelay timer to 0 may not be allowed.

According to another embodiment, even though an STA having a MediumSyncDelay timer other than 0 receives a valid frame (or MPDU), 1) when the frame is a type of a frame allowed as the first frame during MediumSyncDelay, and 2) when the frame is a frame transmitted to an associated AP (or an AP included in the same multiple-BSSID set as an associated AP), an operation of resetting the MediumSyncDelay timer to 0 may not be allowed. That is, in a case where an STA having a MediumSyncDelay timer other than 0 has received a valid frame (or MPDU), 1) when the frame is not a type of a frame allowed as the first frame during MediumSyncDelay, or 2) when the frame is not a frame transmitted to an associated AP (or an AP included in the same multiple-BSSID set as an associated AP), an operation of resetting the MediumSyncDelay time as 0 may be allowed. That is, when the frame is transmitted by the associated AP (or the AP included in the same multiple-BSSID set as the associated AP) or a type of a frame allowed as the first frame during MediumSyncDelay and transmitted by the inter-BSS is received, an operation of resetting the MediumSyncDelay timer to 0 may be allowed. In addition, when the type of the frame allowed as the first frame during MediumSyncDelay and transmitted by the associated AP (or the AP included in the same multiple-BSSID set as the associated AP) is received, an operation of resetting the MediumSyncDelay timer to 0 may not be allowed.

According to the above-described embodiment, the type of the frame allowed as the first frame during MediumSyncDelay may be an RTS frame. Accordingly, even though an STA having a MediumSyncDelay timer other than 0 receives a valid frame (or MPDU), 1) when the frame is the RTS frame, and 2) when the frame is not a frame transmitted by the associated AP (or the AP included in the same multiple-BSSID set as the associated AP), an operation of resetting the MediumSyncDelay timer to 0 may not be allowed. That is, in a case where an STA having a MediumSyncDelay timer other than 0 has received a valid frame (or MPDU), 1) when the frame is not an RTS frame, or 2) when the frame is a frame transmitted by the associated AP (or the AP included in the same multiple-BSSID set as the associated AP), an operation of resetting the MediumSyncDelay timer to 0 may be allowed. That is, when the RTS frame transmitted by the associated AP (or the AP included in the same multiple-BSSID set as the associated AP) is received, an operation of resetting the MediumSyncDelay timer to 0 may be allowed. That is, when the frame is transmitted by the associated AP (or the AP included in the same multiple-BSSID set as the associated AP), or the RTS frame transmitted by the inter-BSS is received, an operation of resetting the MediumSyncDelay timer to 0 may be allowed. In addition, when the RTS frame transmitted to the associated AP (or the AP included in the same multiple-BSSID set as the associated AP) is received, an operation of resetting the MediumSyncDelay timer to 0 may not be allowed.

FIG. 26 illustrates an example of medium synchronization OFDM ED threshold subfield encoding according to an embodiment of the present invention.

As described in FIGS. 19 to 22, a changed CCA threshold may be used during MediumSyncDelay. In addition, in this case, there may be a default value of the changed CCA threshold, and the changed CCA threshold may be signaled. In addition, the changed CCA threshold may be signaled by using the above-described medium synchronization OFDM ED threshold subfield. In an embodiment of the present invention, the details described above may be omitted.

According to an embodiment of the present invention, a CCA ED threshold when MediumSyncDelay is not applied may be −62 dBm. However, according to the regulation, a CCA ED threshold lower than −62 dBm may be used. For example, in a particular area such as Europe, the CCA ED threshold of −72 dBm may be used. However, the CCA threshold which can be indicated by the medium synchronization OFDM ED threshold subfield described in FIG. 23 is equal to or greater than −72 dBm, and thus when MediumSyncDelay is applied, it may be more difficult to limit channel access by using the lower CCA threshold compared to a case where MediumSyncDelay is not applied. An embodiment of FIG. 26 may be a method for solving this problem.

According to an embodiment of the present invention, a minimum value which can be indicated by a medium synchronization OFDM ED threshold subfield may be a value smaller than −72 dBm. For example, a minimum value which can be indicated by a medium synchronization OFDM ED threshold subfield may be −82 dBm. Alternatively, a minimum value which can be indicated by a medium synchronization OFDM ED threshold subfield may be −77 dBm.

In addition, a maximum value which can be indicated by a medium synchronization OFDM ED threshold subfield may be −62 dBm. Alternatively, a maximum value which can be indicated by a medium synchronization OFDM ED threshold subfield may be −72 dBm.

In addition, according to an embodiment of the present invention, a default value of dot11MSDOFDMEDthreshold may be a value smaller than −72 dBm. For example, a default value of dot11MSDOFDMEDthreshold may be identical to the minimum value which can be indicated by the medium synchronization OFDM ED threshold subfield. Alternatively, a default value of dot11MSDOFDMEDthreshold may be −77 dBm. Alternatively, a default value of dot11MSDOFDMEDthreshold may be −82 dBm. Alternatively, a default value of dot11MSDOFDMEDthreshold may be −72 dBm.

In the present invention, a value of a medium synchronization OFDM ED threshold subfield may be referred to as Fval. In addition, the medium synchronization OFDM ED threshold subfield may be an integer.

According to an embodiment, dot11MSDOFDMEDthreshold may be (−77+Fval) dBm. In addition, the medium synchronization OFDM ED threshold subfield may be 4 bits, and Fval may be an integer in the range of 0 to 15. Accordingly, values of dot11MSDOFDMEDthreshold indicated by Fval 0 to Fval 15 may be −77 dBm to −62 dBm, respectively. That is, in this case, the minimum value indicated by the medium synchronization OFDM ED threshold subfield may be −77 dBm. In addition, the maximum value indicated by the medium synchronization OFDM ED threshold subfield may be −62 dBm.

According to various embodiments, intervals between values of dot11MSDOFDMEDthreshold indicated by the medium synchronization OFDM ED threshold subfield may not be regular. For example, in a case of Fval<=A, dot11MSDOFDMEDthreshold may be (−82+2*Fval) dBm. In addition, in a case of Fval>A, dot11MSDOFDMEDthreshold may be (−82+5+Fval) dBm. That is, in a case of Fval>A, dot11MSDOFDMEDthreshold may be (−77+Fval) dBm. In addition, A may be 4. Accordingly, referring to FIG. 26, values of dot11MSDOFDMEDthreshold indicated by Fval 0 to Fval 15 may be −82, −80, −78, −76, −74, −72, −71, −70, −69, −68, −67, −66, −65, −64, −63, and −62 dBm, respectively. That is, in this case, the minimum value indicated by the medium synchronization OFDM ED threshold subfield may be −82 dBm. In addition, the maximum value indicated by the medium synchronization OFDM ED threshold subfield may be −62 dBm. In the present embodiment, the size of the medium synchronization OFDM ED threshold may be 4 bits.

According to another embodiment, intervals between values of dot11MSDOFDMEDthreshold indicated by the medium synchronization OFDM ED threshold subfield may not be regular. For example, in a case of Fval<=B, dot11MSDOFDMEDthreshold may be (−82+Fval) dBm. In addition, in a case of Fval>B, dot11MSDOFDMEDthreshold may be (−92+2*Fval) dBm. In addition, B may be 10. Accordingly, values of dot11MSDOFDMEDthreshold indicated by Fval 0 to Fval 15 may be −82, −81, −80, −79, −78, −77, −76, −75, −74, −73, −72, −70, −68, −66, −64, and −62 dBm, respectively. That is, in this case, the minimum value indicated by the medium synchronization OFDM ED threshold subfield may be −82 dBm. In addition, the maximum value indicated by the medium synchronization OFDM ED threshold subfield may be −62 dBm. In the present invention, the size of the medium synchronization OFDM ED threshold subfield may be 4 bits.

According to another embodiment, dot11MSDOFDMEDthreshold may be (−82+2*Fval) dBm. In addition, the medium synchronization OFDM ED threshold subfield may be 4 bits, and Fval may be an integer in the range of 0 to 15. Accordingly, values of dot11MSDOFDMEDthreshold indicated by Fval 0 to 10 may be −82, −80, −78, −76, −74, −72, −70, −68, −66, −64, and −62 dBm, respectively. In this case, Fval 11 to 15 may be reserved. That is, in this case, the minimum value of the medium synchronization OFDM ED threshold subfield may be −82 dBm. In addition, the maximum value indicated by the medium synchronization OFDM ED threshold subfield may be −62 dBm. In the present embodiment, the size of the medium synchronization OFDM ED threshold subfield may be 4 bits.

In the embodiment above, a case where intervals of values of dot11MSDOFDMEDthreshold indicated by the medium synchronization OFDM ED threshold subfield are 2 dBm is described, but different intervals are possible.

According to an embodiment of the present invention, the size of the medium synchronization OFDM ED threshold subfield may be greater than 4 bits. For example, the size of the medium synchronization OFDM ED threshold subfield may be 5 bits. This is used to represent a CCA threshold in a wider range than that described in FIG. 23. When the size of the medium synchronization OFDM ED threshold subfield is 5 bits, the possible Fval may be 0 to 31. In addition, dot11MSDOFDMEDthreshold may be (−82+Fval) dBm. Accordingly, when Fval has values of 0 to 20, the respective values may indicate values of dot11MSDOFDMEDthreshold of −82 dBm to −62 dBm, respectively. In addition, in this case, values of 21 to 31 of the medium synchronization OFDM ED threshold subfield may be reserved.

In an embodiment in which the size of the medium synchronization OFDM ED threshold subfield is greater than 4 bits, to maintain the size of medium synchronization delay information described in FIG. 23, the size of another subfield included in the medium synchronization delay information needs to be reduced. For example, a medium synchronization duration subfield may be smaller than 8 bits. For example, a medium synchronization duration subfield may be 7 bits. In an embodiment, in this case, as described above, the medium synchronization duration subfield may indicate a 32 us unit time. In this case, a time indicated by the medium synchronization duration subfield may be up to $32*(2^7-1)$ us. The time indicated by the medium synchronization duration subfield may be 0 to $32*(2^7-1)$ us. In another embodiment, in this case, a time indicated by the medium synchronization duration subfield may be up to a 64 us unit time. In this case, the time indicated by the medium synchronization duration subfield may be up to $64*(2^7-1)$ us (8128 us). The time indicated by the medium synchronization duration subfield may be from 0 to $64*(2^7-1)$ us.

For example, a subfield of a medium synchronization maximum number of TXOPs may be smaller than 4 bits. For example, a subfield of a medium synchronization maximum number of TXOPs may be 3 bits. In an embodiment, in this case, as described above, the subfield of the medium synchronization maximum number of TXOPs may indicate a transmission opportunity by 1 unit.

MSD_TXOP_MAX may be indicated by an opportunity having an integer value among 0 to 6. Alternatively, MSD_TXOP_MAX may be indicated by an opportunity having an integer value among 1 to 6. According to another embodiment, the subfield of the medium synchronization maximum number of TXOPs may indicate a transmission opportunity by 2 units. For example, the subfield of the medium synchronization maximum number of TXOPs may indicate MSD_TXOP_MAX as 0, 2, 4, 6, 8, 10, and 12. Alternatively, the subfield of the medium synchronization maximum number of TXOPs may indicate MSD_TXOP_MAX as 2, 4, 6, 8, 10, 12, and 14. The subfield of the medium synchronization maximum number of TXOPs may indicate MSD_TXOP_MAX as 1, 3, 5, 7, 9, 11, and 13. The subfield of the medium synchronization maximum number of TXOPs may indicate MSD_TXOP_MAX as 0, 1, 3, 5, 7, 9, and 11. Even in a case where the subfield of the medium synchronization maximum number of TXOPs is smaller than 4 bits, when the subfield of the medium synchronization maximum number of TXOPs is configured with the largest value (for example, a value of 7 in 3 bits), it may indicate that there is no limit to transmission opportunities.

According to additional embodiment, the maximum value which can be indicated by the medium synchronization OFDM ED threshold subfield may be smaller by 1 than the maximum value which can be indicated in the above-described embodiments. In addition, in this case, each subfield value may be smaller by 1 than the value described above. For example, the maximum value which can be indicated by the maximum value which can be indicated by the medium synchronization OFDM ED threshold subfield may be −63 dBm. In addition, when values of the medium synchronization OFDM ED threshold subfields are 14 and 15, the respective values may indicate −64 dBm and −63 dBm, respectively.

According to an embodiment, in a case of an MLD operating in a single radio, there may be latency required to perform transmission or reception in one link and then change to a state in which listening in multiple links are possible. Such latency may be indicated by the MLD operating in the single radio. For example, it may be indicated by the multi-link element or the field of EML capabilities, described in FIG. 23. Accordingly, in a case of an MLD operating in a single radio, a time for configuring a MediumSyncDelay timer may be different from that of an MLD operating in a multi-radio. In the above-described embodiment, the MediumSyncDelay timer is configured at a time point at which transmission ends. According to an embodiment, in a case of the MLD operating in the single radio, the MediumSyncDelay timer may be configured at a time point at which transmission ends and a time point based on the latency.

For example, when the MLD operating in the single radio transmits a PPDU including a frame soliciting an immediate response, the MediumSyncDelay timer may be configured after the latency from a time point at which a PPDU including the immediate response is received. This may be limited to a case where the MLD operating in the single radio is a TXOP holder.

In addition, when the MLD operating in the single radio transmits a PPDU including only a frame not soliciting an immediate response, the MediumSyncDelay timer may be configured after the latency from a time point at the PPDU is transmitted. This may be limited to a case where the MLD operating in the single radio is a TXOP holder.

In addition, when the MLD operating in the single radio is a TXOP responder, the MediumSyncDelay timer may be configured after the latency from a time point at which the TXOP holder does not transmit the frame any more. Alternatively, the MediumSyncDelay timer may be configured after the latency from a time point at which the TXOP ends. In addition, this may be limited to a case where the MLD operating in the single radio is a TXOP responder.

That is, STAs operating in an NSTR link pair may configure a MediumSyncDelay timer for applying MediumSyncDelay as a value other than "0" and operate the same. In this case, the MediumSyncDelay timer may operate at a time point at which transmission of another STA ends. However, in a case of the MLD operating in the single radio, an additional delay such as a delay for returning to a link switching or listening operation for changing the single radio to multiple radios may be required. Accordingly, in this case, the MediumSyncDelay timer may operate after the additional delay after the termination of the transmission. For example, when an MLD operates in an EMLSR mode, an STA may operate the MediumSyncDelay timer immediately after returning to the listening operation.

Figure 27:
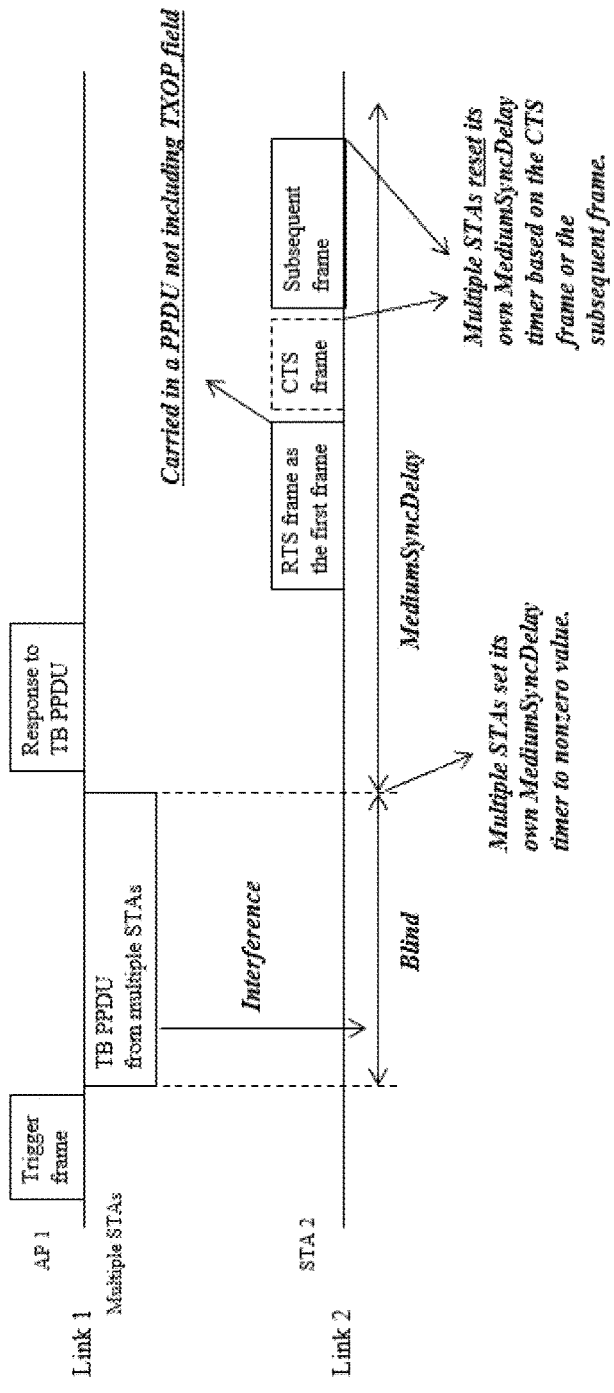
FIG. 27 illustrates an example of a transmission operation when a MediumSyncDelay timer is not 0 according to an embodiment of the present invention.

FIG. 27 illustrates an example of a transmission operation when a MediumSyncDelay timer is not 0 according to an embodiment of the present invention.

An embodiment of FIG. 27 may be described as a solution to the problem described in FIG. 24. In addition, the details described above may be omitted.

As described above, according to an embodiment of the present invention, an STA (an STA belonging to an MLD) may reset a MediumSyncDelay timer. For example, as described in FIG. 25, whether resetting of the timer is allowed may be determined on the basis of the type of a received frame. For example, the type of a frame may be determined on the basis of a value included in a MAC header. More specifically, the type of a frame may be determined on the basis of a frame control field included in a MAC header of the frame. More specifically, the type of a frame may be determined on the basis of a type subfield and/or a subtype subfield included in a frame control field. According to an embodiment, the type subfield may be located at bit index B2 to B3 bits of the frame control field. In addition, the subtype subfield may be located at bit index B4 to B7 bits of the frame control field. According to an additional embodiment, the type of a frame may be determined on the basis of a type subfield and/or a subtype subfield included in the frame control field, and/or a control frame extension subfield. The control frame extension subfield may be located at bit index B8 to B11 bits of the frame control field.

That is, whether resetting the MediumSyncDelay timer is allowed may be determined on the basis of the type and the subtype of the frame.

According to an embodiment, when B3 and B2 of a type subfield is 00, 01, and 10, it may indicate that a frame including the type subfield indicates a management frame, a control frame, and a data frame. In addition, when B3 and B2 of the type subfield is 11, it may indicate type extension.

According to an embodiment, an RTS frame may be a frame soliciting a CTS frame. Alternatively, an RTS frame may be a frame soliciting a CTS frame from a single STA. The RTS frame may include a frame control field, a duration field, an RA field, a TA field, and an FCS field. The duration field may include time information for allowing STAs receiving the duration field configure a NAV. In addition, the RA field may include an address of an intended immediate recipient. For example, an RA field included in a received RTS frame is an address of an STA, the STA may response to the RTS frame with a CTS frame. In addition, whether a frame is an RTS frame may be determined on the basis of a frame control field included in the frame. For example, whether a frame is an RTS frame may be determined on the basis of a type subfield and a subtype subfield included in a frame control field included in the frame. For example, when the type subfield is 01 (B3 and B2) and the subtype subfield is 1011 (B7, B6, B5, and B4), the type subfield and the subtype subfield may indicate that a frame including the type subfield and the subtype subfield is an RTS frame. For example, the RTS frame may be a control frame.

According the embodiment described in FIG. 25, to solve the problem described in FIG. 21, whether a MediumSyncDelay timer can be reset may be determined on the basis of the type of a received frame. However, according to the above-described reset condition, an STA may reset a MediumSyncDelay timer on the basis of RXVECTOR parameter TXOP_DURATION, and thus the problem described in FIG. 22 may not be completely solved. For example, there may be multiple STAs having a MediumSyncDelay timer other than 0. One of the STAs may transmit a frame on the basis of limited channel access since the MediumSyncDelay timer is not 0. In this case, the transmitted frame may be an RTS frame. When a PPDU format transmitted by one of the STAs is a PPDU format including a TXOP field, an STA receiving a PPDU transmitted by one of the STAs may receive a PPDU in which RXVECTOR parameter TXOP_DURATION is present. Accordingly, even though an STA receiving the PPDU transmitted by one of the STAs does not reset the MediumSyncDelay timer on the basis of the RTS frame, the MediumSyncDelay timer may be reset on the basis of RXVECTOR parameter TXOP_DURATION. That is, there may be multiple STAs receiving the PPDU transmitted by one of the STAs, and thus the multiple STAs may reset the MediumSyncDelay timer. If one of the STAs does not follow the sequence of the transmitted PPDUs, the MediumSyncDelay timer may be unnecessarily reset. For example, STAs having resetting the MediumSyncDelay timer may transmit a frame on the basis of channel access that is not limited, and interrupt exchanging of previously transmitted frames.

As described in FIGS. 7, 8, etc., there may be various PPDU formats. For example, there may be a non-HT PPDU (or a non-HT duplicate PPDU), an HT PPDU, a VHT PPDU, a HE PPDU, an EHT PPDU, etc. The HT may mean high throughput according to the IEEE 802.11n standard. The VHT may mean very high throughput according to the IEEE 802.11ac standard. The HE may mean high efficiency according to the IEEE 802.11ax standard. The EHT may mean extremely high throughput according to the IEEE 802.11be standard.

According to an embodiment of the present invention, a TXOP field may be included in a preamble of a PPDU. More specifically, the TXOP field may be included in a HE-SIG-A field or a U-SIG field. In addition, the HE PPDU may include a HE-SIG-A field. The EHT PPDU may include a U-SIG field. That is, the HE PPDU or the EHT PPDU may include the TXOP field. For example, the preamble of the PPDU may include the TXOP field. In addition, the non-HT PPDU (or the non-HT duplicate PPDU), the HT PPDU, and the VHT PPDU may not include the TXOP field.

According to an embodiment of the present invention, when an STA receives a PPDU including a TXOP field, the STA may receive a PPDU in which RXVECTOR parameter TXOP_DURATION is present. In addition, when an STA transmits a PPDU including a TXOP field, the STA may transmit a PPDU in which TXVECTOR parameter TXOP_DURATION is present.

According to an embodiment of the present invention, when an STA having a MediumSyncDelay timer other than 0 performs transmission, a PPDU format may be limited. For example, a case where PPDU format is limited when an STA having a MediumSyncDelay timer other than 0 performs transmission may be a case where the first frame is transmitted in a TXOP. In addition, when the PPDU format is limited, the STA may not transmit (or use) the PPDU including the TXOP field. In addition, when the PPDU format is limited, the STA may transmit the PPDU not including the TXOP field. That is, when the PPDU format is limited, the STA may not transmit the HE PPDU or the EHT PPDU, and transmit the non-HT PPDU, the non-HT duplicate PPDU, the HT PPDU, or the VHT PPDU. More specifically, when the PPDU format is limited, the STA may transmit the non-HT PPDU or the non-HT duplicate PPDU.

Accordingly, according to an embodiment, an STA having a MediumSyncDelay timer other than 0 may not perform transmission by using the PPDU format including the TXOP field. In addition, the STA having the MediumSyncDelay timer other than 0 may perform transmission by using the PPDU format not including the TXOP field. In addition, this may be limited to a case where the first frame of the TXOP is transmitted. That is, when the STA having the MediumSyncDelay timer other than 0 transmits the first frame of the TXOP, the transmission may not be performed by using the PPDU format including the TXOP field. In addition, the STA having the MediumSyncDelay timer other than 0 transmits the first frame of the TXOP, the transmission may be performed by using the PPDU format not including the TXOP field. In addition, as described above, as the first frame of the TXOP, an RTS frame may be transmitted.

Referring to FIG. 27, multiple STAs operating in link 2 may apply MediumSyncDelay. In addition, STA 2 of link 2 applying MediumSyncDelay may acquire a TXOP and transmit an RTS frame as the first frame. In addition, when STA 2 transmits the first frame, a PPDU not including the TXOP field may be used. For example, the non-HT PPDU, the non-HT duplicate PPDU, the HT PPDU, and the VHT PPDU may be used. Accordingly, even though an STA applying MediumSyncDelay receives a frame or a PPDU transmitted by STA 2, a TXOP field is not received, and thus RXVECTOR parameter TXOP_DURATION does not exist. That is, the STA having received the frame or the PPDU transmitted by STA 2 may not reset the MediumSyncDelay timer on the basis of RXVECTOR parameter TXOP_DURATION. In addition, according to the embodiment described in FIG. 22, the MediumSyncDelay timer may not be reset on the basis of the type of a frame transmitted by STA 2. Accordingly, even though the STA applying MediumSyncDelay receives the first frame transmitted by STA 2 or a PPDU including the first frame, the MediumSyncDelay timer may not be reset on the basis of the first frame or the PPDU including the first frame. Accordingly, when a response to the RTS frame is not followed, the multiple STAs may maintain application of MediumSyncDelay to protect transmission in link 2 or a channel of link 2. If a response to the RTS frame is transmitted, a CTS frame may be transmitted as a response to the RTS frame. In addition, STA 2 may transmit the CTS frame followed by a frame (a subsequent frame in FIG. 27). In this case, even though the multiple STAs do not reset the MediumSyncDelay timer on the basis of the RTS frame, the MediumSyncDelay timer may be reset on the basis of the CTS frame or the subsequent frame. Accordingly, unnecessary application of MediumSyncDelay can be prevented.

Figure 28:
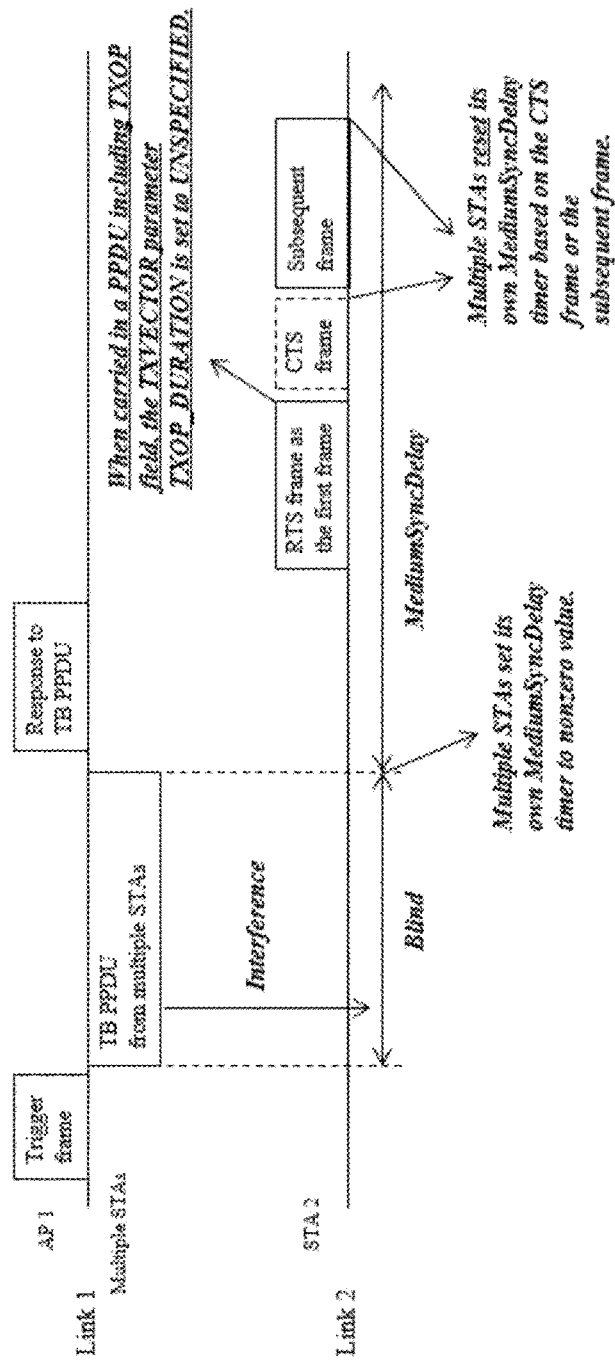
FIG. 28 illustrates another example of a transmission operation when a MediumSyncDelay timer is not 0 according to an embodiment of the present invention.

FIG. 28 illustrates another example of a transmission operation when a MediumSyncDelay timer is not 0 according to an embodiment of the present invention.

The embodiment of FIG. 28 may be described as a solution to the problem described in FIG. 24. In addition, the details described above may be omitted.

As described in FIG. 27, when an STA having a MediumSyncDelay timer other than 0 transmits the first frame of a TXOP, a PPDU including a TXOP field is used, and thus there may be a problem in that the STA receiving the PPDU resets the MediumSyncDelay timer on the basis of the TXOP field.

Accordingly, according to an embodiment of the present invention, when the STA having the MediumSyncDelay timer other than 0 performs transmission, configuration of TXVECTOR parameter TXOP_DURATION may be limited. When the STA having the MediumSyncDelay timer other than 0 performs transmission, TXVECTOR parameter TXOP_DURATION may be configured as UNSPECIFIED. When the TXVECTOR parameter TXOP_DURATION is configured as UNSPECIFIED, duration information may not exist in the TXOP field. In addition, this may be limited to a case where the first frame of the TXOP is transmitted. That is, when the STA having the MediumSyncDelay timer other than 0 transmits the first frame of a TXOP and a PPDU including a TXOP field is used, TXVECTOR parameter TXOP_DURATION may be configured as UNSPECIFIED. Accordingly, the STA receiving such a PPDU may not reset the MediumSyncDelay timer on the basis of RXVECTOR parameter TXOP_DURATION since the value of RXVECTOR parameter TXOP_DURATION is configured as UNSPECIFIED even though there is RXVECTOR parameter TXOP_DURATION.

When TXVECTOR parameter TXOP_DURATION or RXVECTOR parameter TXOP_DURATION is configured as UNSPECIFIED, the TXOP field may be configured as 127. That is, when the TXOP field is 7 bits, all bits configured as 1 may indicate UNSPECIFIED.

Referring to FIG. 28, multiple STAs operating in link 2 may apply MediumSyncDelay. In addition, STA 2 of link 2 applying MediumSyncDelay may acquire a TXOP and transmit an RTS frame as the first frame. In this case, when STA 2 uses a PPDU including the TXOP field, TXVECTOR parameter TXOP_DURATION may be configured as UNSPECIFIED. Accordingly, even though one of the multiple STAs receives a PPDU transmitted by STA 2, RXVECTOR parameter TXOP_DURATION may be configured as UNSPECIFIED. Accordingly, one of the STAs may not reset the MediumSyncDelay timer on the basis of RXVECTOR parameter TXOP_DURATION. In addition, in this case, by using the embodiment in which whether a timer reset is allowed is determined on the basis of the type of the frame described in FIG. 25, one of the STAs may not reset the MediumSyncDelay timer on the basis of the first frame or PPDU of the TXOP transmitted by STA 2. In addition, as described in FIG. 22 or FIG. 24, when the sequence of the frames transmitted by STA 2 is continued, one of the STAs may reset the MediumSyncDelay timer on the basis of the continuing frame or PPDU.

Figure 29:
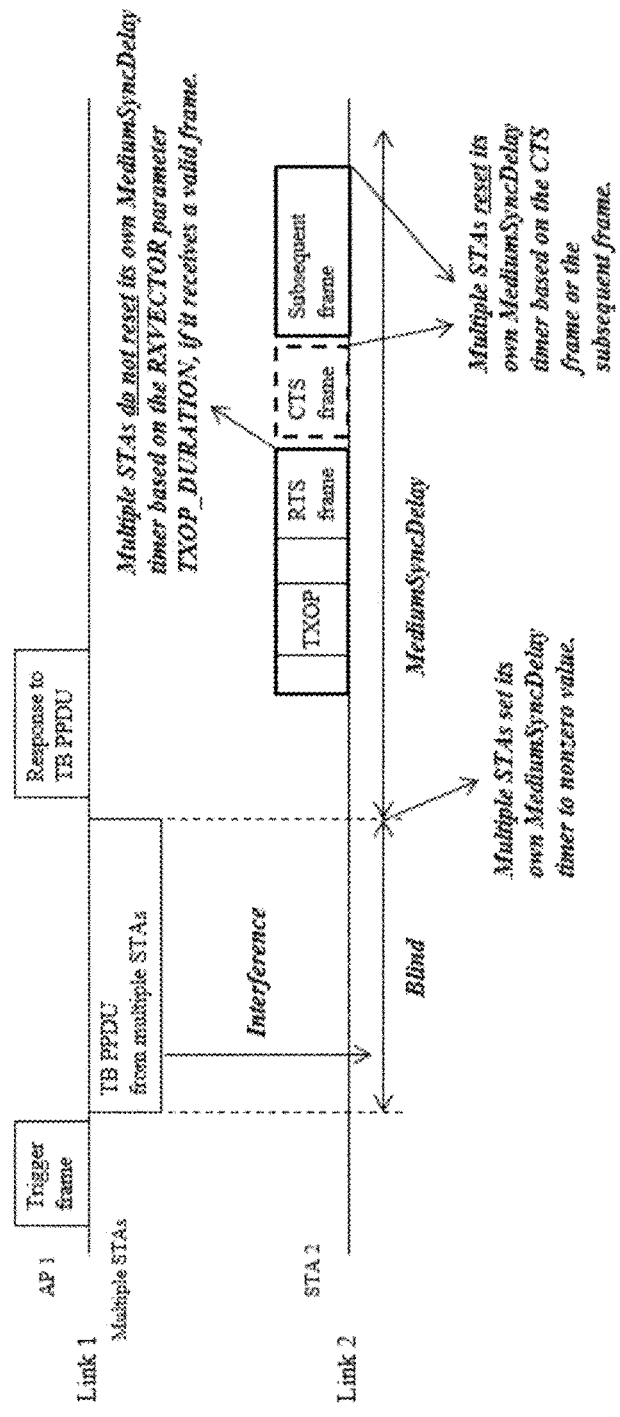
FIG. 29 illustrates another example of a MediumSyncDelay timer reset operation according to an embodiment of the present invention.

FIG. 29 illustrates another example of a MediumSyncDelay timer reset operation according to an embodiment of the present invention.

The embodiment of FIG. 29 may be provided as a solution to the problem described in FIG. 24. In addition, the details described above may be omitted.

According to the embodiment described above, an STA having a MediumSyncDelay timer other than 0 may reset the MediumSyncDelay timer on the basis of a received frame (or duration information included in the frame) or PPDU (or RXVECTOR parameter TXOP_DURATION). However, a method for solving the problem described in FIG. 24 may be required.

Accordingly, according to an embodiment of the present invention, when the STA having the MediumSyncDelay timer other than 0 receives both a preamble (or RXVECTOR parameter TXOP_DURATION) of a PPDU and a frame (or duration information included in the frame), the MediumSyncDelay timer may not be reset on the basis of the preamble (or RXVECTOR parameter TXOP_DURATION) of the PPDU. In addition, in this case, the STA having the MediumSyncDelay timer other than 0 may reset the MediumSyncDelay timer on the basis of the frame (or duration information include in the frame). In this case, the reception may mean successful reception or reception of a valid one. In addition, in this case, the embodiment described in FIG. 22 can be used together.

In the present invention, TXOP field, TXVECTOR parameter TXOP_DURATION, and RXVECTOR parameter TXOP_DURATION may be interchangeably used.

Referring to FIG. 29, multiple STAs operating in link 2 may apply MediumSyncDelay. In addition, STA 2 of link 2 applying MediumSyncDelay may acquire a TXOP and transmit an RTS frame as the first frame. In this case, STA 2 may perform transmission by using a PPDU including a TXOP field. In addition, one STA having a MediumSyncDelay timer other than 0 may successfully receive both a frame and a TXOP field from a PPDU transmitted by STA 2. In this case, according to an embodiment described in FIG. 26, the one STA may not reset the MediumSyncDelay timer on the basis of the TXOP field. In addition, according to the embodiment described in FIG. 22, the MediumSyncDelay timer may not be reset on the basis of an RTS frame. Accordingly, a problem of resetting the MediumSyncDelay timer when the sequence of the frames transmitted by STA 2 is not continued can be solved. In addition, as described in FIG. 25 or FIG. 27, when the sequence of the frames transmitted by STA 2 is continued, the one STA may reset the MediumSyncDelay timer on the basis of the continuing frame or PPDU.

According to the embodiment described in FIG. 25, whether resetting the MediumSyncDelay timer is allowed may be determined on the basis of whether the frame or PPDU received by the STA having the MediumSyncDelay timer other than 0 corresponds to an intra-BSS or an inter-BSS. According to a more specific embodiment, when the frame or PPDU received by the STA having the MediumSyncDelay timer other than 0 corresponds to the intra-BSS, resetting of the MediumSyncDelay timer may not be allowed. In addition, when the frame or PPDU received by the STA having the MediumSyncDelay timer other than 0 corresponds to the inter-BSS, resetting the MediumSyncDelay timer may not be allowed. This may be for protecting the intra-BSS frame or the intra-BSS PPDU.

According to an embodiment of the present invention, when the STA having the MediumSyncDelay timer other than 0 has received the frame or PPDU, whether resetting of the MediumSyncDelay timer is allowed may be based on whether the frame or PPDU is uplink or downlink. According to an embodiment, when the STA having the MediumSyncDelay timer other than 0 has received the frame or PPDU and the frame or PPDU is uplink, resetting the MediumSyncDelay timer may not be allowed. In addition, when the STA having the MediumSyncDelay timer other than 0 has received the frame or PPDU and the frame or PPDU is downlink, resetting the MediumSyncDelay timer may be allowed. This is because the downlink frame (or PPDU) is transmitted by an AP, it is more likely that the AP knows the entire channel situation of a BSS, the uplink frame (or PPDU) is transmitted by a non-AP STA, and the non-AP STA does not know the entire channel situation of a BSS better than the AP.

Whether the frame or PPDU is uplink or downlink may be based on the preamble of the PPDU including the frame or signaling included in the preamble of the PPDU. For example, the preamble may include a UL/DL field or an uplink field. The UL/DL field or the uplink field may be 1 bit, and may indicate uplink or downlink. Alternatively, the preamble may include a group ID field. The group ID field may be configured as a preconfigured value according to whether the PPDU including the group ID field is uplink or downlink. In addition, whether the frame or PPDU is uplink or downlink may be based on the frame or a MAC header included in the frame included in the PPDU. For example, the MAC header may include a MAC address. The MAC address may indicate either uplink or downlink. For example, when a transmitter address (TA) field is configured as a MAC address of an AP, the frame including the TA field may be downlink. When a receiver address (RA) field is configured as a MAC address of an AP, a frame including the RA field may be uplink.

Alternatively, according to an embodiment, when the STA having the MediumSyncDelay timer other than 0 has received a PPDU, whether resetting the MediumSyncDelay timer is allowed on the basis of RXVECTOR parameter TXOP_DURATION may be determined on the basis of whether the PPDU is uplink or downlink. For example, when the STA having the MediumSyncDelay timer other than 0 has received a PPDU and a UL/DL field indicates uplink, resetting the MediumSyncDelay timer may not be allowed on the basis of RXVECTOR parameter TXOP_DURATION. When the STA having the MediumSyncDelay timer other than 0 has received a PPDU and a UL/DL field indicates downlink, resetting the MediumSyncDelay timer may be allowed on the basis of RXVECTOR parameter TXOP_DURATION.

According to an additional embodiment, whether to perform the embodiment in which whether resetting the MediumSyncDelay timer is allowed is determined on the basis of whether the received frame or PPDU is uplink or downlink may be determined on the basis of whether the frame or PPDU corresponds to an intra-BSS or an inter-BSS. That is, whether resetting the MediumSyncDelay timer is allowed may be determined on the basis of whether the received frame or PPDU corresponds to 1) uplink or downlink, or 2) an intra-BSS or an inter-BSS. For example, when the received frame or PPDU corresponds to the intra-BSS, according to the above-described embodiment, whether resetting the MediumSyncDelay timer is allowed may be determined on the basis of whether the received frame or PPDU is uplink or downlink. In addition, when the received frame or PPDU corresponds to the inter-BSS, resetting the MediumSyncDelay timer may be allowed regardless of whether the received frame or PPDU is uplink or downlink.

For example, when the received frame or PPDU corresponds to the intra-BSS and uplink, resetting the MediumSyncDelay timer may not be allowed. In addition, when the received frame or PPDU corresponds to the intra-BSS and downlink, resetting the MediumSyncDelay timer may be allowed. In addition, when the received frame or PPDU corresponds to the inter-BSS, resetting the MediumSyncDelay timer may be allowed regardless of whether the received frame or PPDU is uplink or downlink.

Figure 30:
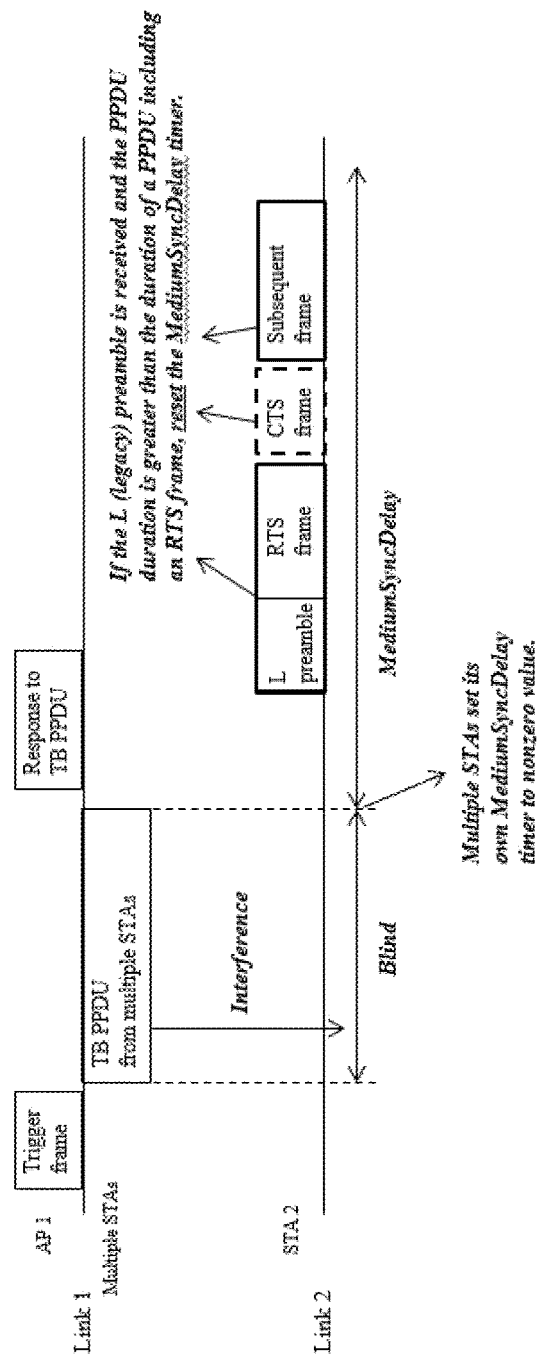
FIG. 30 illustrates an example of a MediumSyncDelay timer reset according to an embodiment of the present invention.

FIG. 30 illustrates an example of a MediumSyncDelay timer reset according to an embodiment of the present invention.

As described above, there may be an operation of resetting a MediumSyncDelay timer. In the present embodiment, the reset operation is described on the basis of conditions different from those described above, and the details described above may be omitted.

According to an embodiment of the present invention, when an STA having a MediumSyncDelay timer other than 0 successfully receives an L preamble, the MediumSyncDelay timer may be reset.

The L preamble may be a legacy preamble or the legacy preamble described above in FIG. 7, etc. Alternatively, the L preamble may be referred to as a non-HT PHY preamble. This is because the L preamble is a preamble having a non-HT (duplicate) PPDU format. In addition, an operation in a case where the L preamble has been successfully received may be identical to an operation in a case where an L-SIG field has been successfully received. This is because the L preamble includes an L-SIG field. In addition, this is because the L-SIG field exists at the last part of the L preamble. In addition, a case where the L-SIG field has been successfully received may correspond to a case where a field indicating the length (duration) of a PHY protocol data unit (PPDU) including the L-SIG field has been successfully received, and in this case, the length of the PPDU can be determined. In addition, the length of the PPDU including the L-SIG field may be determined on the basis of a RATE field and a LENGTH field of the L-SIG field. The RATE field and the LENGTH field may be the above-described L_RATE field and L_LENGTH field, respectively.

The L preamble may include L-STF, L-LTF, and L-SIG fields. The L-STF, L-LTF, and L-SIG fields occupy 8 us, 8 us, and 4 us, respectively, from the front of the PPDU. That is, the L preamble may be present for 20 us at the front of the PPDU.

The L-SIG field may include RATE, reserved, LENGTH, parity, and SIGNAL TAIL fields. The RATE and the LENGTH may indicate a value indicate (Mbps) indicated by the RATE field and a value of the LENGTH field, respectively. The LENGTH may be configured as below $$LENGTH=Ceil((TXTIME-SignalExtension-20)/4)*RATE/8*4-3-m$$

Here, Ceil(x) may be the smallest integer larger than or equal to x. TXTIME may be a PPDU transmission length or a PPDU length. SignalExtension may be a single extension length. SignalExtension may be 0 us in a 5 GHz band or a 6 GHz band. SignalExtension may be 6 us in a 2.4 GHz. In addition, m may be 1 or 2 for a HE PPDU. In addition, m may be 0 for a PPDU (i.e., a non-HT (duplicate) PPDU, an HT PPDU, a VHT PPDU, an EHT PPDU, etc.) other than the HE PPDU.

In addition, the length of PPDU or RXTIME may be calculated as follows. This may be a PPDU length indicated by an L-SIG (or a LENGTH field and a RATE field).

$$RXTIME=Ceil((LENGTH+3)/(RATE/8*4))*4+20+SignalExtension$$

In addition, a value indicated by RATE may be 6, 9, 12, 18, 24, 36, 48, and 54 Mbps. This may be an embodiment in a case of 20 MHz channel spacing. In addition, the RATE field value indicating the value which can be indicated by the above-described RATE may indicate a case where values from an LSB to an MSB of the RATE field are 1101, 1111, 0101, 0111, 1001, 1011, 0001, 0011, respectively. That is, when the RATE field is 1101, the RATE indicated by the RATE field may be 6 Mbps.

When the RATE is 6 Mbps, the LENGTH and the RXTIME may be as follows.

$$LENGTH=Ceil((TXTIME-SignalExtension-20)/4)*3-3-m$$

$$RXTIME=Ceil((LENGTH+3)/3)*4+20+SignalExtension$$

When the L preamble has be successfully received, the MediumSyncDelay timer is reset because duration of the PPDU including the L preamble has been successfully received or determined. In addition, when the L preamble has been successfully received, an STA may determine that the medium is busy or may not perform medium (channel) access for the duration of the PPDU including the L preamble. However, in this case, it may be difficult to protect the frame exchange sequence, compared to the embodiments which are described in FIGS. 21 to 26 and in which the timer is reset on the basis of valid duration information, a valid MPDU, or RXVECTOR parameter TXOP_DURATION. This is because the above-described valid duration information, valid MPDU, and RXVECTOR parameter TXOP_DURATION may indicate duration of a frame sequence, but the duration indicated by the L preamble may be duration of the PPDU. However, in the embodiment of FIG. 27, there is higher possibility that the MediumSyncDelay timer is reset and channel access is promptly performed, compared to the embodiments described in FIGS. 21 to 26. This is because there may be a case where the L preamble is successfully received since the L preamble exists at the front of the PPDU, and the valid duration information, the valid MPDU, or the RXVECTOR parameter TXOP_DURATION fail to be successfully received.

In addition, the embodiments described in FIGS. 24, 25, 27, 29, etc. for solving the problem of resetting the MediumSyncDelay timer on the basis of the first frame or the RTS frame during MediumSyncDelay can be applied to the embodiment of FIG. 30. In the present invention, the embodiment including a description of the first frame or the RTS frame during MediumSyncDelay is not limited to the description, and may be replaced by the RTS frame or the first frame during MediumSyncDelay.

According to an embodiment of the present invention, as described above, when whether to reset the timer is determined on the basis of whether the received frame is the RTS frame, whether the received frame is the RTS frame may be determined on the basis of duration. The duration may be duration of a PPDU. According to an embodiment of the present invention, when an STA having a MediumSyncDelay timer other than 0 has successfully received an L preamble, the MediumSyncDelay timer may be reset only when duration of a PPDU including the L preamble is longer than duration of the RTS frame. That is, when the duration of the PPDU including the L preamble is less than the duration of the RTS frame, the MediumSyncDelay timer may not be reset.

The PPDU duration in a case where the RTS frame is included in the non-HT PPDU or the non-HT duplicate PPDU may be as follows. When values indicated by the RATE are 6, 9, 12, 18, 24, 36, 48, and 54 Mbps, the respective value indicate 52, 44, 36, 32, 28, 28, 24, and 24 us. Accordingly, when a PPDU equal to or shorter than 52 us is received, the MediumSyncDelay timer may not be reset.

When a PPDU is included in a frame, PPDU duration may be calculated as follows.

PPDU duration=Ceil((FrameOctet*8+ServiceTailBits)/RATE/4)*4+Preamble

FrameOctet may be an octet number in a MAC frame format. In a case of an RTS frame, FrameOctet may be 20. ServiceTailBits may be a sum of bits of a service field and a tail bit. For example, ServiceTailBits may be 22 bits. RATE may be the RATE described above. In addition, 4 may be an OFDM symbol length (us). The preamble may be the length of an L preamble in a case of a non-HT PPDU or a non-HT duplicate PPDU. That is, the preamble may be 20 us in a case of the non-HT PPDU or the non-HT duplicate PPDU.

In an embodiment of the present invention, when an STA having a MediumSyncDelay timer other than 0 has successfully received an L preamble, in an embodiment in which the MediumSyncDelay timer may be reset only when duration of a PPDU including the L preamble is longer than duration of an RTS frame, the duration of the RTS frame may be determined on the basis of a LENGTH field only. Accordingly, in this case, when the STA having the MediumSyncDelay timer other than 0 has successfully received the L preamble, the MediumSyncDelay timer may be reset only when the duration of the PPDU including the L preamble is longer than 54 us.

Alternatively, in an embodiment of the present invention, when the STA having the MediumSyncDelay timer other than 0 has successfully received the L preamble, in an embodiment in which the MediumSyncDelay timer may be reset only when the duration of the PPDU including the L preamble is longer than the duration of the RTS frame, the duration of the RTS frame may be determined on the basis of a LENGTH field and a RATE field. That is, a threshold for comparison of duration of the PPDU may vary on the basis of the received RATE field value.

In this embodiment, for the duration of the PPDU including the RTS frame, it is assumed that the RTS frame is included in the non-HT PPDU or the non-HT duplicate PPDU.

According to another embodiment, when a PPDU format including the RTS frame is determined, the duration of the PPDU including the RTS frame may be determined in consideration of a data rate and/or a preamble length of the corresponding PPDU format.

However, in this embodiment, when a frame having an octet number equal to or smaller than the RTS frame is received, it may be difficult to reset the MediumSyncDelay timer. For example, a CF-End frame and a PS-Poll frame may have the same octet number, 20 octet, as the RTS frame. In addition, an Ack frame or a CTS frame may have a smaller octet number than the RTS frame. The Ack frame or the CTs frame may be 14 octet.

In addition, when a PPDU using a high data rate is received, it may be also difficult to reset the MediumSyncDelay timer for the PPDU. For example, even though the octet number of a frame is greater than that of the RTS frame, a shorter PPDU may be transmitted by using a higher MCS, and in this case, it may be difficult to reset the MediumSyncDelay timer since PPDU duration is equal to or less than a threshold.

Referring to FIG. 30, multiple STAs operating in link 2 may apply MediumSyncDelay. In addition, STA 2 of link 2 applying MediumSyncDelay may acquire a TXOP and transmit an RTS frame as the first frame. When STA 3 (for example, one of the multiple STAs) having the MediumSyncDelay timer other than 0 may determine whether to reset the MediumSyncDelay timer on the basis of a PPDU including the RTS frame, a PPDU including a CTS frame subsequent to the RST frame, or a PPDU including a subsequent frame subsequent to the CTS frame. That is, when STA 3 has successfully received an L preamble, whether the MediumSyncDelay timer can be reset may be determined on the basis of PPDU duration indicated by the L preamble. If the PPDU duration is greater than the duration of the PPDU including the RTS frame, the timer can be reset, and the PPDU duration is equal to or less than the duration of the PPDU including the RTS frame, the timer cannot be reset.

According to an embodiment, duration of the PPDU including the RTS frame may be 52 us. According to another embodiment, when the RATE field indicates 6, 9, 12, 18, 24, 36, 48, and 54 Mbps, duration of the PPDU including the RTS frame may be 52, 44, 36, 32, 28, 28, 24, and 24 us. This may be a case where the RTS frame is included in the non-HT PPDU or the non-HT duplicate PPDU.

Accordingly, in the embodiment of FIG. 30, STA 3 cannot reset the MediumSyncDelay timer on the basis of the PPDU including the RTS frame or the PPDU including the CTS frame. If STA 3 has received the PPDU including the subsequent frame, whether the MediumSyncDelay timer can be reset may be determined on the basis of the above-described conditions.

That is, according to the embodiment described in FIG. 30, an STA existing in the hidden location from an STA having transmitted the RTS frame may find it difficult to reset the MediumSyncDelay timer on the basis of the RST frame and the subsequent frame exchange. This may be disadvantageous for the STA to perform channel access.

Figure 31:
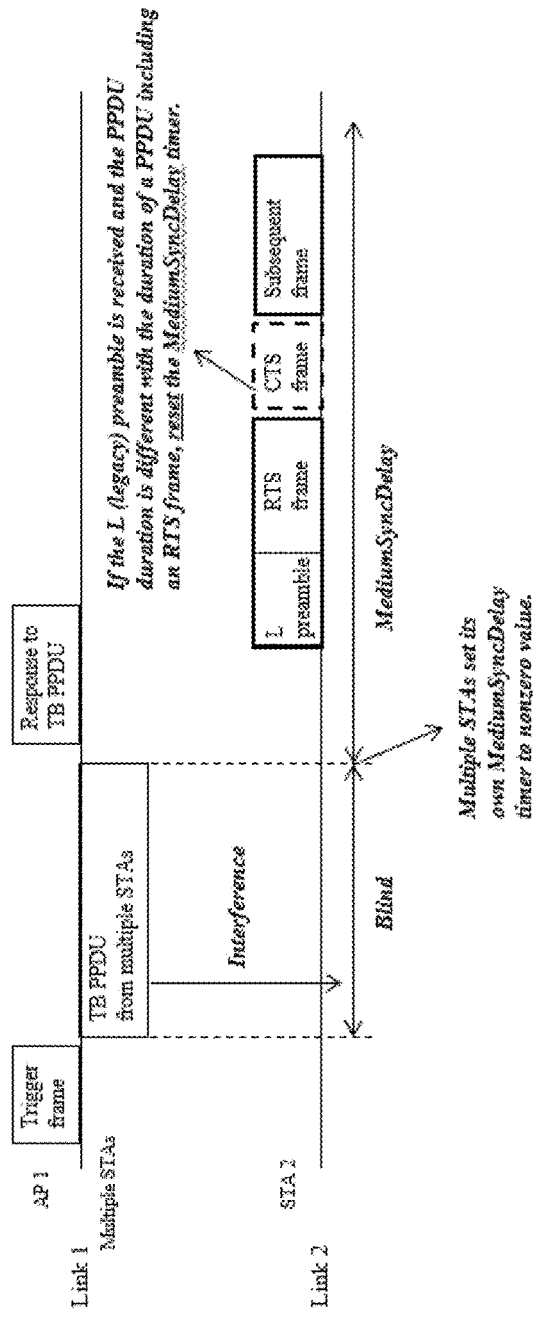
FIG. 31 illustrates another example of a MediumSyncDelay timer reset according to an embodiment of the present invention.

FIG. 31 illustrates another example of a MediumSyncDelay timer reset according to an embodiment of the present invention.

FIG. 31 illustrates a MediumSyncDelay timer reset according to an embodiment of the present invention.

An embodiment of FIG. 31 may be an embodiment for solving the problem described in FIG. 30. In addition, the details described above may be omitted.

According to an embodiment of the present invention, as described above, when whether to reset a timer is determined on the basis of whether a received frame is an RTS frame, whether the received frame is the RTS frame may be determined on the basis of duration. The duration may be PPDU duration. According to an embodiment of the present invention, when an STA having a MediumSyncDelay timer other than 0 has successfully received an L preamble, the MediumSyncDelay timer may be reset only when duration of a PPDU including the L preamble is different from duration of the RTS frame. That is, when the duration of the PPDU including the L preamble is identical to the duration of the RTS frame, the MediumSyncDelay timer may not be reset. That is, compared to the embodiment described in FIG. 27, when the STA having the MediumSyncDelay timer other than 0 has successfully received the L preamble, the MediumSyncDelay timer may be reset even when the duration of the PPDU including the L preamble is shorter than the duration of the RTS frame.

A description of the duration of the RTS frame may be identical to the description in FIG. 27.

In the present invention, an embodiment of comparing the duration of the PPDU and the duration of the RTS frame is described, but the present invention is not limited thereto, and can be applied to an embodiment in which a value corresponding to the RTS frame is compared with the octet number (RXVECTOR parameter PSDU_LENGTH) of a received PHY service data unit (PSDU), the octet number of the frame, a LENGTH field value included in the L-SIG, etc. For example, when the above-described received comparison reference is identical to the value corresponding to the RTS frame as a result of the comparison, the MediumSyncDelay timer may not be reset, and when the reference is not identical to the value corresponding to the RTS frame, the MediumSyncDelay timer may be reset.

Accordingly, according to the present invention, even when a frame smaller or shorter than the RTS frame or a higher data rate or MCS is used, the MediumSyncDelay timer may be reset on the basis of the frame or PPDU.

Referring to FIG. 31, multiple STAs operating in link 2 may apply MediumSyncDelay. In addition, STA 2 of link 2 applying MediumSyncDelay may acquire a TXOP and transmit an RTS frame as the first frame. STA 3 (for example, one of the multiple STAs) having the MediumSyncDelay timer other than 0 may determine whether to reset the MediumSyncDelay timer on the basis of a PPDU including the RTS frame, a PPDU including CTS frame subsequent to the RTS frame, or a PPDU including a subsequent frame subsequent to the CTS frame. That is, when STA 3 successfully receives an L preamble, whether the MediumSyncDelay timer can be reset may be determined on the basis of PPDU duration indicated by the L preamble. If PPDU duration is different from PPDU duration including the RTS frame, the resetting may be possible, and if PPDU duration is identical to PPDU duration including the RTS frame, the resetting may not be possible.

According to an embodiment, the PPDU duration including the RTS frame may be 52 us. According to another embodiment, values of the PPDU duration including the RTS frame may be 52, 44, 36, 32, 28, 28, 24, 24 us when the RATE field indicates 6, 9, 12, 18, 24, 36, 48, and 54 Mbps. This may be a case where the RTS frame is included in a non-HT PPDU or a non-HT duplicate PPDU.

Accordingly, in the embodiment of FIG. 31, STA 3 cannot reset the MediumSyncDelay timer on the basis of the PPDU including the RTS frame. In addition, when STA 3 receives the PPDU including the CTS frame, the MediumSyncDelay timer may be reset on the basis of the PPDU including the CTS frame. If STA 3 has received the PPDU including the subsequent frame, whether the MediumSyncDelay timer can be reset may be determined on the basis of the above-described conditions.

That is, according to the embodiment described with reference to FIG. 31, an STA existing at a hidden location from the STA having transmitted the RTS frame may reset the MediumSyncDelay timer on the basis of the CTS frame or the PPDU including the CTS frame.

However, even in the embodiment of FIG. 31, it may be difficult to reset the MediumSyncDelay timer on the basis of the frame having the same length as the RTS frame, or the PPDU including the frame. For example, as described above, since the CF-End frame or the PS-Poll frame has the same octet number as the RTS frame, it may be difficult to reset the MediumSyncDelay timer on the basis of the PPDU including such a frame. In addition, even in a case where the PPDU using the high data rate is received, it may be difficult to reset the MediumSyncDelay timer for the PPDU. For example, even though the octet number of the frame is different from that of the RTS frame, the PPDU having the same length as that in a case of including the RTS frame may be transmitted by using a higher MCS, and in this case, PPDU duration is identical to a threshold, and thus it may be difficult to reset the MediumSyncDelay timer. For example, a PPDU (HT PPDU, VHT PPDU, HE PPDU, or EHT PPDU) other than the non-HT PPDU or the non-HT duplicate PPDU may always configure a RATE field included in the L-SIG field as a preconfigure value, for example, a value indicating 6 Mbps. In addition, the rate that is actually used may be included in a field included after the L-SIF field (for example, an HT-SIG field, a VHT-SIG-A field, a HE-SIG-A field, a U-SIG field, an EHT-SIG field, and the like). Accordingly, when PPDU duration is determined on the basis of the RATE field included in the L-SIG field, duration identical to that of the PPDU including the RTS frame may be calculated for the PPDU duration even when the PPDU does not includes the RTS frame.

Figure 32:
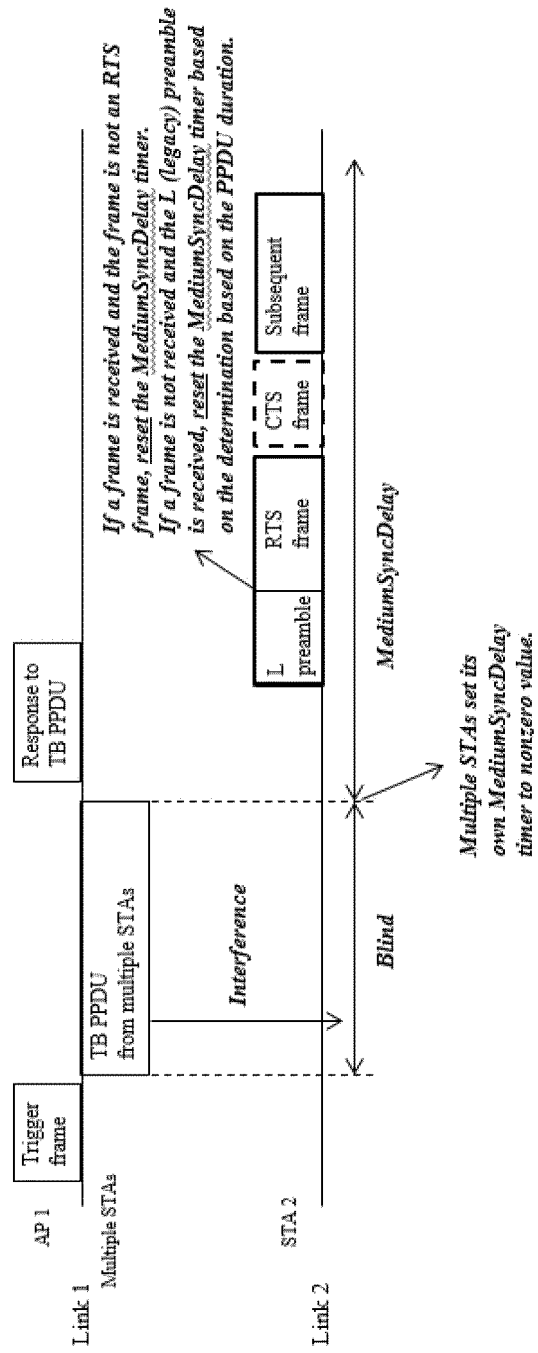
FIG. 32 illustrates another example of a MediumSyncDelay timer reset according to an embodiment of the present invention.

FIG. 32 illustrates another example of a MediumSyncDelay timer reset according to an embodiment of the present invention.

The embodiment of FIG. 32 may be an embodiment for solving the problem described in FIGS. 30 and 31. In addition, the details described above may be omitted. Specifically, the description of the duration may be omitted.

According to an embodiment of the present invention, a method for determining whether the MediumSyncDelay timer can be reset may vary according to whether a frame (MAC frame) has been received. For example, a method for determining whether the MediumSyncDelay timer can be reset may vary according to whether a frame has been received or a frame has failed to be received and only a preamble has been received.

According to an embodiment, when a frame is received from a PPDU, the MediumSyncDelay timer may be reset on the basis of the embodiments described in FIGS. 25 and 27 to 29. For example, in a case where the frame is received from the PPDU, the MediumSyncDelay timer may be reset if the frame is not the RTS frame. Alternatively, when the frame is received from the PPDU, the MediumSyncDelay timer may be reset if the frame is neither the RTS frame nor the PS-Poll frame.

When the frame has failed to be received from the PPDU, the MediumSyncDelay timer may be reset on the basis of the embodiments described in FIGS. 30 and 31. For example, in a case where the frame has failed to be received from the PPDU, the MediumSyncDelay timer may be reset when an L preamble has been successfully received from the PPDU (embodiment of FIG. 30). Alternatively, in a case the frame has failed to be received from the PPDU and the L preamble has been successfully received from the PPDU, the MediumSyncDelay timer may be reset if duration of the PPDU is greater than the duration of a PPDU including the RTS frame (embodiment of FIG. 30). Alternatively, in a case where the frame has failed to be received from the PPDU, the MediumSyncDelay timer may be reset if the L preamble has been successfully received from the PPDU and the duration of the PPDU is different from the duration of the PPDU including the RTS frame (embodiment of FIG. 31).

The duration of the RTS frame and the duration of the PPDU including the RTS frame may be identical as described in FIGS. 30 and 31.

In the present invention, the embodiment of comparing the PPDU duration and the duration of the RTS frame is described, but the present invention is not limited thereto, and can be applied to an embodiment in which a value corresponding to the RTS frame is compared with the octet number (RXVECTOR parameter PSDU_LENGTH) of a received PHY service data unit (PSDU), the octet number of the frame, a LENGTH field value included in the L-SIG, etc. For example, when the above-described received comparison reference is identical to the value corresponding to the RTS frame as a result of the comparison, the MediumSyncDelay timer may not be reset, and when the reference is not identical to the value corresponding to the RTS frame, the MediumSyncDelay timer may be reset.

The above-described embodiment may be also described as follows.

For example, when an STA has received a frame other than an L preamble or an RTS frame, the MediumSyncDelay timer may be reset. In this case, the STA may be an STA having the MediumSyncDelay timer value other than 0. In addition, the reception may mean successful reception.

Alternatively, when the STA 1) has received the L preamble and duration is longer than duration of the RTS frame, or 2) has received a frame other than the RTS frame, the MediumSyncDelay timer may be reset. In this case, the duration may be duration indicated by the L preamble or the LENGTH field included in the L-SIG field. That is, when the STA has received the RTS frame from the received PPDU, the MediumSyncDelay timer may not be reset. In addition, when the STA has received the CTS frame, the CF-End frame, or the PS-Poll frame from the received PPDU, the MediumSyncDelay timer may be reset. Alternatively, in addition to condition 1) or 2) above, there may be an embodiment in which "as a condition 3), when the STA has received RXVECTOR parameter TXOP_DURATION other than the UNSPECIFIED value", the MediumSyncDelay timer can be reset may exist.

Alternatively, when 1) the STA has received the L preamble and the duration is different from the duration of the RTS frame, or 2) has received a frame other than the RTS frame, the MediumSyncDelay timer may be reset. In this case, the duration may be duration indicated by the LENGTH field included in the L preamble or the L-SIG field. That is, when the STA has received the RTS frame from the received PPDU, the MediumSyncDelay timer cannot be reset. In addition, when the STA has received the CTS frame, the CF-End frame, or the PS-Poll frame from the received frame, the MediumSyncDelay timer may be reset. Alternatively, in addition to the condition 1) or 2) above, there may be an embodiment in which "as a condition 3), when the STA has received RXVECTOR parameter TXOP_DURATION other than the UNSPECIFIED value", the MediumSyncDelay timer can be reset may exist.

In addition, in an embodiment of the present invention, the above-described embodiment may be used together with a condition for resetting the timer when the frame other than the RTS frame has been received. For example, even in a case where an RTS frame is received as well as a case where a frame other than the RTS frame is received, resetting may be performed for the RTS frame transmitted by the associated AP or the AP corresponding to the BSSID included in the same multiple-BSSID set as the associated AP. Alternatively, the embodiment of determining whether the resetting can be performed on the basis of the uplink or downlink may be also used.

Referring to FIG. 32, multiple STAs operating in link 2 may apply MediumSyncDelay. In addition, STA 2 of link 2 applying MediumSyncDelay may acquire a TXOP and transmit an RTS frame as the first frame. STA 3 (for example, one of the multiple STAs) having the MediumSyncDelay timer other than 0 may determine whether to reset the MediumSyncDelay timer on the basis of a PPDU including the RTS frame, a PPDU including a CTS frame subsequent to the RTS frame, or a PPDU including a subsequent frame subsequent to the CTS frame. That is, when STA 3 has successfully received the L preamble, whether the MediumSyncDelay timer can be reset may be determined on the basis of the PPDU duration indicated by the L preamble. In this case, STA 3 cannot reset the MediumSyncDelay timer on the basis of the L preamble of the PPDU including the RTS frame. Alternatively, when STA 3 has received a frame other than the RTS frame, the MediumSyncDelay timer may be reset. Accordingly, even though STA 3 receives the RTS frame subsequent to the L preamble of the PPDU including the RTS frame, the MediumSyncDelay timer cannot be reset. In addition, even though the duration including the subsequent frame received by STA 3 is identical to the duration of the PPDU including the RTS frame, the MediumSyncDelay timer may be reset if STA 3 has received the subsequent frame. Alternatively, even when STA 3 has received the CTS frame, the MediumSyncDelay timer may be reset.

According to an additional embodiment, in the above-described embodiment, in the embodiment in which the STA having the MediumSyncDelay timer value other than 0 receives a PPDU or a frame and determines whether the MediumSyncDelay timer can be reset, the MediumSyncDelay timer can be reset only when the received PPDU or frame corresponds to an intra-BSS. This is because there may be a case where the frame or PPDU is transmitted when only a basic NAV of the STA has been configured and an intra-BSS NAV has not been configured. For example, in a case where only a basic NAV of the STA has been configured and an intra-BSS NAV has not been configured, when the intra-BSS AP or the associated AP has transmitted a triggering frame (a trigger frame or a frame including TRS control) to the STA, the STA may transmit the frame or the PPDU.

Figure 33:
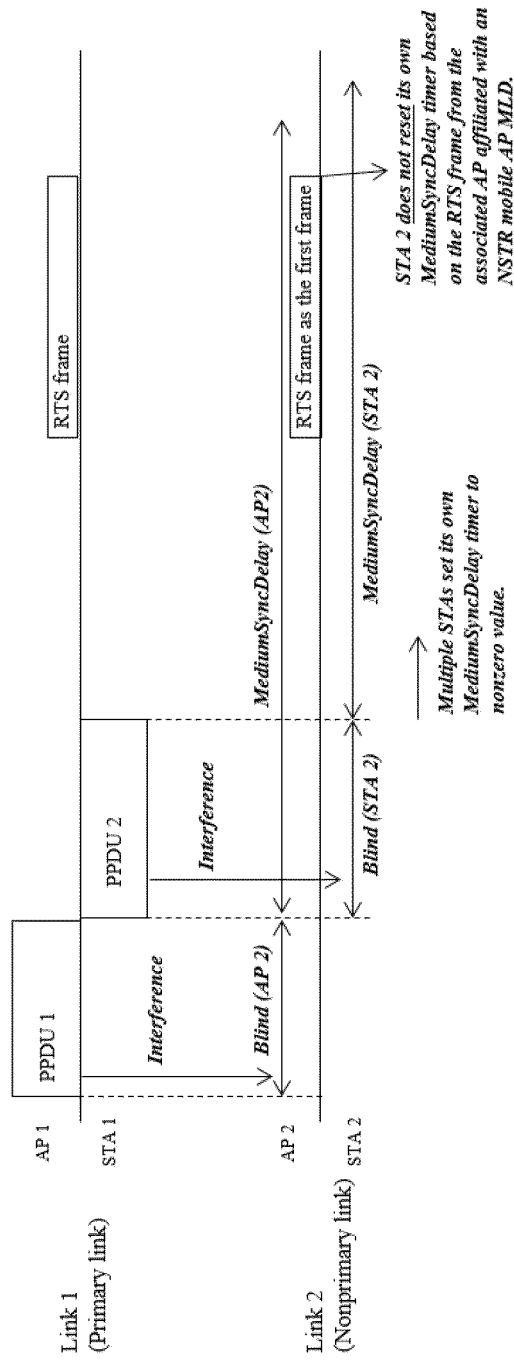
FIG. 33 illustrates another example of a MediumSyncDelay timer reset according to an embodiment of the present invention.

FIG. 33 illustrates another example of a MediumSyncDelay timer reset according to an embodiment of the present invention.

As described above in FIGS. 24 to 32, there may be an operation of resetting a MediumSyncDelay timer. In addition, as described above, in this case, whether to perform the reset operation may be based on the type of a received frame. In addition, whether to perform the reset operation may be based on whether an STA which has transmitted the received frame. In the present invention, the details described above may be omitted.

As described in FIG. 23, there may be a case where multiple STAs have a MediumSyncDelay timer other than 0. In addition, according to an embodiment of the present invention, the multiple STAs may include an STA (that is, AP) belonging to an AP MLD. For example, there may be a case in which the AP MLD operates in an NSTR link pair. In this case, the AP MLD may be referred to as an NSTR AP MLD, an NSTR mobile AP MLD, or an NSTR soft AP MLD.

Referring to FIG. 33, AP 1 and AP 2 may belong to the AP MLD corresponding to the NSTR mobile AP MLD. In addition, AP 1 and AP 2 may operate in link 1 and link 2, respectively. There may be a non-AP MLD associated with (or configured as multi-link setup with) the NSTR mobile AP MLD. STA 1 and STA 2 may belong to the non-AP MLD. In addition, STA 1 and STA 2 may operate in link 1 and link 2, respectively. Link 1 and link 2 may be a primary link and a nonprimary link, respectively. For example, there may be a case where AP 1 and STA 1 perform frame exchanging. AP 1 may transmit PPDU 1. In addition, STA 1 may transmit PPDU 2. In this case, while AP 1 transmits PPDU 1, this transmission may cause interference to AP 2, and AP 2 may be blinded during the transmission of PPDU 1. In this case, when AP 2 exits from the blinded state, the MediumSyncDelay timer may start. In addition, while STA 1 transmits PPDU 2, this transmission may cause interference to STA 2, and STA 2 may be blinded during the transmission of STA 2. In this case, when STA 2 exits from the blinded state, the MediumSyncDelay timer may start. Accordingly, there may be a case where the MediumSyncDelay timer of the multiple STAs including the AP is not 0.

In this case, according to an embodiment described in FIG. 25, in a case where resetting the MediumSyncDelay timer to 0 is allowed when a type of a frame allowed as a the first frame and transmitted by the associated AP or the AP belonging to the same multiple-BSSID set as the associated AP is received, as described in the problem in FIG. 21, the MediumSyncDelay timer may be reset on the basis of the first frame and interrupt the exchanging of the existing frame even though frame exchanging is not performed after the first frame. That is, in FIG. 30, the RTS frame may be transmitted as the first frame while the MediumSyncDelay timer of AP 2 is not 0 (for example, the first frame is transmitted to STA 3 rather than STA 2), and STA 2 having received the frame may reset the MediumSyncDelay timer on the basis of the first frame. In this case, STA 2 may start to perform transmission and cause interference to exchanging of the frame that is being transmitted.

The NSTR mobile AP MLD may configure, allocate, or designate the primary link and the nonprimary link. In addition, the non-AP MLD configured as a multi-link setup with the NSTR mobile AP MLD may receive, from the NSTR mobile AP MLD, information on a link corresponding to the primary link and a link corresponding to the nonprimary link, and determine the link. The NSTR mobile AP MLD may transmit a beacon frame, a probe response frame, an association response frame, and a reassociation response frame only in the primary link. The NSTR mobile AP MLD may not be able to transmit a beacon frame, a probe response frame, an association response frame, and a reassociation response frame in the nonprimary link. In addition, the non-AP MLD which is (to be) configured as a multi-link setup with the NSTR mobile AP MLD may transmit a probe request frame, an association request frame, and a reassociation request frame only in the primary link. The non-AP MLD which is (to be) configured as a multi-link setup with or associated with the NSTR mobile AP MLD may not be able to transmit a probe request frame, an association request frame, and a reassociation request frame in the nonprimary link.

In addition, the non-AP MLD associated with the NSTR mobile AP MLD or the NSTR mobile AP MLD may need to also use the primary link for TXPP start (frame transmission start) in the nonprimary link. For example, to start PPDU transmission in the nonprimary link, PPDU transmission may need to be started simultaneously in the primary link and the nonprimary link. In addition, there may be a backoff procedure for starting PPDU transmission simultaneously in the primary link and in the nonprimary link. For example, a backoff counter value 0 in a link in which a backoff counter has reached 0, and in the link having the backoff counter 0, PPDU transmission may be started when the backoff counter reaches 0 in another link.

In addition, the AP MLD may indicate whether the AP MLD itself is an NSTR mobile AP MLD or an AP MLD (an AP MLD operating in an STR link pair) other than the NSTR mobile AP MLD. For example, the multi-link element described in FIG. 20 may include the indication. More specifically, a field of MLD capabilities of a common info field included in the multi-link element may include the indication. More specifically, a B7 bit of the field of MLD capabilities may indicate the indication. The indication may be present when the AP MLD transmits the multi-link element. For example, when the NSTR mobile AP MLD transmits the multi-link element, the bit value may be configured as 1. When the AP MLD other than the NSTR mobile AP MLD transmits the multi-link element, the bit value may be configured as 0. The non-AP MLD receiving the bit may determine whether or not the multi-link element including the bit is the NSTR mobile AP MLD on the basis of the bit.

In addition, when the NSTR mobile AP MLD transmits a reduced neighbor report element, only a subfield of MLD parameters may be included in a TBTT information field corresponding to the NSTR mobile AP MLD. In addition, when the AP MLD other than the NSTR mobile AP MLD transmits the reduced neighbor report element, there may be no case where only a subfield of MLD parameters may be included in a TBTT information field corresponding to the AP MLD. The reduce neighbor report element may be included in a beacon frame, a probe response frame, an association response frame, and a reassociation response frame. Accordingly, the non-AP MLD receiving the TBTT information field may determine whether or not the AP MLD corresponding to the TBTT information field is the NSTR mobile AP MLD according to whether only the subfield of MLD parameters is included in the TBTT information field. Whether the only the subfield of MLD parameters is included in the TBTT information field may be determined on the basis of a field indicating the type or the length of the TBTT information field. For example, the subfield of MLD parameters may be a preconfigured length, for example, 3-octet. In addition, a value indicating the length of the TBTT information field indicates the preconfigured length, it may be determined that the TBTT information field only includes the subfield of MLD parameters and the TBTT information field corresponds to the NSTR mobile AP MLD.

According to an embodiment of the present invention, when an STA having a MediumSyncDelay timer other than 0 has received a valid frame (or MPDU), the STA may determine whether resetting the MediumSyncDelay timer is allowed on the basis of whether the associated AP MLD (an AP MLD configured as a multi-link setup) is the NSTR mobile AP MLD. In the embodiment described in FIG. 22, when the frame received by the STA is a type of a frame allowed as the first frame and is not a frame transmitted by an associated AP (or an AP included in the same multiple-BSSID set as the associated AP), an operation of resetting the MediumSyncDelay timer to 0 is not allowed. In addition, when the frame received by the STA is not a type of a frame allowed as the first frame or is a frame transmitted by an associated AP (or an AP included in the same multiple-BSSID set as the associated AP), an operation of resetting the MediumSyncDelay timer to 0 is allowed. However, in the embodiment of the present invention, this may be limited to a case where an associated AP (or an AP included in the same multiple-BSSID set as the associated AP) belongs to the AP MLD other than the NSTR mobile AP MLD.

That is, in a case where the STA having the MediumSyncDelay timer other than 0 has received a valid frame (or MPDU), 1) when the frame is a type of a frame allowed as the first frame during MediumSyncDelay and, 2) when the frame is not a frame transmitted by an associated AP (or an AP included in the same multiple-BSSID set as the associated AP) belonging to the AP MLD other than the NSTR mobile AP MLD, an operation of resetting the MediumSyncDelay timer to 0 may not be allowed.

In addition, in a case where the STA having the MediumSyncDelay timer other than 0 has received a valid frame (or MPDU), 1) when the frame is not a type of a frame allowed as the first frame during MediumSyncDelay and, 2) when the frame is a frame transmitted by an associated AP (or an AP included in the same multiple-BSSID set as the associated AP) belonging to the AP MLD other than the NSTR mobile AP MLD, an operation of resetting the MediumSyncDelay timer to 0 may be allowed.

That is, when the frame received by the STA is a type of a frame (for example, an RTS frame) allowed as the first frame during MediumSyncDelay, the associated AP belongs to the NSTR mobile AP MLD, and the associated AP has transmitted the received frame, an operation of resetting the MediumSyncDelay timer to 0 may not be allowed.

In addition, when the frame received by the STA is a type of a frame (for example, an RTS frame) allowed as the first frame during MediumSyncDelay, the associated AP belongs to the AP MLD other than the NSTR mobile AP MLD, and the associated AP has transmitted the received frame, an operation of resetting the MediumSyncDelay timer to 0 may be allowed.

In addition, when the frame received by the STA is a type of a frame (for example, an RTS frame) allowed as the first frame during MediumSyncDelay and the associated AP has not transmitted the received frame, an operation of resetting the MediumSyncDelay timer to 0 may not be allowed.

In addition, when the frame received by the STA is a type of a frame (for example, an RTS frame) allowed as the first frame during MediumSyncDelay, an operation of resetting the MediumSyncDelay timer to 0 may be allowed.

In this case, the STA having received the frame may be an STA in a state in which the MediumSyncDelay value timer is not 0.

The embodiment above in which whether the MediumSyncDelay reset is allowed is determined on the basis of whether the frame has been transmitted by the associated AP may be limited to case where the determination is made by the non-AP MLD. When the NSTR mobile AP MLD determines whether the MediumSyncDelay reset is allowed, the determination can be made regardless of an MLD which has transmitted the received frame. For example, when the NSTR mobile AP MLD determines whether the MediumSyncDelay reset is allowed, the determination can be made only on the basis of whether the received frame is a type of a frame allowed as the first frame during MediumSyncDelay, regardless of an MLD which has transmitted the received frame. That is, when the STA belonging to the NSTR mobile AP MLD receives a valid frame and the frame is not a type of a frame (for example, an RTS frame) allowed as the first frame during MediumSyncDelay, an operation of resetting the MediumSyncDelay timer to 0 may be allowed. In addition, when the STA belonging to the NSTR mobile AP MLD receives a valid frame and the frame is a type of a frame (for example, an RTS frame) allowed as the first frame during MediumSyncDelay, an operation of resetting the MediumSyncDelay timer to 0 may not be allowed.

Figure 34:
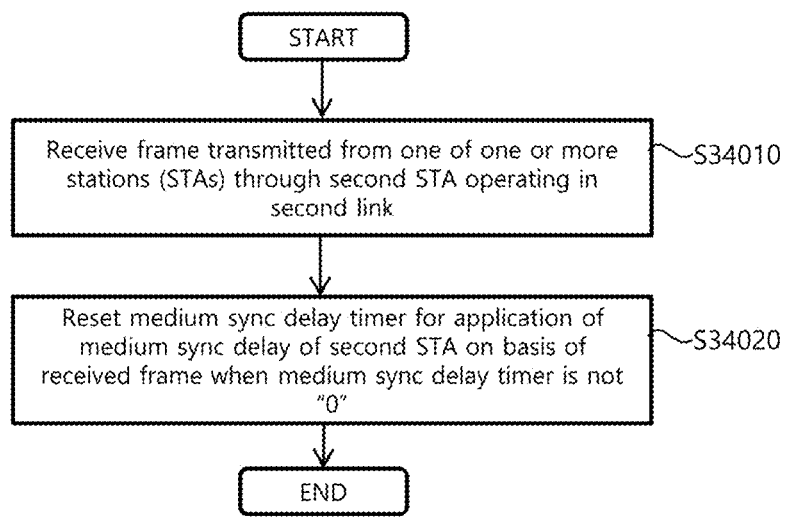
FIG. 34 is a flowchart illustrating an example of a non-AP MLD operation according to an embodiment of the present invention.

FIG. 34 is flowchart illustrating an example of a non-AP MLD operation according to an embodiment of the present invention.

Referring to FIG. 34, when an MLD including multiple STAs operates as an NSTR link pair and specifies a MediumSyncDelay timer for applying MediumSyncDelay, the MediumSyncDelay timer may be set to "0".

Specifically, a multi-link device (MLD) including multiple stations operating in multiple links including a first link and a second link may receive a frame transmitted from one of one or more stations (STAs) through a second STA operating in the second link (S34010).

Thereafter, when a medium sync delay timer for applying a medium sync delay of the second STA is not "0", the medium sync delay timer may be reset on the basis of the received frame (S34020).

In this case, STAs operating in an NSTR link pair may configure the medium sync delay timer as a value other than "0" and operate the same. The medium sync delay timer may operate at a time point at which transmission of another STA ends. However, in a case of an MLD operating in a single radio, an additional delay such as a delay for returning to a link switching or listening operation for changing the single radio to multiple radios may be required. Accordingly, in this case, the MediumSyncDelay timer may operate after the additional delay after the termination of the transmission. For example, when an MLD operates in an EMLSR mode, an STA may operate the MediumSyncDelay timer immediately after the returning to the listening operation.

When an SAT of a link to which the medium sync delay is applied has received a PPDU for a valid frame or a valid MPDU and the medium sync delay timer is not "0", the medium sync delay timer may be reset to "0". Alternatively, when a PPDU in which TXOP_Duration corresponding to a reception parameter (RXVECTOR parameter) is not specified is received and the MediumSyncDelay timer is not "0", the MediumSyncDelay timer may be reset to "0". In this case, the valid frame may be a frame except for an RTS frame.

In this case, the first link and the second link may be a non-simultaneous transmission and reception (NSTR) pair not supporting simultaneous reception or transmission in the same MLD since transmission or reception in one of the links causes interference to the other link.

For example, in a case where reception or transmission of one or more STAs is limited in the second link corresponding to the NSTR link pair due to the PPDU transmitted in the first link, the MediumSyncDelay timer operates at a time point at which the transmission of the PPDU ends, and MediumSyncDelay is applied to the one or more STAs, the one or more STAs may reset the MediumSyncDelay timer in the second link when a valid frame is received. That is, when a PPDU for a valid MPDU remaining after excluding the RTS frame transmitted through 20 MHz of the same BSS or different BSS, one or more STAs to which a specific frequency band is allocated may reset the MediumSyncDelay timer. In this case, when the PPDU or the frame is transmitted from an associated AP or an AP included in the same multiple-BSSID set, the one or more STAs may reset the MediumSyncDelay timer even when the received PPDU or frame is the RTS frame.

The present invention is described mainly based on the above embodiments but the embodiments are merely provided as examples and it is not intended to limit the present invention. It will be understood by those skilled in the art that various changes and modifications can be made without departing from the essential characteristics of the present invention. Therefore, the aforementioned exemplary embodiments are all illustrative in all aspects and are not limited. For example, each element described as a single type may be implemented to be distributed and similarly, elements described to be distributed may also be implemented in a combined form.

The scope of the present invention is represented by the claims to be described below rather than the detailed description, and it is to be interpreted that the meaning and scope of the claims and all the changes or modified forms derived from the equivalents thereof come within the scope of the present invention.

The invention claimed is:

1. A multi-link device (MLD) comprising multiple stations operating in multiple links comprising a first link and a second link,
    wherein a processor is configured to,
    receive a frame transmitted from one of one or more stations (STAs) through a second STA operating in the second link, and
    reset a Medium Sync Delay Timer, for application of a medium sync delay of the second STA, to '0' based on the received frame when the frame is a specific frame,
    wherein the medium sync delay indicates an interval for limiting data transmission through the second link after data transmission of a first STA through the first link, and
    wherein the Medium Sync Delay Timer is set and starts after the second STA returns to a listening operation when the second STA lost a medium synchronization due to the data transmission by the first STA.

2. The MLD of claim 1,
    wherein the first link and the second link are a pair of non-simultaneous transmission and reception links not supporting simultaneous transmission and reception in an identical MLD.

3. The MLD of claim 1,
    wherein the specific frame is a medium access control protocol data unit (MPDU) or a physical layer protocol data unit (PPDU) for which TXOP (transmission opportunity) duration is not unspecified.

4. The MLD of claim 1,
    wherein the second STA returns to the listening operation at the time after a specific delay time from end of the transmission of the frame by the first STA or from end of a TXOP.

5. The MLD of claim 4,
    wherein the specific delay time is a delay switching from the frame exchange to the listening operation.

6. The MLD of claim 1,
    wherein the MLD operates in an enhanced multi-link single radio (EMLSR) mode/an enhanced multi-link multi-radio (EMLMR) mode.

7. A method performed by a multi-link device (MLD) comprising multiple stations operating in multiple links comprising a first link and a second link in a wireless communication system, the method comprising:
    receiving a frame transmitted from one of one or more stations (STAs) through a second STA operating in the second link; and
    resetting a Medium Sync Delay Timer, for application of a medium sync delay of the second STA, to '0' based on the received frame when the frame is a specific frame,
    wherein the medium sync delay indicates an interval for limiting data transmission through the second link after data transmission of a first STA through the first link, and
    wherein the Medium Sync Delay Timer is set and starts after the second STA returns to a listening operation when the second STA lost a medium synchronization due to the data transmission by the first STA.

8. The method of claim 7,
    wherein the first link and the second link are a pair of non-simultaneous transmission and reception links not supporting simultaneous transmission and reception in an identical MLD.

9. The method of claim 7,
    wherein the specific frame is a medium access control protocol data unit (MPDU) or a physical layer protocol data unit (PPDU) for which TXOP (transmission opportunity) duration is not unspecified.

10. The method of claim 7,
    wherein the second STA returns to the listening operation at the time after a specific delay time from end of the transmission of the frame by the first STA or from end of a TXOP.

11. The method of claim 10,
    wherein the specific delay time is a delay switching from the frame exchange to the listening operation.

12. The method of claim 7,
    wherein the MLD operates in an enhanced multi-link single radio (EMLSR) mode/an enhanced multi-link multi-radio (EMLMR) mode.

* * * * *